United States Patent
Schmid et al.

(10) Patent No.: US 6,879,671 B2
(45) Date of Patent: Apr. 12, 2005

(54) VIRTUAL PRIVATE SWITCHED TELECOMMUNICATIONS NETWORK

(75) Inventors: Greg Schmid, San Antonio, TX (US); Kirk E. Smith, San Antonio, TX (US); Keith S. Pickens, San Antonio, TX (US); Craig Heilmann, San Antonio, TX (US)

(73) Assignee: Securelogix Corporation, San Antonio, TX (US)

( * ) Notice: Subject to any disclaimer, the term of this patent is extended or adjusted under 35 U.S.C. 154(b) by 23 days.

(21) Appl. No.: 10/649,204

(22) Filed: Aug. 27, 2003

(65) Prior Publication Data

US 2005/0047570 A1 Mar. 3, 2005

(51) Int. Cl.[7] .............................................. H04M 3/00
(52) U.S. Cl. ....................... 379/189; 379/199; 379/200
(58) Field of Search .......................... 379/112.39, 189, 379/198, 199, 200, 221.15, 901

(56) References Cited

U.S. PATENT DOCUMENTS

| | | | |
|---|---|---|---|
| 4,866,773 A | 9/1989 | Lubarsky | 380/48 |
| 5,003,599 A | 3/1991 | Landry | 380/48 |
| 5,084,891 A | 1/1992 | Ariyavisitakul et al. | 371/42 |
| 5,161,191 A | 11/1992 | Gupta et al. | 380/37 |
| 5,490,212 A * | 2/1996 | Lautenschlager | 379/225 |
| 5,946,386 A * | 8/1999 | Rogers et al. | 379/265.09 |
| 5,970,095 A | 10/1999 | Hauris et al. | 375/259 |
| 6,098,172 A * | 8/2000 | Coss et al. | 713/201 |
| 6,226,372 B1 * | 5/2001 | Beebe et al. | 379/189 |
| 6,226,751 B1 * | 5/2001 | Arrow et al. | 713/201 |
| 6,320,948 B1 * | 11/2001 | Heilmann et al. | 379/189 |

FOREIGN PATENT DOCUMENTS

DE   100 48 609 A1   5/2002

OTHER PUBLICATIONS

Biodata, Babylon Standard, 4 pages.

* cited by examiner

Primary Examiner—Bing Q. Bui
(74) Attorney, Agent, or Firm—William D. Wiese

(57) ABSTRACT

A system and method to provide secure communication across the untrusted public switched telephone network includes a set of rules in a security policy which are implemented by a virtual private switched telecommunications network (VPSTN). The VPSTN provides for intercepting voice calls and modifying their set-up to include a request for bearer capability to support a data call.

3 Claims, 34 Drawing Sheets

406

| EXTENSION GROUPS | ELEMENTS | COMMENT |
|---|---|---|
| ACCOUNTING VOICE | 210-402-6701<br>210-402-6702<br>210-402-6703 | ACCOUNTING VOICE EXTENSIONS |
| DAILY RECEIVABLE MODEM | 210-402-8000<br>210-402-8001<br>210-402-8002 | MODEM EXTENSIONS USED ONLY FOR INBOUND CALLS UPLOADING DAILY RECEIPT INFORMATION |
| VIDEO | 210-402-9000 | VTC EXTENSION |
| ENGINEERING VOICE | 210-402-66XX | ENGINEERING VOICE EXTENSIONS |
| ENGINEERING MODEM | 210-402-8004<br>210-402-8005 | APPROVED ENGINEERING DEPT. MODEM EXTENSIONS |
| ENGINEERING FAX | 210-402-7001<br>210-402-7002 | FAX EXTENSIONS USED BY THE ENGINEERING DEPT. |
| ENGINEERING | ENGINEERING VOICE<br>ENGINEERING FAX<br>ENGINEERING MODEM<br>VIDEO | ALL KNOWN AND APPROVED VOICE, FAX, MODEM, AND VTC EXTENSIONS USED BY THE ENGINEERING DEPT. |
| SALES | 210-402-6501<br>210-402-6502<br>210-402-6503 | SALES VOICE EXTENSIONS |
| EXEC STAFF VOICE | 210-402-6801<br>210-402-6802<br>210-402-6803 | ADMINISTRATION VOICE EXTENSIONS |
| EXEC STAFF FAX | 210-402-7003 | FAX EXTENSIONS USED BY EXEC STAFF ONLY |
| EXEC STAFF | EXEC STAFF VOICE<br>EXEC STAFF FAX<br>VIDEO | ALL KNOWN AND APPROVED VOICE, FAX, AND VTC EXTENSIONS USED BY THE EXEC STAFF |
| VOICE-ONLY | SALES<br>ENGINEERING VOICE<br>EXEC STAFF VOICE<br>ACCOUNTING VOICE | ALL VOICE-ONLY EXTENSIONS IN THE SAN ANTONIO FACILITY |
| FAX-ONLY | 210-402-7000<br>210-402-7004<br>210-402-7005<br>ENGINEERING FAX<br>EXEC STAFF FAX | ALL FAX-ONLY EXTENSIONS IN THE SAN ANTONIO FACILITY |

| | DAILY RECEIVABLE MODEM | |
|---|---|---|
| AUTHORIZED MODEM | ENGINEERING MODEM 210-402-8006 210-402-8007 210-402-8008 | KNOWN AND APPROVED MODEM EXTENSIONS |
| BRANCH OFFICES VOICE-ONLY | (ELEMENTS NOT SHOWN) | VOICE-ONLY EXTENSIONS AT BRANCH OFFICES |
| BRANCH OFFICES AUTHORIZED MODEM | (ELEMENTS NOT SHOWN) | APPROVED MODEM EXTENSIONS AT BRANCH OFFICES |
| BRANCH OFFICES FAX-ONLY | (ELEMENTS NOT SHOWN) | FAX EXTENSIONS AT BRANCH OFFICES |
| BRANCH OFFICES VIDEO | (ELEMENTS NOT SHOWN) | VTC EXTENSIONS AT BRANCH OFFICES |
| INTER-BRANCH | BRANCH OFFICES VOICE-ONLY BRANCH OFFICES AUTH. MODEM BRANCH OFFICES FAX-ONLY BRANCH OFFICES VIDEO | ALL KNOWN AND APPROVED VOICE, FAX, MODEM, AND VTC EXTENSIONS USED BY THE BRANCH OFFICES |
| VPSTN NON-SECURE | 210-402-8003 | FAILED VPSTN EXTENSIONS AND LINES--DENY FUTURE CALLS |
| XXX* | XXX* | ANY CALL TO/FROM COUNTRY X BASED ON COUNTRY CODE |

FIG. 6B

| SRB RULE | DIRECTION | SOURCE | DESTINATION | CALL TYPE | ACTION | TRACK | DATE | TIME | INSTALL ON | COMMENT |
|---|---|---|---|---|---|---|---|---|---|---|
| 1 | OUTBOUND | VPSTN NON-SECURE | ANY | ANY | DENY | EMAIL, PAGE, LOG | ANY | ANY | ALL | DENYS OUTBOUND CALL FROM EXTENSION OR LINE FOUND TO BE NON-SECURE |
| 2 | INBOUND | ANY | VPSTN NON-SECURE | ANY | DENY | EMAIL, PAGE, LOG | ANY | ANY | ALL | DENYS INBOUND CALL TO EXTENSION OR LINE FOUND TO BE NON-SECURE |
| 3 | INBOUND | ANY | FAX-ONLY | FAX | ALLOW | SECURE MODE, LOG | ANY | 9PM-6AM | ALL | ALLOWS AND SECURES INBOUND CALL TO FAX-ONLY GROUP BETWEEN 9PM AND 6AM, LOGS CALL |
| 4 | INBOUND | ANY | DAILY RECEIVABLE | MODEM | ALLOW | SECURE MODE, LOG | ANY | ANY | SAN ANTONIO | ALLOWS AND SECURES INBOUND MODEM CALL TO DAILY RECEIVABLE GROUP, LOGS CALL |
| 5 | OUTBOUND | ANY | XXX * | VOICE, FAX, MODEM, VTC | ALLOW | SECURE MODE, LOG | ANY | ANY | ALL | ALLOWS AND SECURES CALL TO COUNTRY X, LOGS CALL |

FIG. 7A

| | | | | | | | |
|---|---|---|---|---|---|---|---|
| 6 | INBOUND | XXX * | ANY | VOICE, FAX, MODEM, VTC | ALLOW | SECURE MODE, LOG | ANY | ANY | ALL | ALLOWS AND SECURES CALL FROM COUNTRY X, LOGS CALL |
| 7 | ANY | INTER-BRANCH | INTER-BRANCH | VOICE, FAX, MODEM, VTC | ALLOW | SECURE MODE, LOG | ANY | ANY | ALL | ALLOWS AND SECURES INTER-BRANCH CALL, LOGS CALL |
| 8 | OUTBOUND | EXEC STAFF, ENGINEERING | ANY | VOICE, FAX, MODEM, VTC | ALLOW | SECURE MODE, LOG | ANY | ANY | ALL | ALLOWS AND SECURES CALL FROM EXEC STAFF AND ENG. GROUPS, LOGS CALL |
| 9 | INBOUND | ANY | EXEC STAFF, ENGINEERING | VOICE, FAX, MODEM, VTC | ALLOW | SECURE MODE, LOG | ANY | ANY | ALL | ALLOWS AND SECURES CALL TO EXEC STAFF AND ENG. GROUPS, LOGS CALL |
| 10 | ANY | ANY | ANY | ANY | DENY | EMAIL, LOG | ANY | ANY | ALL | CATCH, DENY, ALERT, AND LOG ALL OTHER CALLS |

FIG. 7B

| RRP RULE | CURRENT GROUP | CALL TYPE | ATTEMPT | RESULT | ACTION | TRACK | ADJUST POLICY? | MOVE TO | INSTALL ON | COMMENT |
|---|---|---|---|---|---|---|---|---|---|---|
| 1 | FAX-ONLY | FAX | SECURE MODE | SUCCESS | ALLOW | LOG | NO | N/A | ALL | SUCCESSFULLY SECURED INBOUND FAX CALL, CALL ALLOWED |
|   |   |   |   | FAILED | DENY | TONE, EMAIL, LOG | NO | N/A |   | FAILED TO SECURE INBOUND FAX CALL, CALL DENIED |
| 2 | DAILY RECEIVABLE | MODEM | SECURE MODE | SUCCESS | ALLOW | LOG | NO | N/A | ALL | SUCCESSFULLY SECURED INBOUND MODEM CALL, CALL ALLOWED |
|   |   |   |   | FAILED | DENY | TONE, EMAIL, PAGE, LOG | YES | VPSTN NON-SECURE |   | FAILED TO SECURE INBOUND MODEM CALL, CALL DENIED, EXTENSION MOVED AND SECURITY POLICY ADJUSTED |
| 3 | XXX * | VOICE, VTC | SECURE MODE | SUCCESS | ALLOW | TONE, LOG | NO | N/A | ALL | SUCCESSFULLY SECURED VOICE/VTC CALL, CALL ALLOWED |
|   |   |   |   | FAILED | DENY | MESSAGE, EMAIL, LOG |   |   |   | FAILED TO SECURE VOICE/VTC CALL, CALL DENIED |

FIG. 8A

| | | | | | | | |
|---|---|---|---|---|---|---|---|
| 4 | XXX * | FAX, MODEM | SECURE MODE | SUCCESS | ALLOW | LOG | NO | N/A | ALL | SUCCESSFULLY SECURED FAX/MODEM CALL, CALL ALLOWED |
| | | | | FAILED | DENY | TONE, EMAIL, LOG | NO | N/A | | FAILED TO SECURE FAX/MODEM CALL, CALL DENIED |
| 5 | INTER-BRANCH | VOICE, VTC | SECURE MODE | SUCCESS | ALLOW | LOG | NO | N/A | ALL | SUCCESSFULLY SECURED VOICE/VTC CALL, CALL ALLOWED |
| | | | | FAILED | DENY | MESSAGE, EMAIL, LOG | NO | N/A | | FAILED TO SECURE VOICE/VTC CALL, CALL DENIED |
| 6 | INTER-BRANCH | FAX, MODEM | SECURE MODE | SUCCESS | ALLOW | LOG | NO | N/A | ALL | SUCCESSFULLY SECURED FAX/MODEM CALL, CALL ALLOWED |
| | | | | FAILED | DENY | TONE, EMAIL, LOG | NO | N/A | | FAILED TO SECURE FAX/MODEM CALL, CALL DENIED |
| 7 | EXEC STAFF, ENGI-NEERING | VOICE, VTC | SECURE MODE | SUCCESS | ALLOW | LOG | NO | N/A | ALL | SUCCESSFULLY SECURED VOICE/VTC CALL, CALL ALLOWED |
| | | | | FAILED | | MESSAGE, EMAIL, LOG | NO | N/A | | FAILED TO SECURE VOICE/VTC CALL, CALL ALLOWED WITH MESSAGE |

| | | | | | | | |
|---|---|---|---|---|---|---|---|
| 8 | EXEC STAFF, ENGI-NEERING | FAX, MODEM | SECURE MODE | SUCCESS | ALLOW | LOG | NO | N/A | ALL | SUCCESSFULLY SECURED FAX/MODEM CALL, CALL ALLOWED |
| | | | | FAILED | | TONE, LOG | | | | FAILED TO SECURE FAX/MODEM CALL, CALL ALLOWED WITH TONE |
| 9 | ANY | ANY | ANY | SUCCESS | DENY | EMAIL, LOG | NO | N/A | ALL | ALL OTHER CALLS DENIED AND LOGGED |
| | | | | FAILED | | | | | | |

FIG. 8C

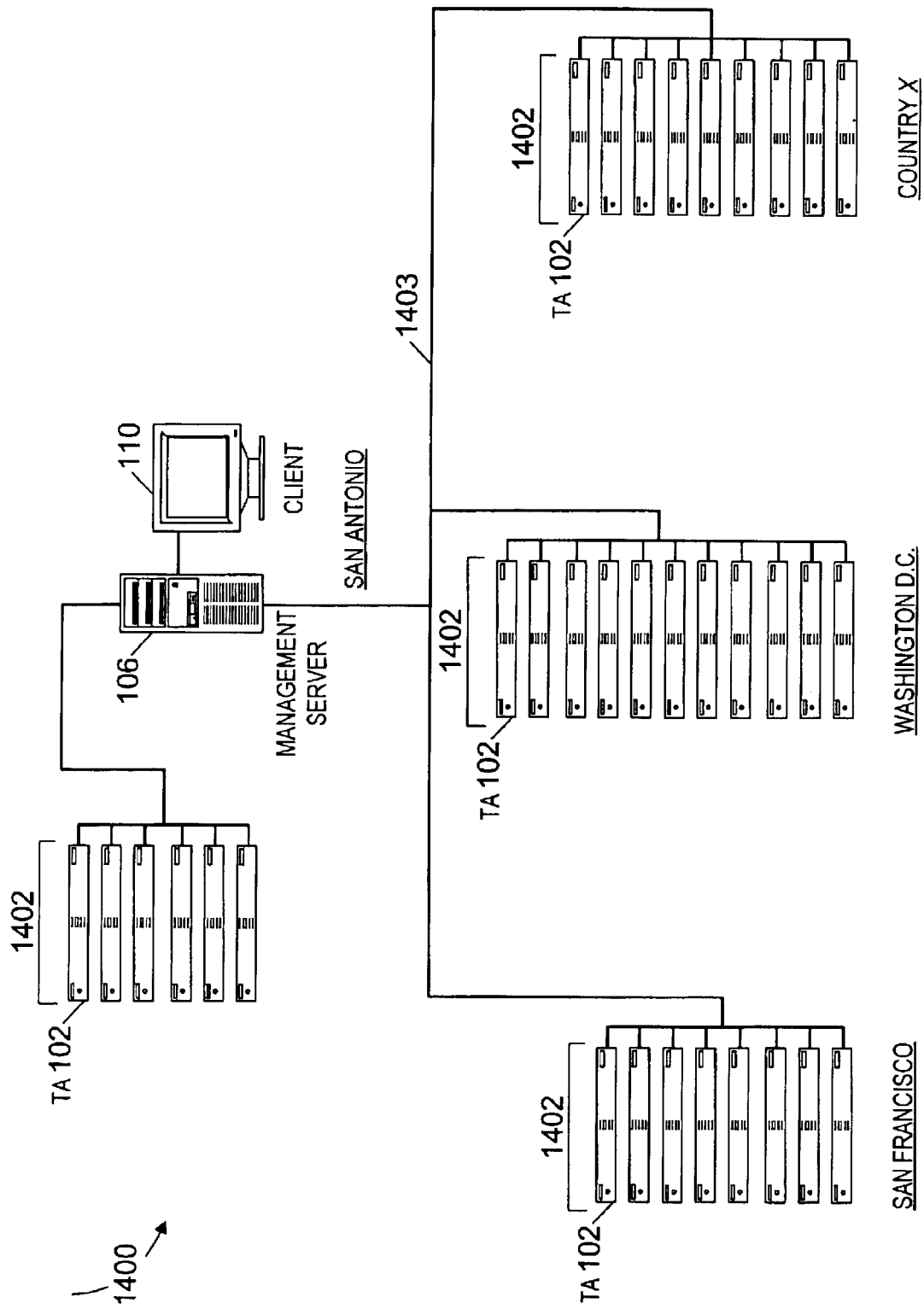

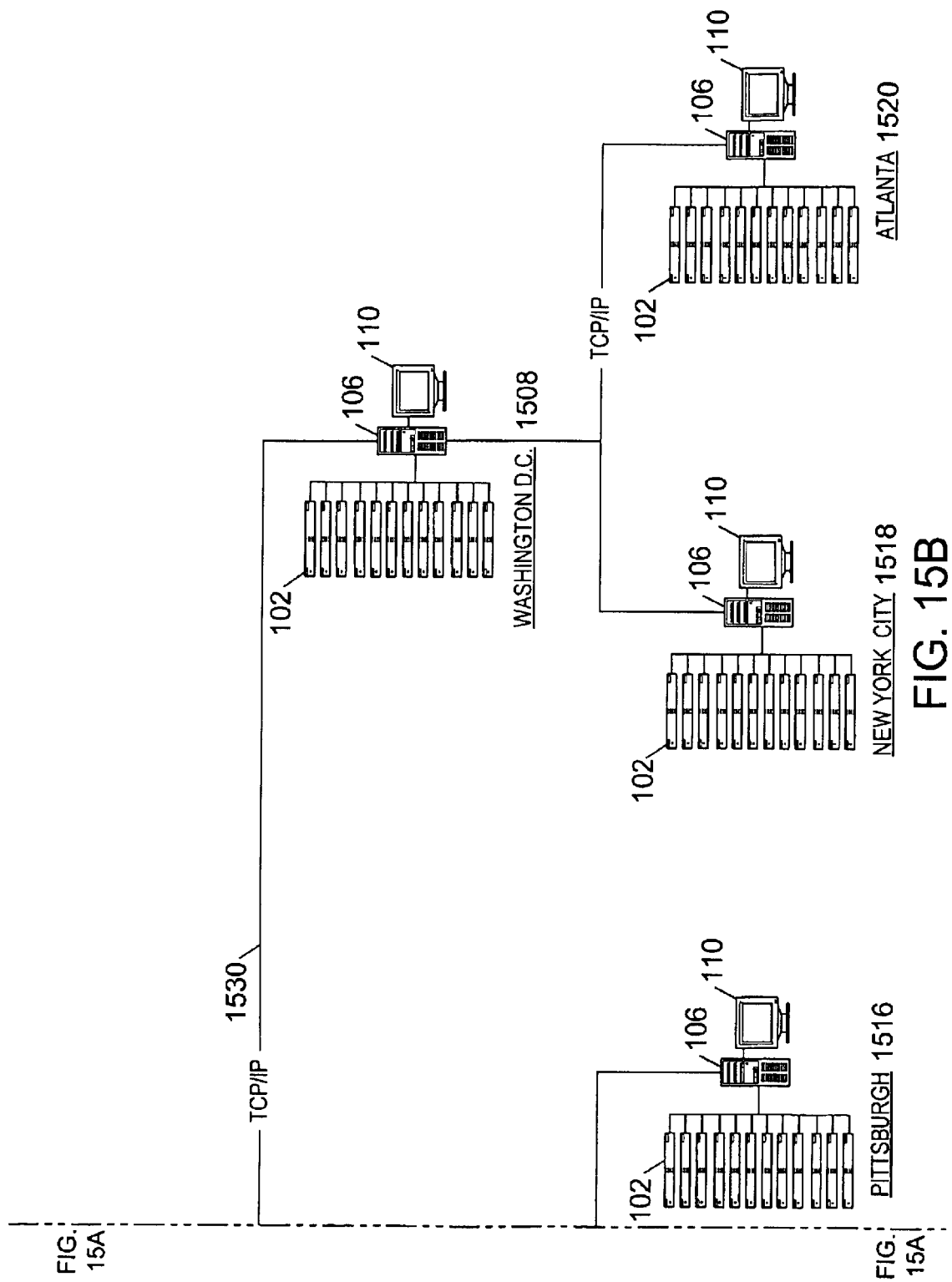

| SRB RULE | CLASS | DIRECTION | SOURCE | DESTINATION | CALL TYPE | ACTION | TRACK | DATE | TIME | INSTALL ON | COMMENT |
|---|---|---|---|---|---|---|---|---|---|---|---|
| 1 | R | OUTBOUND | VPSTN NON-SECURE | ANY | ANY | DENY | ROUTE, EMAIL(F), PAGE(F), LOG | ANY | ANY | ALL | DENYS OUTBOUND CALL FROM EXTENSION OR LINE FOUND TO BE NON-SECURE, ROUTES LOG UPWARD |
| 2 | R | INBOUND | ANY | VPSTN NON-SECURE | ANY | DENY | ROUTE, EMAIL(F), PAGE(F), LOG | ANY | ANY | ALL | DENYS INBOUND CALL TO EXTENSION OR LINE FOUND TO BE NON-SECURE, ROUTES LOG UPWARD |
| 3 | L | INBOUND | ANY | FAX-ONLY | FAX | ALLOW | SECURE MODE, LOG | ANY | 9PM-6AM | SAN ANTONIO | ALLOWS AND SECURES INBOUND CALL TO FAX-ONLY GROUP BETWEEN 9PM AND 6AM, LOGS CALL, NO ROUTING UPWARD |

| | | | | | | | | | |
|---|---|---|---|---|---|---|---|---|---|
| 4 | L | INBOUND | ANY | DAILY RECEIVABLE | MODEM | ALLOW | SECURE MODE, LOG | ANY | ANY | SAN ANTONIO | ALLOWS AND SECURES INBOUND MODEM CALL TO DAILY RECEIVABLE GROUP, LOGS CALL, NO ROUTING UPWARD |
| 5 | R | OUTBOUND | ANY | XXX * | VOICE, FAX, MODEM, VTC | ALLOW | SECURE MODE, LOG | ANY | ANY | ALL | ALLOWS AND SECURES CALL TO COUNTRY X, LOGS CALL, NO ROUTING UPWARD |
| 6 | R | INBOUND | XXX * | ANY | VOICE, FAX, MODEM, VTC | ALLOW | SECURE MODE, LOG | ANY | ANY | ALL | ALLOWS AND SECURES CALL FROM COUNTRY X, LOGS CALL, NO ROUTING UPWARD |
| 7 | R | ANY | INTER-BRANCH | INTER-BRANCH | VOICE, FAX, MODEM, VTC | ALLOW | SECURE MODE, LOG | ANY | ANY | ALL | ALLOWS AND SECURES INTERBRANCH CALL, LOGS CALL, NO ROUTING UPWARD |

FIG. 15D

| | | | | | | | | |
|---|---|---|---|---|---|---|---|---|
| 8 | O | OUTBOUND | EXEC STAFF, ENGINEERING | ANY | VOICE, FAX, MODEM, VTC | ALLOW | SECURE MODE, LOG | ANY | ANY | ALL | ALLOWS AND SECURES CALL FROM EXEC STAFF AND ENG. GROUPS, LOGS CALL, NO ROUTING UPWARD |
| 9 | O | INBOUND | ANY | EXEC STAFF, ENGINEERING | VOICE, FAX, MODEM, VTC | ALLOW | SECURE MODE, LOG | ANY | ANY | ALL | ALLOWS AND SECURES CALL TO EXEC STAFF AND ENG. GROUPS, LOGS CALL, NO ROUTING UPWARD |
| 10 | R | ANY | ANY | ANY | ANY | DENY | ROUTE, EMAIL(F), LOG | ANY | ANY | ALL | CATCH, DENY, ALERT, AND LOG ALL OTHER CALLS, ROUTES LOG UPWARD |

FIG. 15E

VIRTUAL PRIVATE SWITCHED TELECOMMUNICATIONS NETWORK

CROSS-REFERENCE TO RELATED APPLICATIONS

This application claims the benefit under Title 35 United States Code 119(e) from U.S. patent application Ser. No. 10/357,249, filed Feb. 3, 2003, entitled "Telephony Security System" and claims the benefit from U.S. patent application Ser. No. 09/907,089, filed Jul. 17, 2001, entitled "Telephony Security System" and claims benefit from U.S. patent application Ser. No. 09/709,592, filed Nov. 10, 2000, entitled "A System and Method for Encapsulation, Compression and Encryption of PCM Data" and claims benefit from U.S. patent application Ser. No. 10/200,969, filed Jul. 23, 2002, entitled "Encapsulation, Compression and Encryption of PCM Data" and claims benefit from U.S. patent application Ser. No. 10/625,311, filed Jul. 23, 2003, entitled "An Improved Virtual Private Switched Telecommunications Network", all assigned to the assignee of the present invention and incorporated herein by reference.

TECHNICAL FIELD

The invention relates generally to telecommunications access control systems and more particularly, to a system and method whereby a virtual private switched telecommunications network is autonomously constructed between at least two in-line devices.

BACKGROUND OF THE INVENTION

In the past several years, as interception and penetration technologies have multiplied, information assets have become increasingly vulnerable to interception while in transit across untrusted networks between the intended parties. The increasing prevalence of digital communications systems has led to the widespread use of digital encryption systems by governments and enterprises concerned with communications security. These systems have taken several forms, from data Virtual Private Networks (VPN), to secure voice/data terminals.

Enterprises are communicating using voice, fax, data modem, and video across the untrusted Public Switched Telephone Network (PSTN). Unfortunately, whereas a data VPN uses automated encryption and tunneling processes to protect information traveling over the Internet, a data VPN is not designed to protect voice, fax, modem, and video calls over the untrusted PSTN. This deficiency leaves solutions for creating safe tunnels through the PSTN to be primarily manual, requiring user participation at both ends to make a call secure (e.g., with the use of secure voice/data terminals, such as Secure Telephone Units (STU-IIIs), Secure Telephone Equipment (STE), and hand-held telephony encryption devices).

Additionally, secure voice/data terminals are point-to-point devices securing only one end-user station per device; so secure voice/data terminals cannot protect the vast majority of calls occurring between users who do not have access to the equipment. And although there may be policies that specifically prohibit it, sensitive material can be inadvertently discussed on non-secure phones and thereby distributed across the untrusted PSTN.

Secure voice/data terminals cannot implement an enterprise-wide, multi-tiered policy-based enforcement of a corporate security policy, establishing a basic security structure across an enterprise, dictated from the top of the tier downward. Neither can secure voice/data terminals implement an enterprise-wide, multi-tiered policy-based enforcement of selective event logging and consolidated reporting (i.e., multi-tiered policy-based security event notification) to be relayed up the tier.

Lastly, secure voice/data terminals cannot provide call event logs detailing information about secure calls. Therefore, a consolidated detailed or summary report of a plurality of call event logs can not be produced for use by security personnel and management in assessing the organization's security posture.

Clearly, there is a need for a system and method to provide secure access across the untrusted PSTN through telephony resources that can be initiated by a security policy defining actions to be taken based upon one or more attributes of the call, providing secured communications operating as a data call at 64 Kbps, with automatic adjustment to circuits operating at slower transfer rates, and providing multi-tiered policy-based enforcement capabilities, multi-tiered policy-based security event notification capabilities, and visibility into security events.

As used herein, the following terms carry the connotations described below:

Data VPN is understood to refer to a shared or public packet data network wherein privacy and security issues are mitigated through the use of a combination of authentication, encryption, and tunneling.

Tunneling is understood to refer to provision of a secure, temporary path over an Internet Protocol (IP)-based network by encapsulating encrypted data inside an IP packet for secure transmission across an inherently insecure IP network, such as the Internet.

Secure is understood to refer to the use of encryption to provide telecommunications privacy and security between two devices across an untrusted network (as discussed herein and specifically with reference to FIGS. 1, 11A–11D, 12, 13A–13E, and 16); or the result thereof.

Data call is understood to refer to a call using a bearer service that is circuit mode, with information transfer rates such as 64 Kbps, or 64 Kbps adapted to 56 Kbps, that uses unrestricted or restricted digital information transfer capability. For simplicity, the explanations herein deal with only unrestricted digital information at 64 Kbps and unrestricted digital information at 64 Kbps adapted to 56 Kbps, referred to as "data at 64 Kbps" and "data at 56 Kbps", respectively.

Voice call is understood to refer to a call using a bearer service that is circuit mode, with speech or 3.1 kHz audio information transfer capability, and user information layer 1 protocol G.711 mu-law or A-law.

64K data secure mode is understood to refer to the administrator-allowable secure mode whereby the present invention autonomously encrypts and transmits as a 64 Kbps data call either: (1) a data call requiring a transfer rate less than 64 Kbps, or (2) a voice call; the circuit for which is requested by the present invention in accordance with the security policy.

56K data secure mode is understood to refer to the administrator-allowable secure mode whereby the present invention autonomously encrypts and transmits as a 56 Kbps data call either: (1) a data call requiring a transfer rate less than 64 Kbps, or (2) a voice call; the circuit for which is requested by the present invention in accordance with the security policy. Although administrator-allowable data secure modes with other transfer rates may be used, for simplicity, the explanations herein deal with data secure modes at 64 Kbps and 56 Kbps.

56K voice secure mode is understood to refer to the administrator-allowable secure mode whereby the present invention autonomously encrypts and transmits as a voice call with a transfer rate of 56 Kbps either: (1) a data call requiring a transfer rate less than 64 Kbps, or (2) a voice call; the circuit for which is requested by the present invention in accordance with the security policy. Although administrator-allowable voice secure modes with other transfer rates may be used, for simplicity, the explanations herein deal with voice secure modes at 56 Kbps, 48 Kbps, 40 Kbps, 32 Kbps, and 24 Kbps, referred to as either "56K voice secure mode", "48K voice secure mode", etc.; or "voice at 56 Kbps", "voice at 48 Kbps", etc.

SUMMARY OF THE INVENTION

A system and method to provide secure access across the untrusted PSTN is described, hereafter to be referred to as a Virtual Private Switched Telecommunications Network (VPSTN). The VPSTN creates a virtual private network, i.e., "secures" telecommunications, across a public untrusted network between two in-line devices by encrypting calls in accordance with a security policy. The security policy defines actions to be taken based upon one or more attributes of the call.

If the local security policy dictates that a secure call is to be initiated by the local in-line device, and the attempt to conduct the call in secure mode is acknowledged by the remote in-line device (in accordance with the security policy at the remote location), the VPSTN will initiate encryption on the bearer channel using select administrator-allowed secure modes.

More specifically, the initiating local in-line device intercepts and modifies the call setup message from the PBX, and changes its request for bearer capability to support either a data call at a transfer rate less than 64 Kbps or a voice call to a request for bearer capability to support a data call at 64 Kbps (data at 64 Kbps). Because the call is sent across the PSTN as a data call, network echo suppressors, digital pads, and other digital impairments are not present, and therefore do not need to be disabled or taken into account when transmitting. If the in-line device determines the call setup message from the PBX requests bearer capability for a data call at 64 Kbps, the setup message is passed on to the PSTN without modification and the call is not conducted in secure mode. In an alternate embodiment, the VPSTN passes the call setup message on to the PSTN without modification and the call is not conducted in secure mode if the PBX requests bearer capability for a data call, regardless of information transfer rate.

Continuing with the preferred embodiment, if the data call fails due to network issues (such as a trunk is not capable of supporting data at 64 Kbps), the VPSTN autonomously falls back through each of its allowed data secure modes (based on administrator configuration and in accordance with the security policy) until the call is connected.

If all allowed data secure modes are exhausted, the VPSTN autonomously falls back to allowed voice secure modes (based on administrator configuration and in accordance with the security policy), which utilizes Adaptive Differential Pulse Code Modulation (ADPCM) compression, echo canceller disable tone, and processes similar to Digital Impairment Learning (DIL). Voice secure modes may include voice at 56 Kbps using no compression, and voice at 48 Kbps, voice at 40 Kbps, voice at 32 Kbps, and voice at 24 Kbps using 5-bit, 4-bit, 3-bit, and 2-bit ADPCM respectively. Using the least amount of compression achieves the highest quality signal. Alternatively, in accordance with the security policy, the VPSTN can transmit the call using clear voice (without encryption).

Some primary advantages of the disclosed system and method are: (1) secure transport of voice, fax, modem, and VTC calls across the PSTN; (2) automatic discovery of called and calling party's capability to support secured communications; (3) automatic discovery of a digital signal level 0 (DS-0) channel's line impairments and capability to support secured communications; (4) provision of secured communications with automatic disabling of secured communications responsive to a PBX's request for a 64 Kbps data call; (5) automatic compression and decompression of the payload portion of the call when providing secured communications on channels operating at 56 Kbps or slower; (6) operator-transparency, i.e., neither call party is required to take any specific actions in order to initiate or conduct secure communications; (7) provision of secured communication for multiple end-user stations per device (i.e., secured communication is selectively provided for all calls routed on trunks in which the in-line device is deployed); (8) implementation and enforcement of a security policy designating that select calls are conducted in secure mode based on one or more designated attributes of the call; (9) implementation and enforcement of a security policy designating that select calls are allowed or denied and other designated actions are performed responsive to the success or failure to conduct a call in secure mode; (10) creation of a VoIP-compatible packet from the data contained in the TDM serial stream; (11) encapsulation of a VoIP-compatible packet within the secured media payload to support transport over the synchronous time division multiplexed PSTN network; (12) automatic synchronization of packets from one or more diverse remote VPSTN-compatible systems; (13) implementation and enforcement of a security policy designating that select calls are allowed or denied and other designated actions are performed based on one or more designated attributes of the call; (14) implementation and enforcement of a basic security structure and policy across an enterprise, dictated from the top of the tier downward; and (15) implementation and enforcement of an enterprise-wide policy of selective event logging and consolidated reporting to be relayed up the tier.

Some secondary advantages of the disclosed system and method are: (1) policy-based selection of static secret session keys, key exchange mechanisms, and encryption algorithms based on one or more designated attributes of the call; (2) secured communications transparent to the transcoding within the PSTN; (3) automatic compensation when transcoding occurs within the PSTN during secure transport; (4) selectively provided audible feedback to the calling or called parties indicating the secure state of the call; (5) a message channel transported separate from and concurrent with the secured payload portion of the call; (6) the message channel stays active throughout the duration of the call; (7) secure communications can be initiated or discontinued while the call is in progress; (8) automatic generation and exchange of new keys for each session; (9) automatic disabling of secured communications responsive to detection of designated call-type.

Therefore, in accordance with the previous summary, objects, features, and advantages of the present invention will become apparent to one skilled in the art from the subsequent description and the appended claims taken in conjunction with the accompanying drawings.

BRIEF DESCRIPTION OF THE DRAWINGS

A better understanding of the system and method for autonomously constructing a virtual private switched telecommunications network between at least two in-line devices may be had by reference to the drawing figures wherein:

FIGS. 6A and 6B are a table illustrating a portion of an example user group listing for use by the virtual private switched telecommunications network of FIG. 1;

FIGS. 7A and 7B are a table illustrating a portion of an example security rule base for use by the virtual private switched telecommunications network of FIG. 1;

FIGS. 8A, 8B, and 8C are a table illustrating a portion of an example result response policy for use by the virtual private switched telecommunications network of FIG. 1;

FIG. 14 is a schematic block diagram illustrating distributed deployment of the virtual private switched telecommunications network of FIG. 1;

FIGS. 15A and 15B are a schematic block diagram illustrating deployment of the virtual private switched telecommunications network of FIG. 1 for multi-tiered policy-based enforcement of a security policy across a large, globally distributed enterprise;

FIGS. 15C, 15D, and 15E are a table illustrating a portion of an example security rule base for use in implementing multi-tiered policy-based enforcement of the security policy.

DETAILED DESCRIPTION OF THE PREFERRED EMBODIMENTS

The present invention can be described with several examples given below. It is understood, however, that the examples below are not necessarily limitations to the present invention, but are used to describe typical embodiments of operation.

Virtual Private Switched Telecommunications Network

Figure 1:
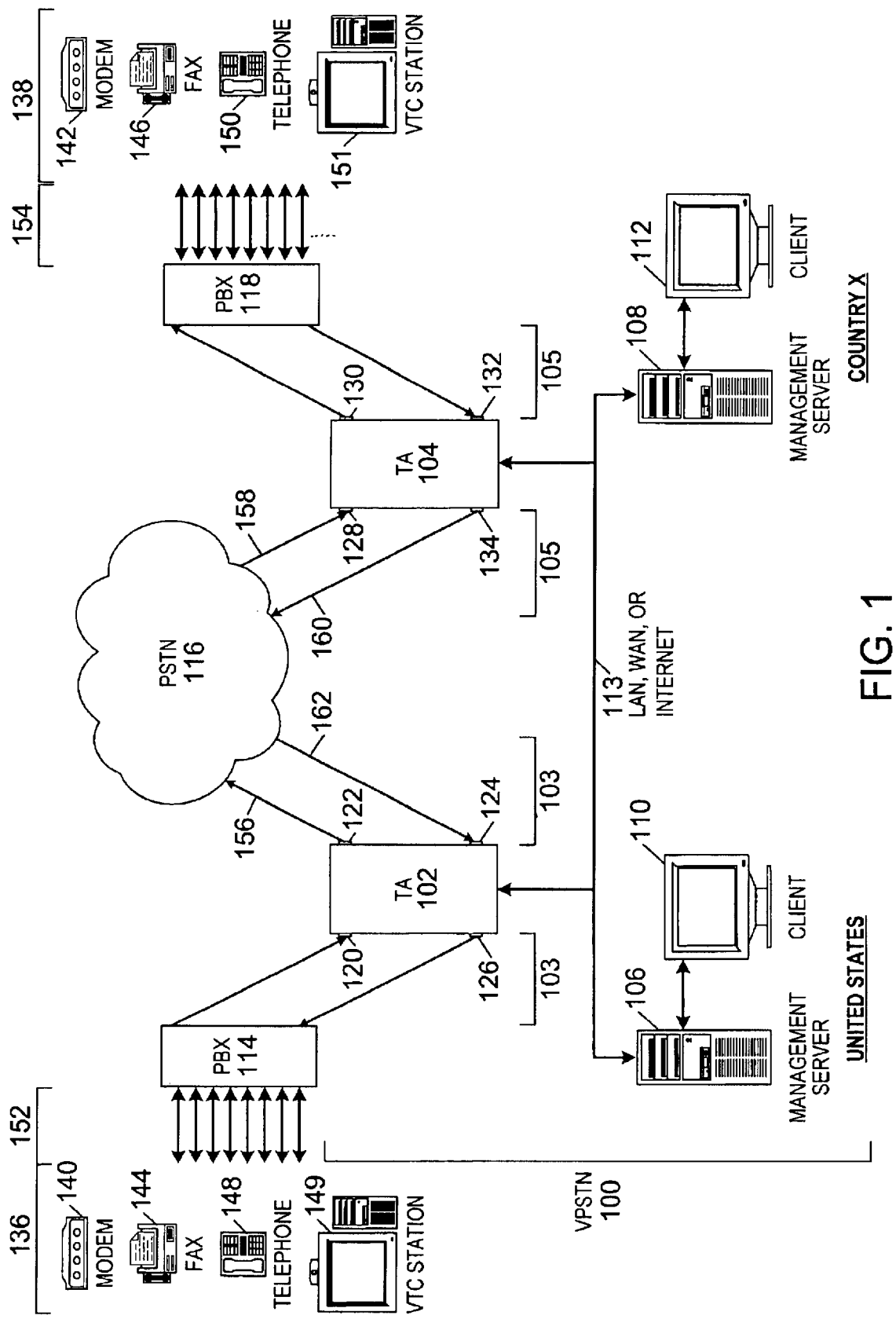
FIG. 1 is a schematic block diagram illustrating an exemplary virtual private switched telecommunications network of the present invention.

FIG. 1 is a schematic block diagram of an exemplary Virtual Private Switched Telecommunications Network (VPSTN) 100 of the present invention, similar to the telecommunications firewall implemented as shown and described in U.S. patent application Ser. No. 09/210,347, now U.S. Pat. No. 6,249,575 B1. The VPSTN 100 can be combined with the telecommunications firewall to act as an integrated VPSTN 100 and a firewall simultaneously, or to result in a mixture of capabilities of each device.

The VPSTN 100 includes at least two in-line devices such as Telephony Appliances (TA) 102 and 104, management servers 106 and 108, and clients 110 and 112, all interconnected by a Transmission Control Protocol/Internet Protocol (TCP/IP)-based Local Area Network (LAN), Wide Area Network (WAN), or the Internet (any of which are identified herein with numeral 113), for interaction as described below. The inventive functions described herein as being performed by the TA 102, management server 106, and client 110 are similarly performed by the TA 104, management server 108, and client 112, as well as subsequent embodiments of telephony appliances, management servers and clients discussed herein.

The VPSTN 100 provides secure communication between two geographically separate, even globally distributed, locations. The TA 102 and 104 are installed in-line on a DS-1 circuit. The capacity (i.e., quantity and speed of channels) on a DS-1 circuit varies relative to global location. For instance, a Trunk level 1 (T1) or J1 line (or trunk), used in North America and Japan respectively, operates at 1,544,000 bits per second (bps) and carries 24 TDM DS-0 channels. Additionally, in North America, an Integrated Services Digital Network Primary Rate Interface (ISDN PRI) trunk may carry either 23 TDM DS-0 channels and one signaling channel, or 24 TDM DS-0 channels. In Europe, an E1 trunk operates at 2,048,000 bps and carries 30 TDM DS-0 channels in addition to 2 signaling channels. A DS-0 channel operates at 64,000 bps, which is the worldwide standard speed for digitizing one voice conversation using Pulse Code Modulation (PCM) and sampling the voice 8,000 times per second and encoding the result in an 8-bit code (8×8000=64,000 bps). An additional variation relative to global location is the difference in the form of PCM encoding. Typically, mu-law is the standard used in North American and Japanese telephone networks, and A-law is used in European and most other national public switched telephone networks. Transcoding, or modifying the data stream from mu-law to A-law so that it can be carried via a different network, may cause the PCM value to change. Regardless of whether the T1, J1, ISDN PRI, E1, etc., trunk carrying the DS-1 circuit between the VPSTN 100 and the PSTN is the same on both sides of the PSTN (i.e., T1 trunk to PSTN to T1 trunk, as may occur with calls conducted within North America), or is some combination of trunk types (i.e., T1 trunk to PSTN to E1 trunk, as would occur with an international call between North America and Europe), all operations are transparent to the individuals placing and receiving the call (i.e., neither call party is required to take any specific actions in order to initiate or conduct a secure call).

Figure 2:
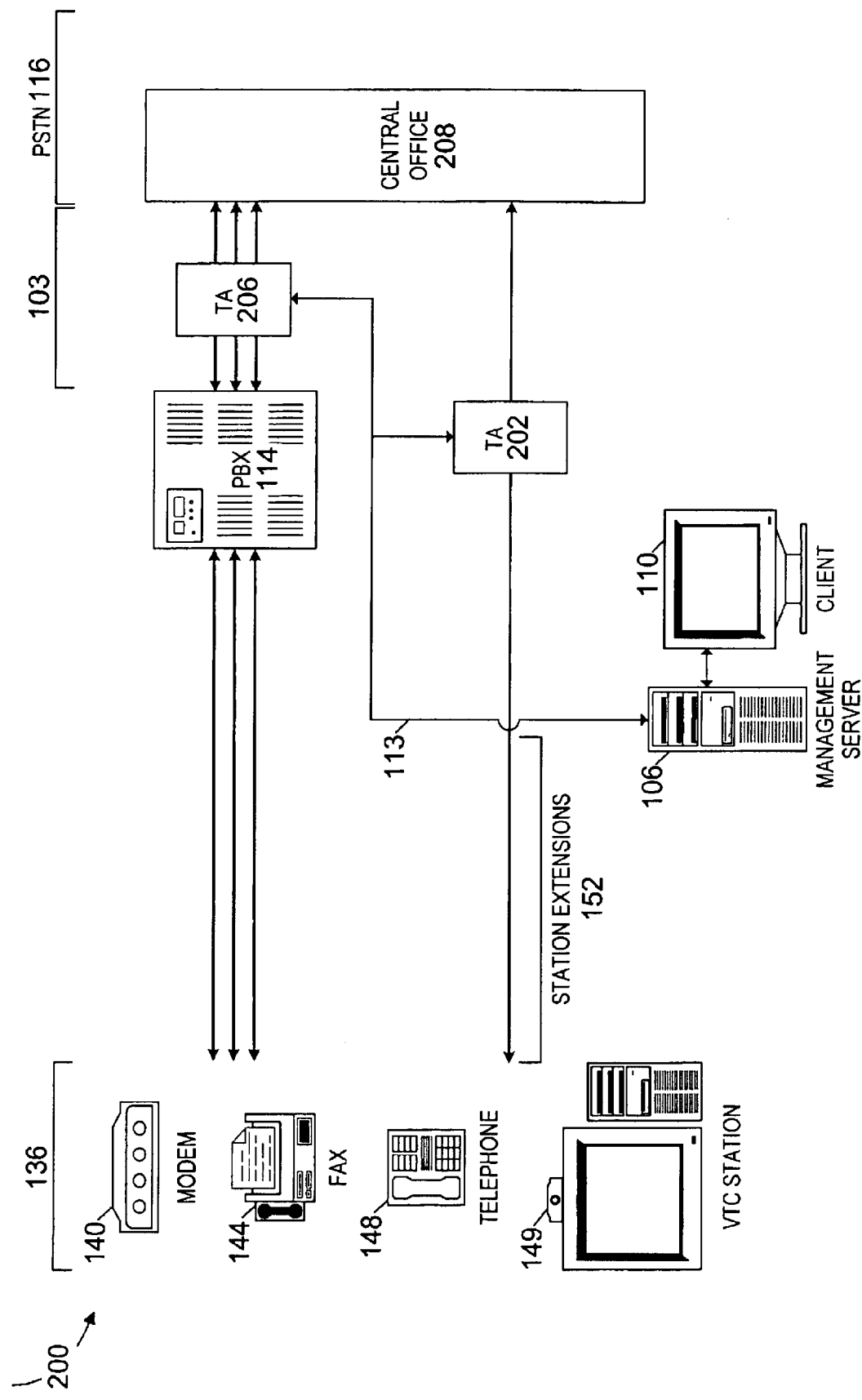
FIG. 2 is a schematic block diagram illustrating a portion of the exemplary virtual private switched telecommunications network of FIG. 1.

The TA 102 is installed in-series on a DS-1 circuit 103, within the enterprise (as shown in FIG. 2), in locations such as between a Public Branch eXchange (PBX). 114 and a Public Switched Telephone Network (PSTN) 116. The TA 104 is similarly installed in-series on the DS-1 circuit 105, in locations such as between the PSTN 116 and a PBX 118. The TA 102 has two input and two output ports; specifically, a PBX-in port 120, a PSTN-out port 122, a PSTN-in port 124, and a PBX-out port 126. Similarly, the TA 104 has two input and two output ports; specifically, a PSTN-in port 128, a PBX-out port 130, a PBX-in port 132, and a PSTN-out port 134.

FIG. 1 shows the full-duplex nature of the VPSTN 100 with the transmit channel and the receive channel fully encrypted and decrypted, respectively. The TA 102 and 104 each control operational aspects of the transmit channels they produce. Specifically, the TA 102 controls the transmit channel that makes up links from the PSTN-out port 122 to the PSTN 116 and from the PSTN 116 to the PSTN-in port 128, represented by numerals 156 and 158, respectively. The TA 104 controls the transmit channel that makes up links from the PSTN-out port 134 to the PSTN 116 and from the PSTN 116 to the PSTN-in port 124, represented by numerals 160 and 162, respectively. Therefore, the TA 102 controls the TA 104 receive channel (the links 156 and 158) and the TA 104 controls the TA 102 receive channel (links 160 and 162).

The client 110 and 112 is a point of user-interface for the system administrator configuring a security policy, displaying and viewing real-time alerts, viewing real-time event logs, printing event logs and consolidated reports, and other operational features of the VPSTN 100.

As discussed in more detail with reference to FIGS. 3, 4, 7A–7B, and 8A–8C, a security policy is a sequential listing of rules that define whether certain calls to or from an end-user station 136 or 138 will be allowed, denied (terminated), conducted in secure mode, reported, logged, etc. The security policy also defines whether other additional actions such as sending a tone or message to call parties to, for example, indicate the ability or inability to conduct the call in secure mode, and sending notifications such as electronic mail notification, pager alerting, console messaging, or a Simple Network Management Protocol (SNMP) trap notification are required.

The management server 106 and 108 receive the security policy from the client 110 and 112, and push a copy of the security policy to the TA 102 and 104, respectively. The management server 106 and 108 are connected to the TA 102 and 104, respectively, for consolidation and management of reports and call logs. Historical logging and archiving of calls, pursuant to a predetermined security policy, may be accomplished on the local management server, or stored via a network-accessible log server (not shown).

The TA 102 and 104 receive the security policy, and as appropriate, monitor inbound and outbound calls, allow, deny, or otherwise manipulate calls, including conducting calls in secure mode, all pursuant to the security policy, and based on at least one call attribute e.g., call source, call destination, or call type (voice, fax, modem, VTC, etc.).

The TA 102 and 104 may combine call-progress monitoring, caller-id (CND) and/or Automatic Number Identification (ANI) decoding, digital line protocol reception, decoding, demodulation, pulse dial detection, Dual-Tone MultiFrequency (DTMF) and MultiFrequency (MF) tone detection, compression, encryption, decryption, and decompression with microprocessor control, access-control logic, and call-interrupt circuitry for implementing the desired VPSTN functions. The inventive functions performed by the TA 102 and 104, as further described below, maybe implemented with commercially available components, as will be understood by those skilled in the art. While also not shown, it is understood that the TA 102 and 104 are controlled by computer programming instructions stored in memory within the TA 102 and 104, and which may also be stored in memory within other components of the VPSTN 100 connected to the TA 102 and 104.

Also in FIG. 1, numerals 136 and 138 designate end-user stations, representing as examples, one or more modems 140 and 142, fax machines 144 and 146, telephones 148 and 150, and VTC stations 149 and 151,which may send or receive calls over the VPSTN 100. The modems 140 and 142 may support a desktop or portable personal computer, for example.

Individual station extensions 152 and 154 connect the end-user stations 136 and 138 to the PBX 114 and 118, respectively, or to a Central Office (CO) 208 within the PSTN 116 (as shown in FIG. 2).

For clarity and simplicity of explanation, FIG. 1 and subsequent figures (except when described otherwise), show a complete DS-1 circuit connected between the TA 102, the PSTN 116, and the TA 104; although typically, the DS-0 channels that make up the DS-1 circuit may be individually switched by the PSTN 116 to different locations, relevant to call destination. It is understood that a security policy can be configured such that the VPSTN 100 is selectively applied to calls, based on at least one call attribute such as the call direction (inbound, outbound); the call source number; the call destination number; call type; the date; the time; the call duration (not shown), etc., as shown in FIGS. 7A–7B. Additionally, in the examples provided, voice is the media transported, although the present invention also provides secure transport for media in addition to voice, including fax, modem and VTC. The examples are also based on use of the Triple Data Encryption Standard (3DES) encryption algorithm, although other encryption algorithms, including DES, Advanced Encryption Standard (AES), and International Data Encryptions Algorithm (IDEA) may be used.

Additionally, the system and method supports distributed deployment, as well as a system and method of multi-tiered policy-based enforcement of a security policy, as described later with reference to FIG. 14 and FIGS. 15A–15G.

FIG. 2 is a schematic block diagram of a portion 200 of the exemplary VPSTN 100 of FIG. 1. Numerals 202 and 206 represent configurations whereby connectivity of the TA 102 may be accomplished; including any combination of one or more of either: the TA 202 (on direct lines from the CO 208); and the TA 206 (on the trunk-side of the PBX 114). The TA 202 and the TA 206, the management server 106, and client 110, are connected by the LAN, the WAN, or the Internet 113.

As represented by the TA 202 and its corresponding lines, it is understood that the TA 202 is configured to map one or more circuits through the TA 202 to their direct connection to the CO 208. For clarity and simplicity of explanation, subsequent references to TA 102 shall refer to either of the TA 202 and 206, except when specifically described otherwise.

Figure 3:
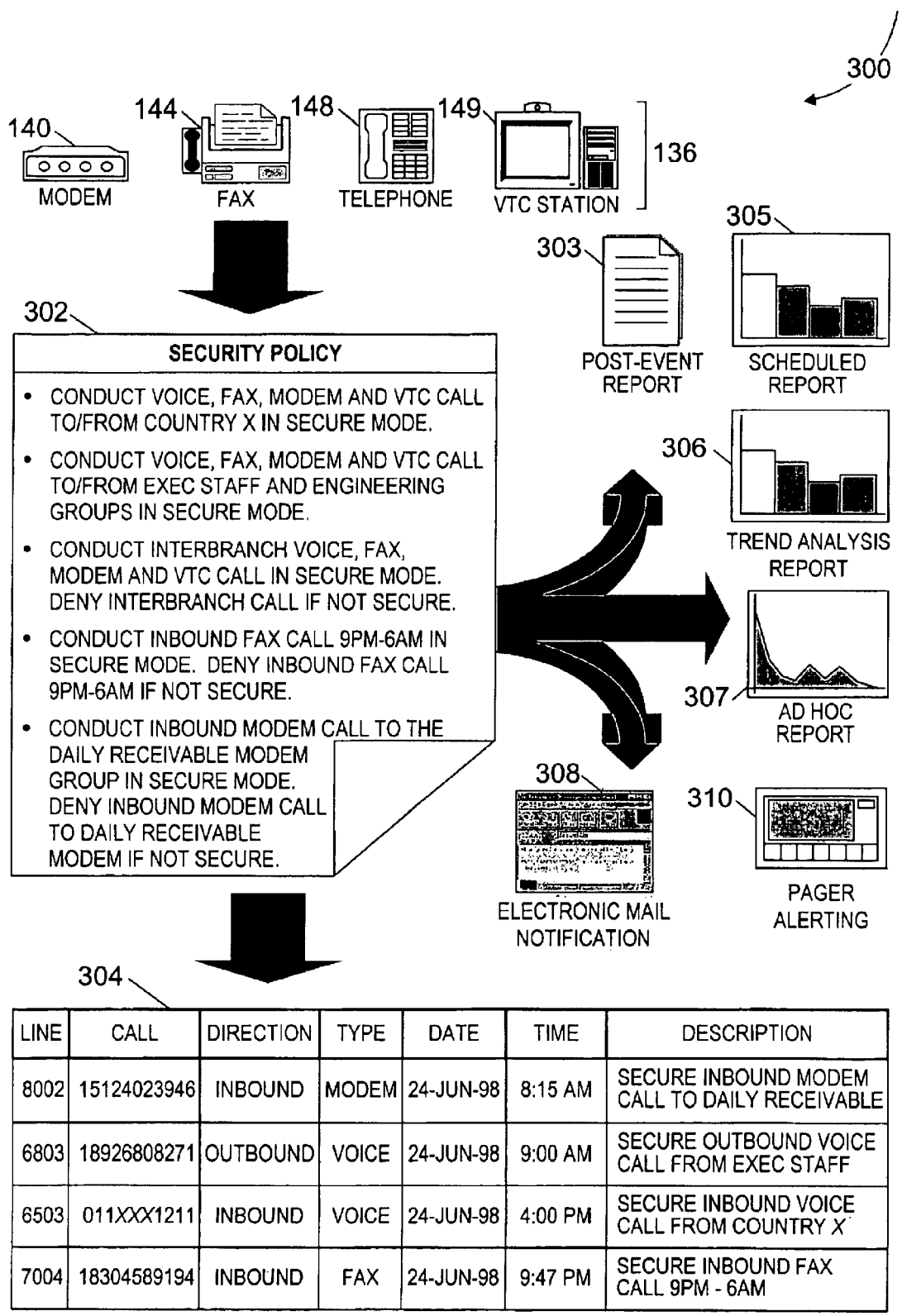
FIG. 3 is a functional schematic block diagram illustrating a simplified example security policy and corresponding actions and features of the virtual private switched telecommunications network of FIG. 1.

Referring also to FIG. 3, a functional schematic block diagram 300 illustrates certain operational aspects of the VPSTN 100 of FIG. 1. An example (very simplified) security policy 302 is shown for controlling the flow of calls through the VPSTN 100. It is understood that the rule-set is implemented by software instructions within the TA 102 that may, for example, be programmed or modified at either the TA 102 or at the management server 106 and client 110 (FIG. 1) located nearby or at a very remote distance therefrom.

As exemplified in FIG. 3, the security policy 302 dictates the type of actions associated with individual or groups of calls (e.g., allow, deny, conduct the call in secure mode, log, alert, report), pursuant to specified rules. In the present example, the security rules specify that: (1) voice, fax, modem, and VTC calls to a certain destination or from a certain source identified by a digital sequence (e.g., "XXX*," where "XXX" indicates the country code for Country X followed by the number "*"), should be conducted in secure mode; (2) voice, fax, modem, and VTC calls to a certain inbound destination or from a certain outbound source should be conducted in secure mode; (3) voice, fax, modem, and VTC calls to a certain outbound destination or from a certain inbound source will be conducted in secure mode; (4) fax calls to a certain inbound destination at a certain time or within a certain time period will be conducted in secure mode; (5) modem calls to a certain inbound destination will be conducted in secure mode.

A call log 304 is constructed for each call, consisting of concatenated call event records designating attributes of the calls. The call logs 304 are stored in a database on the management server 106. Real-time ongoing and historical call log(s) 304 are viewed and printed from the management server 106. The call log 304 for each call is generated to an administrator-designated level of detail, ranging from very brief to verbose. While the call log 304 shown in FIG. 3 is a very simplified example, the detail of the call log 304 ranges from including all call attributes, all call events, and all actions taken on the call, to including only selected call attributes, call events, and actions taken against the call. Configuration of the call log 304 details and the security policy 302 rule-sets may include one or more of the following call attributes and rule criteria:

Call Key—a unique identifying key assigned to each call by the TA 102;

Line—the identifier for the extension or direct connect line carrying the call;

Trunk—the PBX trunk group through which the call is processed;

Channel—the channel through which the call is processed;

TA 102 Name—the designated alias of the TA 102 processing the call and enforcing the rule;

TA 102 Group—the designated alias of the group (or array of TA(s) 102) to which the TA 102 processing the call belongs;

Start Date—the start date of the call;

Start Time—the start time of the call;

Direction—whether the call is inbound or outbound;

Raw Destination Digits—the digits dialed prior to call connection, including prefix digits, the base phone number and suffix digits;

Prefix—all digits dialed before the base phone number, such as outside access number or long distance access code;

Suffix—all digits dialed after the base phone number, such as DTMF-based PIN code used in authentication for remote access, or calling card numbers;

Source—number, or mask (e.g., 210-402-XXXX) where the source number is the number of the party initiating the call; i.e., the extension assigned to a station for outbound calls, or the number extracted from caller-ID (or any other means) for inbound calls;

Source Name—caller ID alias or identifier;

Destination—number, or mask where the destination number is the number of the party receiving the call; i.e., the extension assigned to a station for inbound calls, or the number dialed (DTMF decoded or by any other means) for outbound calls;

Connect Time—the time at which the call was answered (connected);

Call-Type—the type of call, based either on equipment or call progress events (e.g., voice, fax, modem, VoIP, STU-III-data, STU-III-voice, STU-III-unspecified, STE, wideband, wideband video, and busy, unanswered, undetermined);

Call Content—designated keywords detected in voice, VoIP, and modem calls;

Actions—designated actions executed by the TA 102, pursuant to the security policy (i.e., allow or deny the call, drop down to the next allowed secure mode and attempt to conduct the call again, drop down from a data secure mode to an allowed voice secure mode and attempt to conduct the call again, allow the call to be conducted non-secure);

Tracks—additional actions and tracking functions executed, pursuant to the security policy (e.g., TA 102 additional actions include: conduct the call in secure mode, send a tone or message, record call content, redirect the call, authenticate remote access, monitor call content for keywords, conduct the call in secure mode, transport the call using VoIP;
management server 106 tracking functions include: adjust the security policy, log call events, and generate notification alerts and reports);

Secure Modes—the administrator-allowable data and/or voice secure mode(s) attempted and/or dropped down to for conduction of the call in secure mode, (e.g., 64K data secure mode, 56K data secure mode, 56K voice secure mode, 48K voice secure mode, 40K voice secure mode; 32K voice secure mode, 24K voice secure mode, and non-secure).

Result—the TA-determined outcome of the attempted action or track dictated by the security rule base 402 (e.g., successful or failed attempt to conduct a call in secure mode);

Reason—the TA-determined cause(s) associated with attempted actions or tracks. For example, reasons associated with failed attempts to conduct a call in secure mode may include:

Policy Conflict—security policies within TA 102 and TA 104 do not both require a call to be conducted in secure mode;

Allowed Secure Mode Conflict—secure modes ia administrator-allowed within TA 102 but not within TA 104 (e.g., TA 102 may attempt to conduct the call in 64K secure mode, but TA 104 administrator-allowed secure modes do not include 64K secure mode);

Allowed Secure Mode Exhaustion—all TA 102 administrator-allowed secure modes have been attempted by none were allowed by the TA 104 administrator;

Line Impairments, Outbound—TA 102 determines that bits have changed value during transmission and line impairments are too severe to be overcome by DIL-like processes;

Line Impairments, Inbound—TA 104 determines that bits have changed value during transmission and line impairments are too severe to be overcome by DIL-like processes;

Not VPSTN-capable—the remote location does not have VPSTN capability;

Busy

Bearer Capability Not Authorized

Bearer Capability Not Presently Available

Service or Option Not Available

Bearer Capability Not Implemented

Only Restricted Bearer Capability Available

Call Rejected

Redirect—the port and name of the peripheral device the call is redirected to;

Post-connect digits—digits dialed after the call is connected;

Log Time—the date and time a call event record is appended to the call log 304;

End Date—the date the call ended;

End Time—the time of day the call ended;

Duration—the duration of the call (in seconds).

Several reports, including a post-event report 303, a schedule-generated report 305, or an ad hoc report 307 may be initiated, or scheduled for later generation and delivery, via a graphical user interface-based report module (not shown) within the management server 106. The report module consolidates and manages designated call log 304 data for use in assessing an enterprise's telephony resource usage and/or security posture.

Reports are configuration-edited, generated, archived, displayed and printed via the management server 106. Report criteria includes: the date/time range for which call log data will be retrieved; call log 304 fields to be used; data organization (sorting, filtering, grouping, ordering); data presentation level (in detail or high level summary); and data display format (charts, graphs, or trends).

The post-event report 303 contains predefined information concerning a specified call event and is generated responsive to the call event, and pursuant to the security policy 302.

The schedule-generated report 305 contains previously designated categories of call log data and is automatically generated, displayed, printed, and delivered at previously designated, discrete or recurring times and/or days. The schedule-generated report 305 is delivered to the designated recipient(s) by electronic mail message, to the designated file directory on a network- or web-accessible server, and/or to the designated archival file directory. It is understood that any configurable report, and any number of reports may be scheduled for generation and display, printing, or delivery at any discrete time or number of recurring time(s).

The ad hoc report 307 is manually initiated by authorized personnel. Both the schedule generated report 305 and the ad hoc report 307 may include, for example, batch analysis of call log data for a trend or difference/comparison report 306, either in great detail or high-level summary.

The management server 106 generates several types of alerts pursuant to the security policy 302, including, for example: electronic mail notification 308, pager alerting 310, console messaging, and SNMP trap notification (not shown). Alert contents are administrator-configurable, derived from call log 304 data. While not shown, it is understood that the VPSTN 100 is able to communicate within the enterprise network with various host computers for providing the reporting and alert functions.

Security Policy

Figure 4:
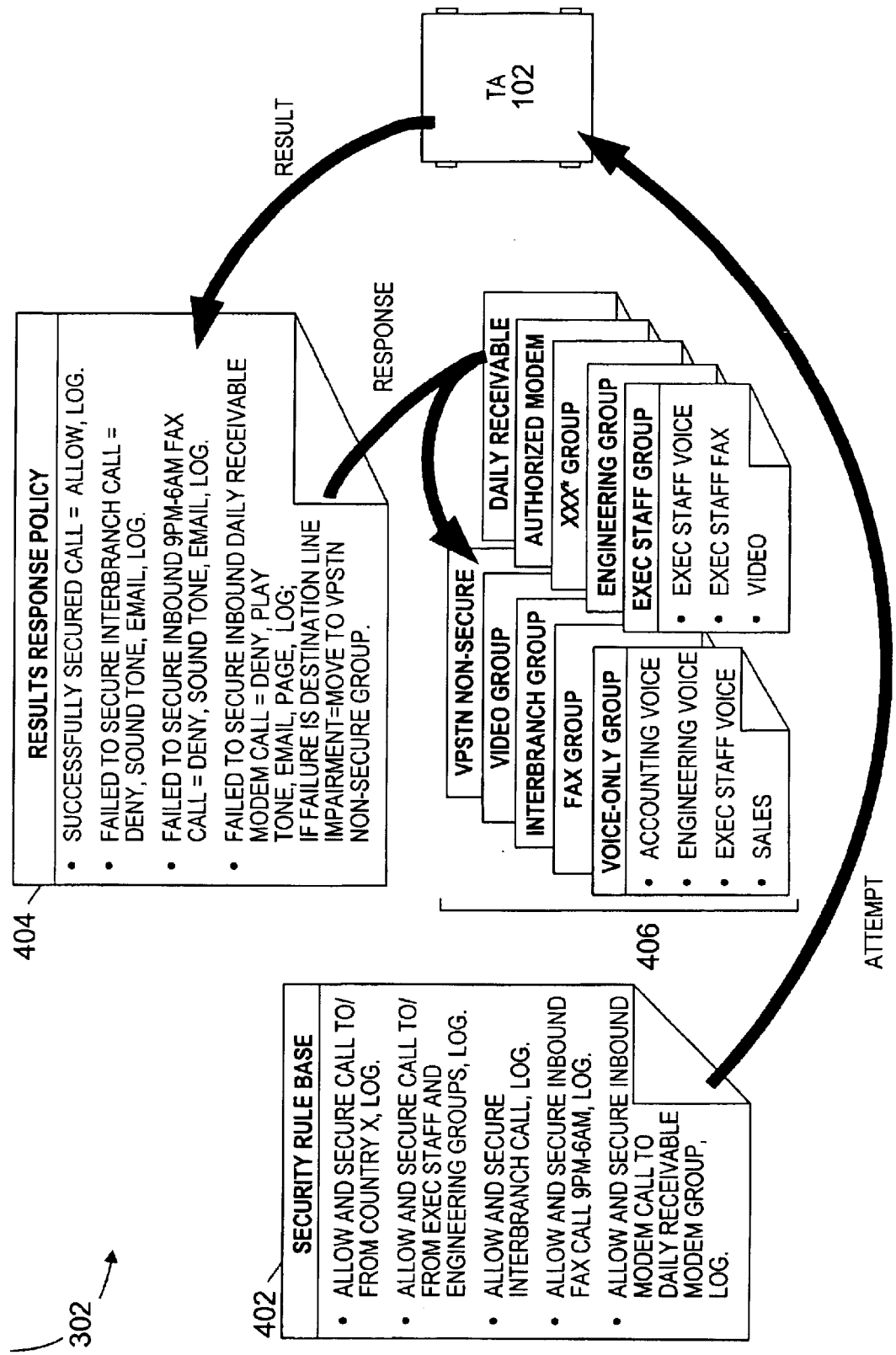
FIG. 4 is a functional schematic block diagram illustrating simplified example security policy elements and interactions of the virtual private switched telecommunications network of FIG. 1.

FIG. 4 is a functional schematic block diagram of an exemplary security policy 302 for enforcement by the VPSTN 100 of FIG. 1. In a preferred embodiment, the security policy 302 includes a security rule base 402, a result response policy 404, and a plurality of groups represented by numeral 406. Although a plurality of security rule bases, such as the security rule base 402, with a plurality of corresponding result response policies, such as the result response policy 404, can be configured for a large globally distributed enterprise, for the sake of simplicity and clarity, only one of each component is shown in this diagram.

The security rule base 402, result response policy 404, and groups 406 are used by the VPSTN 100 to control calls and respond to vulnerabilities (e.g., when the security policy 302 requires that a call be conducted in secure mode, but the attempt to conduct a secure call fails). The security rule base 402, discussed in further detail later with reference to FIGS. 7A–7B, is a sequential listing of rules that defines whether certain calls to an extension will be allowed or denied (hung-up), and logged, or if other actions such as conducting the call in secure mode will be initiated, and if electronic mail notification, pager alerting, console messaging, or SNMP trap notification are required.

The result response policy 404, discussed in further detail later with reference to FIGS. 8A–8C, is a sequential listing of response rules (similar in construction to the security rule base 402), which defines the appropriate response to the results of defined actions, such as the ability or inability to conduct a call in secure mode. The result response policy 404 may be configured to dictate select responses based on the reason for failure to conduct the call in secure mode. The result response policy 404 defines whether the results will be logged, whether the call will be allowed or denied, whether a tone or message will be played to call parties, whether or not the call should be re-attempted in another secure mode, and whether notifications such as electronic mail notification, pager alerting, console messaging, or SNMP trap notification to designated system or security personnel, and automatic adjustments to the contents of groups 406 (and hence to the security policy 302), will be executed.

It is contemplated that the VPSTN 100 will make extensive use of groups, where objects of the same type can be collectively referred to by a meaningful alias. Groups 406, discussed in further detail later with reference to FIGS. 6A–6B, are used by both the security rule base 402 and the result response policy 404 to indicate and "bundle" specific extensions for convenience in applying the security policy 302. When dictated by the result response policy 404, the management server 106 adjusts the security policy 302 by moving an extension from its current group within group 406 to a different designated group within group 406. Although not shown, the use of various types of objects and groups of objects by both the security rule base 402 and the result response policy 404 in applying the security policy 302, such as groups of designated administrator-allowed data and voice secure modes, static secret keys, key exchange mechanisms, and encryption algorithms, are contemplated.

Whether the TA 102 attempts and succeeds, or attempts and fails to establish and conduct the call in secure mode, the TA 102 references the result response policy 404 to determine the appropriate response to the success or failure. When the result response policy 404 rule is matched, the TA 102 allows or denies the call, may play a tone or message, may drop down to the next allowed secure mode and attempt to conduct the call again, may drop down from a data secure mode to an allowed voice secure mode and attempt to conduct the call again, may conduct the call in non-secure mode, and notifies the management server 106 that the rule has fired, pursuant to the result response policy 404. The management server 106 references the fired result response policy 404 rule to determine the appropriate response to the success or failure of the attempt. Management server 106 responses may include sending notifications such as electronic mail notification, pager alerting, console messaging, or a SNMP trap notification, logging the event, and adjusting the security policy by moving the extension from its current group to a different group.

For example, assume that a daily inbound call is placed from the Chicago branch office to one of the modems in the daily receivable modem group, for the purpose of reporting the day's receipts. Since the daily receipts are confidential information, the security rule base 402 includes the following rule: "Allow inbound modem calls to extensions in the daily receivable modem group, conduct the call in secure mode, and log the call."

The result response policy 404 includes the following rule: "Allow inbound modem calls to extensions in the daily receivable group that are successfully conducted in secure mode and log the event;" and "Deny inbound modem calls to extensions in the daily receivable group that fail to be conducted in secure mode, play a tone, generate an electronic mail notification and a pager alert, and log the event. If the attempt to conduct the call in secure mode fails, the daily receivable modem extension is moved from the daily receivable modem group to the VPSTN non-secure group."

Pursuant to the security rule base 402, and as described later with reference to FIGS. 13A–13E, the inbound modem call to the daily receivable modem group will be conducted in secure mode. If the call can not be conducted in secure mode, pursuant to the result response policy 404, the TA 102 plays a tone and denies the call. The management server 106 generates an email and page, logs the call, and moves the extension from the daily receivable modem group to the VPSTN non-secure group, thereby denying any future modem traffic on the extension.

Installation, Configuration, and Operation

Figure 5A:
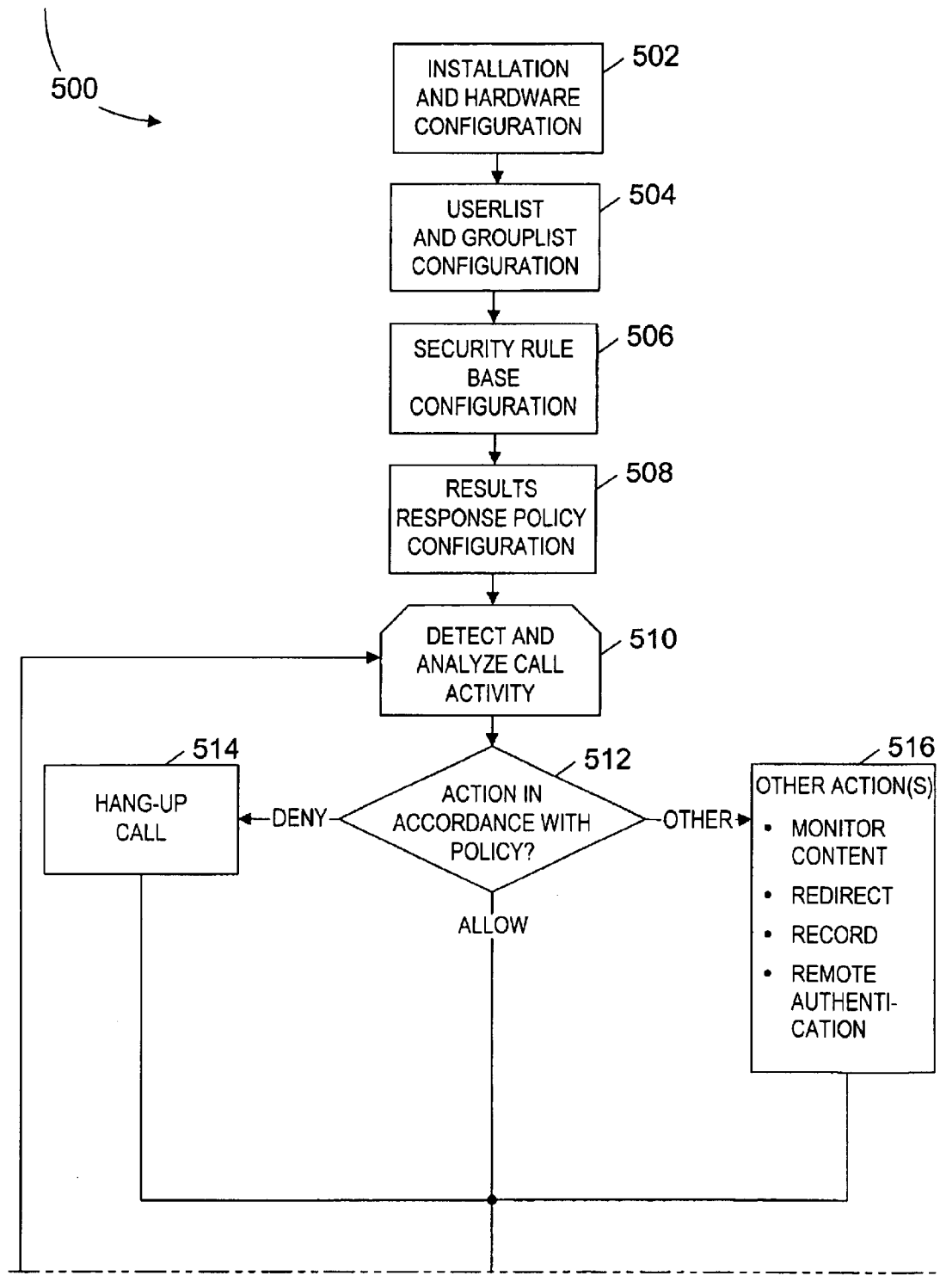
FIGS. 5A and 5B are a process flow diagram illustrating installation, configuration, and operational processes of the virtual private switched telecommunications network of FIG. 1.
Figure 5B:
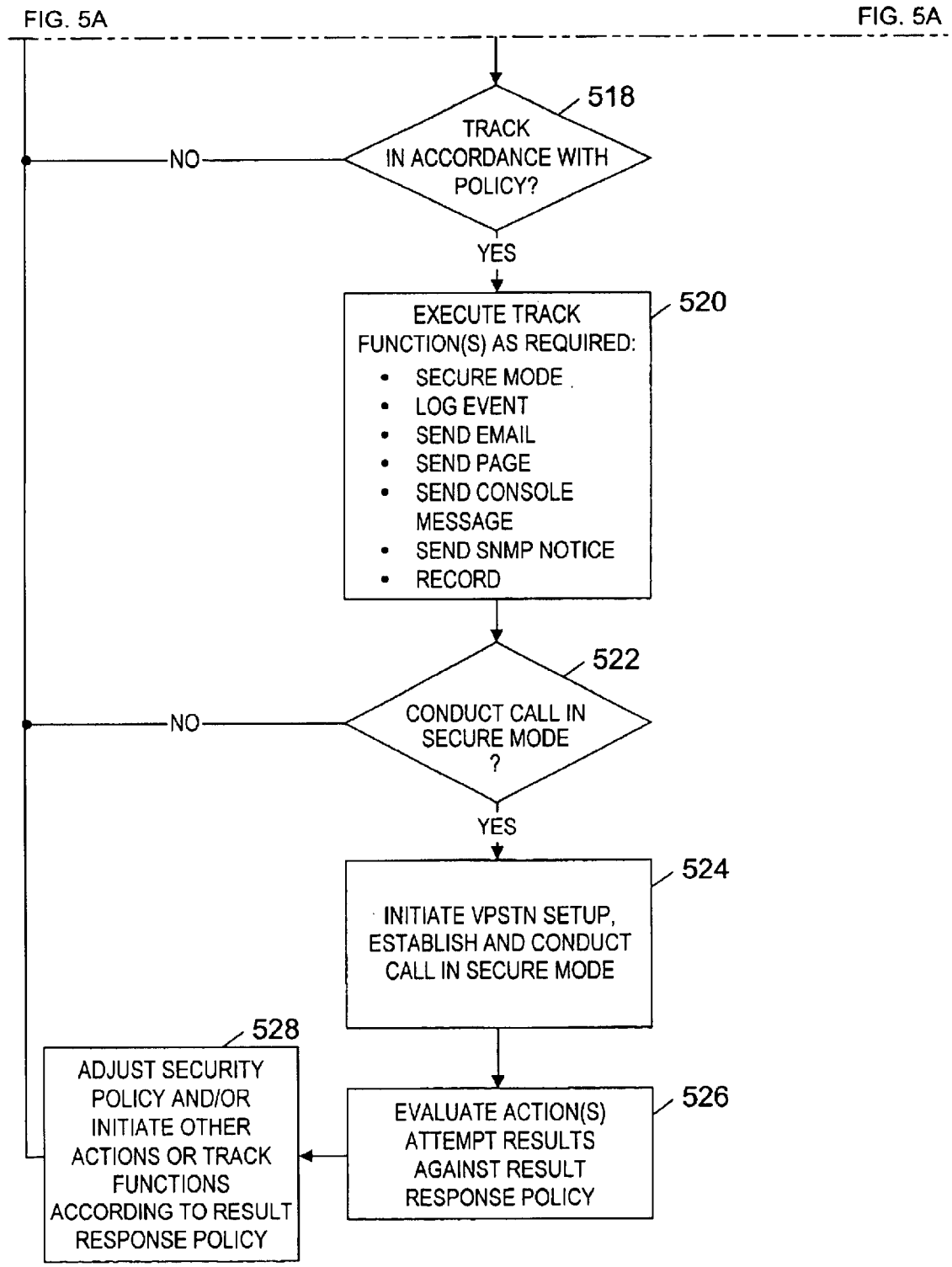

FIGS. 5A and 5B collectively illustrate a process flow diagram 500 of the installation, configuration and operation processes for the VPSTN 100 of FIG. 1. Once installed and configured, it is understood that the VPSTN 100 is capable of operating in a continuous processing loop, including detecting call attributes and analyzing call activity, while simultaneously performing appropriate actions (e.g., initiating and conducting calls in secure ode), pursuant to the rules in the defined security policy 302. There are, however, a number of processes that are first performed as part of the installation and configuration of the VPSTN 100 within an enterprise, or one or more of its locations.

Step 502 refers to the process of system installation and hardware configuration. The TA 102 are installed in-line, as shown by TA 202 and 206 in FIG. 2. The management server 106, and client 110 are set up, whereby personal computers, meeting certain performance specifications, are acquired and configured with an operating system, booted, and made ready for operation. Software required to operate the VPSTN 100, including for example defining and maintaining the security policy 302, is installed onto the management server 106. Although not shown, it is understood that installation of control software may include writing firmware instructions for the associated switches and/or the associated control logic for the TA 102, as required. The TA 202 assigns telephone numbers to direct connect lines that come directly from the CO 208. After the system is installed, and with power off, the VPSTN 100 is transparent to the enterprise telecommunications system (i.e., all wire-pairs are terminated at the same points as prior to installation of the system).

Step 504 refers to userlist and group 406 configuration, discussed previously with reference to FIG. 4 and later with reference to FIGS. 6A and 6B, whereby extensions are organized and labeled in relation to their commonality with other extensions as a means to "bundle" extensions together for convenience in managing telephony resources and applying the security policy 302. As discussed previously with reference to FIG. 4, other lists and groups may be created at this time, designating objects such as administrator-allowed data and voice secure modes, static secret keys, key exchange mechanisms, arid encryption algorithms. It is contemplated that configuration of the administrator-allowed data and voice secure modes may involve the selection (and allowance) of all possible data and voice transfer rates, or only certain select data and voice transfer rates.

Step 506 refers to configuration of the security rule base 402, discussed previously with reference to FIG. 4 and later with reference to FIGS. 7A–7B. Step 508 refers to configuration of the result response policy 404, discussed previously with reference to FIG. 4 and later with reference to FIGS. 8A–8C. Steps 510–520 refer to the process of detecting call attributes and analyzing call activity, whereupon actions are taken for each call pursuant to the security policy 302, discussed below and in further detail later with reference to FIGS. 9A and 9B.

In FIG. 5A, the process of call detecting and analyzing call activity begins in step 510. For each end-user station 136 connected by an individual station extension 152, direct connect line, or DS-1 circuit through the TA 102, the TA 102 will capture and analyze call activity, then consolidate and report details of the activity for further processing.

An aspect of this process involves the ability of the TA 102 to distinguish between voice, fax, modem, and VTC call types. Algorithms for call type distinction are utilized that, in one implementation, distinguish the call type based upon spectral analysis associated with typical fax and other data transmission protocols.

In step 512, a determination is made by the TA 102 as to what actions the security rule base 402 dictates to be taken for a particular call, depending upon the attributes of the call, as determined in step 510. The rule-set for the security rule base 402, previously configured in step 506 and used in step 512, is configured and programmed to meet the resource management and security needs of the enterprise, which may include allowing the call, in which case execution proceeds directly to step 518; denying the call, in which case execution proceeds to step 514. As previously mentioned, the VPSTN 100 may be combined with a telecommunications firewall, resulting in a mixture of capabilities from each device; such as content monitoring, redirecting, recording, and authorizing remote access for the call; in which case execution proceeds to step 516.

In FIG. 5B, in step 518, a determination is made whether the security rule base 402 also dictates track actions to be executed in step 520. If a negative determination is made, execution proceeds to step 510, as the VPSTN 100 continues detecting call attributes and analyzing call activity until the call ends. If a positive determination is made, execution proceeds to step 520 where the management server 106 performs track functions such as logging the call event and generating electronic mail notification, pager alerting, console messaging, and SNMP trap notification. As discussed previously with reference to the call log 304 and FIG. 3, the call log 304 for each call is generated to an administrator-designated level of detail, ranging from very brief to verbose.

In step 522, a determination is made whether the security rule base 402 dictates that the TA 102 conduct the call in secure mode. If a negative determination is made, execution proceeds to step 510. If a positive determination is made in step 522, the TA 102 conducts, or attempts to conduct the call in secure mode in step 524.

In step 526, the TA 102 evaluates the success or failure of the attempt in step 524 to conduct the call in secure mode against the result response policy 404 rule-set, thereby determining if additional actions or track functions are designated. For example, in response to a successful or failed attempt to setup and conduct a call in secure mode, the result response policy 404 may dictate responses such as: allowing or denying the call; sending a tone or message to indicate the call is secure or non-secure; logging the call event; sending notifications such as electronic mail notification, pager alerting, console messaging, or SNMP trap notification to designated system or security personnel; generation of a scheduled report; and automatic adjustment to the contents of groups 406 (and hence to the security policy 302); as described in step 528 and in further detail later with reference to FIGS. 8A–8C.

User List and Group Configuration

FIGS. 6A and 6B collectively illustrate a portion of the exemplary user and group listing 406, previously mentioned with reference to FIG. 4 and step 504 in FIG. 5A. The group listing 406 shown in FIGS. 6A and 6B defines each extension or direct connect line relative to its commonality with other extensions and lines, thereby "bundling" extensions together by commonality for convenience in managing telephony resources and applying the security policy 302. The security rule base 402 and result response policy 404 may refer to individual extensions, or may use group names to refer to all extensions in the group.

For example, all telephone extensions within the facility in the San Antonio offices which are intended to receive only voice calls, are listed in the "voice-only" group (i.e., extensions within the "sales," "engineering voice," "exec staff voice," and the "accounting voice" subgroups). All lines and extensions within the facility in the San Antonio offices which are intended to receive only fax calls, are listed in the "fax-only" group (i.e., several ungrouped fax extensions, and extensions within the "engineering fax" and the "exec staff fax" subgroups). All lines and extensions in the San Antonio offices with known and security configuration-approved modems are listed in the "authorized modem" group, which includes the "daily receivable modem" group, the "engineering modem" group, and several other authorized, individual modem extensions. The "inter-branch" group contains "branch offices voice-only," "branch offices fax-only," "branch offices authorized modem," and "branch offices video" subgroups from each branch office within the globally distributed organization, including the facility represented by the other groups listed within group 406. The group "XXX" is created to apply the security policy 302 to calls to and from a certain country (e.g., Country X), whereas "XXX*" refers to the country code "XXX" for Country X, followed by any other number "*," thereby applying the security policy 302 against calls to a certain destination or from a certain source identified by a digital sequence. The VPSTN non-secure group contains certain lines and extensions on which secure calls are expected to be conducted but could not be set up or conducted and on which all future calls are denied pending further investigation by security personnel.

Although not shown, the use of various types of objects and groups of objects by both the security rule base 402 and the result response policy 404 in applying the security policy 302, such as groups of designated administrator-allowed data and voice secure modes, static secret keys, key exchange mechanisms, and encryption algorithms, are contemplated. It is contemplated that configuration of the administrator-allowed data and voice secure modes may involve the selection (allowance) of all possible data and voice transfer rates, or only certain select data and voice transfer rates. It is further contemplated that administrator-allowed data and voice secure modes may be applied on a per rule basis (e.g., an extension with a high-speed modem might only be secured using data secure modes); a per call direction basis (e.g., there may be a separate set of allowed secure modes for inbound calls and another set of allowed secure modes for outbound calls); a per security policy 302 basis (e.g., there may be a separate set of allowed secure modes for various security policies within an enterprise); or a per VPSTN 100 system basis (e.g., there may be only one set of allowed secure modes within an enterprise).

Security Rule Base Configuration

FIGS. 7A and 7B collectively illustrate a portion of an exemplary security rule base, such as the security rule base 402, for use in connection with the VPSTN 100, as previously mentioned with reference to FIG. 4, and step 506 in FIG. 5A. Configuring the security rule base 402 involves creating a rule-set that defines what actions and track functions will be associated with particular groups of objects.

Referring to FIGS. 7A–7B, an example security rule base 402 defines rules that, based upon call attributes including "Direction" (inbound, outbound), "Source," "Destination," "Call type" (e.g., voice, fax, modem, VTC), "Date," "Time," and "Duration" (not shown), implement an "Action" (allow or deny the call), other additional actions, and logging, reporting and notification functions, "Track". Additionally, each rule has the TA 102 deployment location/identifier "Install On," allowing an enterprise to implement one single security rule base 402 containing rules designated to be applied in specific locations.

It is understood that the security rule base 402 may include any number and types of rules, and although not all possible call attributes are used in this example, rules may be constructed using any call attributes contained in the call log 304, as shown and described with reference to FIG. 3 and any objects or groups of objects as described with reference to FIGS. 4, 6A, and 6B.

Additionally, any combination of action(s) or tracking function(s) may be included in the security rule base 402, pursuant to the enterprise's telephony security and resource management needs.

It is further understood that each rule is evaluated in sequential order, and the security rule base 402 is exited after any one rule matches the determined call attributes. Because call-type detection is continuous during the call, change in call-type during a call is detected. Consequently, each rule in the security rule base 402, except for the rule already fired by the call's previous attribute, is re-evaluated in sequential order, using the updated call-type attributes. Actions and track functions are then performed based upon the rule matched with the updated call attribute.

Referring now to FIGS. 7A–7B, the Security Rule Base (SRB) 402 Rules 1–10 are explained as follows:

Rule 1:
This rule states "Deny outbound calls from extensions in the VPSTN non-secure group, generate an electronic mail and page, and log the call." This rule is installed on all TA 102. This rule identifies and segregates lines, and denies calls over the lines that are in the VPSTN non-secure group, and logs the call for accounting purposes.

Rule 2:
This rule states "Deny inbound calls to extensions in the VPSTN non-secure group, generate an electronic mail and page, and log the call." This rule is installed on all TA 102. This rule identifies and segregates lines, and denies calls over the lines that are in the VPSTN non-secure group, and logs the call for accounting purposes.

Rule 3:
This rule states "Allow inbound fax calls to extensions in the fax group between 9pm and 6am, conduct the call in secure mode, and log the call." This rule is installed on all TA 102. This rule causes all inbound fax calls to extensions in the fax group during a specified time to be conducted in secure mode, and logs the call for accounting purposes.

Rule 4:
This rule states "Allow inbound modem calls to extensions in the daily receivable modem group, conduct the call in secure mode, and log the call." This rule is installed on the TA 102 in San Antonio. This rule causes all inbound modem calls to a specified inbound destination to be conducted in secure mode and logs the call for accounting purposes.

Rule 5:
This rule states "Allow all outbound international voice, fax, modem, and VTC calls to Country X, conduct the call in secure mode, and log the call." Note that the "XXX" in the "Destination" column represents any call with the country code for Country X, "XXX" followed by any other number "*". This rule is installed on all TA 102. This rule causes all outbound voice, fax, modem, and VTC calls to any destination within Country X to be conducted in secure mode, and logs the call for accounting purposes.

Rule 6:
This rule states "Allow all inbound international voice, fax, modem, and VTC calls from Country X, conduct the call in secure mode, and log the call." This rule is installed on all TA 102. This rule causes all inbound voice, fax, modem, and VTC calls from any inbound source within Country X to be conducted in secure mode, and logs the call for accounting purposes.

Rule 7:
This rule states "Allow inbound and outbound voice, fax, modem, and VTC calls between extensions in the inter-branch groups, conduct the call in secure mode, and log the call." This rule is installed on all TA 102. This rule causes all inbound and outbound voice, fax, modem, and VTC calls to and from specified sources and destinations to be conducted in secure mode, and logs the call for accounting purposes.

Rule 8:
This rule states "Allow outbound voice, fax, modem, and VTC calls from extensions in the exec staff and engineering groups, conduct the call in secure mode, and log the call." This rule is installed on all TA 102. This rule causes all outbound voice, fax, modem, and VTC calls from specified outbound sources to be conducted in secure mode, and logs the call for accounting purposes. Rule 9:

This rule states "Allow inbound voice, fax, modem, and VTC calls to extensions in the exec staff and engineering groups, conduct the call in secure mode, and log the call." This rule is installed on all TA 102. This rule causes all inbound voice, fax, modem, and VTC calls to specified inbound destinations to be conducted in secure mode, and logs the call for accounting purposes.

Rule 10:
This catch-all rule states "Deny all calls, generate an electronic mail and log the call." This rule is installed on all TA 102. At first glance, this rule seems to deny any call to or from anywhere. This is not the case. This rule is typically placed at the bottom of the sequential list of rules to deny, log, and send notification for all calls that do not fit into any of the preceding rules. Again, each rule is evaluated in sequential order, exiting immediately after any one rule matches all the call attributes.

Security Policy—Result Response Policy Configuration

FIGS. 8A, 8B, and 8C collectively illustrate a portion of an exemplary result response policy, such as the result response policy 404, for use in connection with the VPSTN 100, as previously mentioned with reference to FIG. 4, and step 508 in FIG. 5A. Configuring the result response policy 404 involves creating a set of response rules that define what action(s) and track functions(s) the TA 102 and the management server 106 perform responsive to attempted actions such as the success or failure of initiating and conducting a secure call.

Referring to FIGS. 8A–8C, an example result response policy 404 defines rules that, based upon the extension's "Current Group," "Call type" (e.g., fax, modem, voice, VTC), the "Attempt" that was made pursuant to the fired security rule base 402 rule, and the "Result" of the attempt, implements an "Action" (allow or deny the call), notification and event logging functions ("Track"), an option to automatically adjust the security policy 302 ("Adjust Policy"), and defines the new group the extension will be placed in ("Move To"). Additionally, each rule has a deployment location "Install On," allowing an enterprise to implement one single result response policy 404 containing rules designated to be applied in specific TA locations.

It is understood that the result response policy 404 may include any number and types of rules, and although not all possible call attributes are used in this example, rules maybe constructed using any call attributes contained in the call log 304, as shown and described with reference to FIG. 3 and any objects or groups of objects as described with reference to FIGS. 4, 6A, and 6B. For example, although not shown in FIGS. 8A, 8B, and 8C, it is understood that the result response policy 404 may be expanded to include "Reason," such that the result response policy 404 may be configured to dictate select responses based on the TA-determined reason for failure to conduct the call in secure mode. Example reasons are discussed with reference to the call log 304 of FIG. 3. Example responses are discussed with reference to step 1340 of FIG. 13A.

Additionally, any combination of action(s) or tracking function(s) may be included in the result response policy 404, pursuant to the enterprise's telephony security and resource management needs.

It is further understood that each rule is evaluated in sequential order, and the result response policy 404 is exited after any one rule matches the determined call attributes.

Referring now to FIGS. 8A, 8B, and 8C, the Result Response Policy(RRP) 404 Rules 1–9 are explained as follows:

Rule 1:
This rule states "Allow inbound fax calls to extensions in the fax-only group that are successfully conducted in secure mode and log the event;" and "Deny inbound fax calls to extensions in the fax-only group that fail to be conducted in secure mode, play a tone, generate an electronic mail, and log the event."

This rule is installed on all TA 102. This rule allows secure fax communication and denies all non-secure fax communication with extensions in the fax-only group. This result response policy rule is applicable to security rule base 402 Rule 3 of FIG. 7A.

Rule 2:
This rule states "Allow inbound modem calls to extensions in the daily receivable group that are successfully conducted in secure mode and log the event;" and "Deny inbound modem calls to extensions in the daily receivable group that fail to be conducted in secure mode, play a tone, generate an electronic mail, a page alert, log the event, and move the daily receivable modem extension from the daily receivable modem group to the VPSTN non-secure group."

This rule is installed on all TA 102. This rule allows secure inbound modem communication with extensions in the daily receivable group and denies all non-secure communication. Failure to conduct a secure call within the enterprise may be a result of packet tampering, so the line is moved to the VPSTN non-secure group, denying further use. Designated personnel are notified via electronic mail and pager for investigation and follow-up. This result response policy rule is applicable to security rule base 402 Rule 4 of FIG. 7A.

Rule 3:
This rule states "Allow voice and VTC calls to and from Country X that are successfully conducted in secure mode, play a tone, and log the event;" and "Deny voice and VTC calls to and from Country X that fail to be conducted in secure mode, play a message, generate an electronic mail, and log the event."

This rule is installed on all TA 102. This rule allows secure voice and VTC communication with Country X, and denies all non-secure communication with an audible warning if secure communication is not possible. This result response policy rule is applicable to security rule base 402 Rules 5 and 6 of FIGS. 7A and 7B.

Rule 4:
This rule states "Allow fax and modem calls to and from Country X that are successfully conducted in secure mode and log the event;" and "Deny fax and modem calls to and from Country X that fail to be conducted in secure mode, play a tone, generate an electronic mail, and log the event."

This rule is installed on all TA 102. This rule allows secure fax and modem communication with Country X, and denies all non-secure communication with a warning tone if secure communication is not possible. This result response policy rule is applicable to security rule base 402 Rules 5 and 6 of FIGS. 7A and 7B.

Rule 5:
This rule states "Allow voice and VTC calls between extensions in the inter-branch group that are successfully conducted in secure mode, and log the event;" and "Deny voice and VTC calls between extensions in the inter-branch group that fail to be conducted in secure mode, play a message, generate an electronic mail, and log the event."

This rule is installed on all TA 102. This rule allows only secure voice and VTC communication between extensions in the inter-branch group and denies all non-secure communication. This result response policy rule is applicable to security rule base 402 Rule 7 of FIG. 7B

Rule 6:
This rule states "Allow fax and modem calls between extensions in the inter-branch group that are successfully conducted in secure mode and log the event;" and "Deny fax and modem calls between extensions in the inter-branch group that fail to be conducted in secure mode, play a tone, generate an electronic mail, and log the event."

This rule is installed on all TA 102. This rule allows secure fax and modem communication between extensions in the inter-branch group, and denies all non-secure communication. This result response policy rule is applicable to security rule base 402 Rule 7 of FIG. 7B.

Rule 7:
This rule states "Allow voice and VTC calls to and from extensions in the exec staff and engineering groups that are successfully conducted in secure mode and log the event;" and "Allow voice and VTC calls to and from extensions in the exec staff and engineering groups that fail to be conducted in secure mode, play a message, generate an electronic mail, and log the event."

This rule is installed on all TA 102. This rule allows secure voice and VTC communication with extensions in the exec staff and engineering groups, and allows non-secure communication with an audible warning if secure communication is not possible. This result response policy rule is applicable to security rule base 402 Rules 8 and 9 of FIG. 7B.

Rule 8:
This rule states "Allow fax and modem calls to and from extensions in the exec staff and engineering groups that are successfully conducted in secure mode and log the event;" and "Allow fax and modem calls to and from extensions in the exec staff and engineering groups that fail to be conducted in secure mode, sound a tone, and log the event."

This rule is installed on all TA 102. This rule allows secure fax and modem communication with extensions in the exec staff and engineering groups, and allows non-secure communication with a warning tone if secure communication is not possible. This result response policy rule is applicable to security rule base 402 Rules 8 and 9 of FIG. 7B.

Rule 9:
This catch-all rule states "Deny all calls, generate an electronic mail, and log the call." This rule is installed on all TA 102. At first glance, this rule seems to deny any call from anywhere. This is not the case. This rule is typically placed at the bottom of the sequential list of rules to deny, log, and send a notification for all calls that do not fit into any of the preceding rules. Again, each rule is evaluated in sequential order, exiting immediately after any one rule matches all the call attributes.

Security Rule Base Enforcement

Figure 9A:
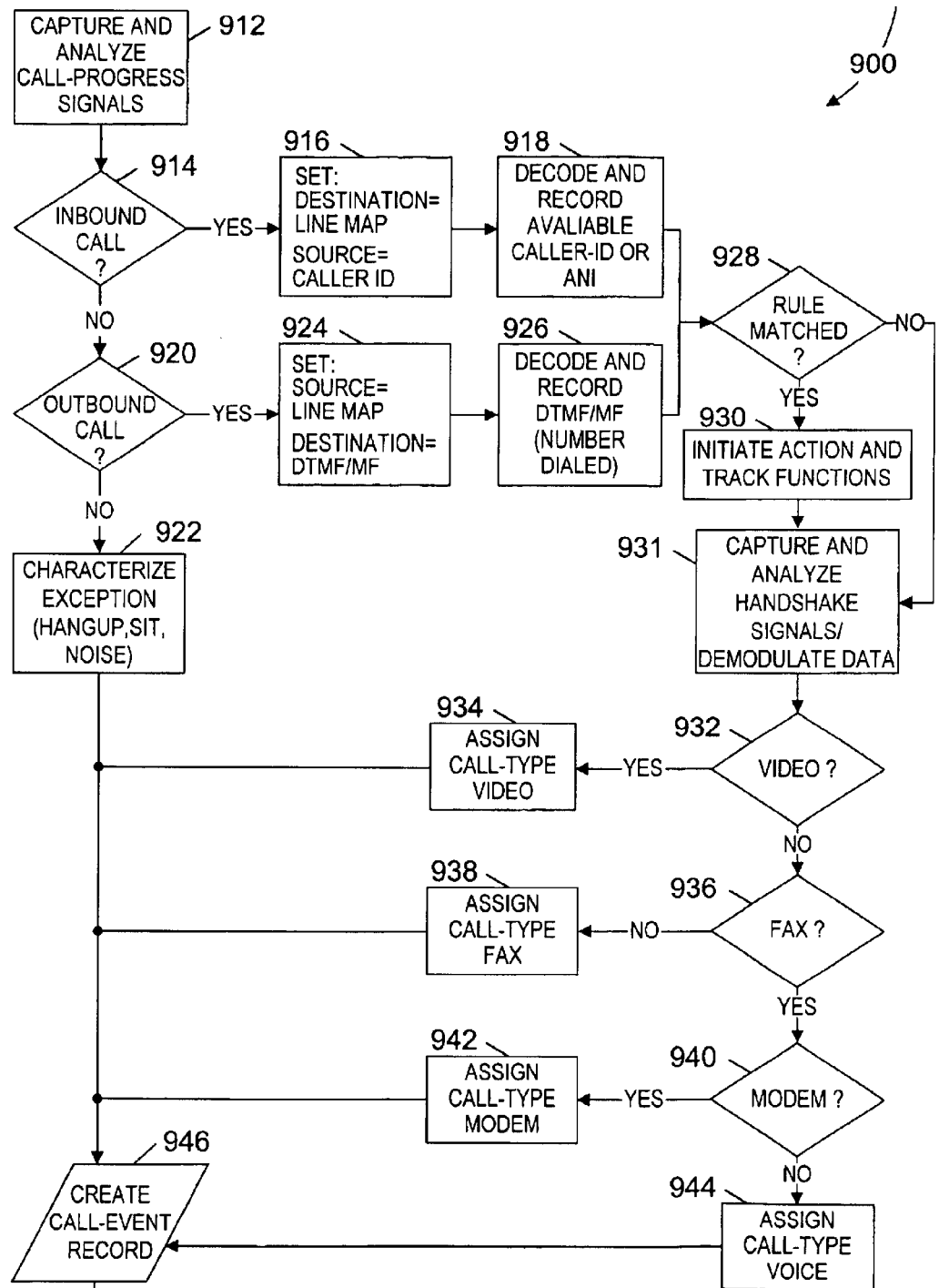
FIGS. 9A and 9B are a process flow diagram illustrating detection and analysis of call activity and implementation of the security rule base by the virtual private switched telecommunications network of FIG. 1.
Figure 9B:
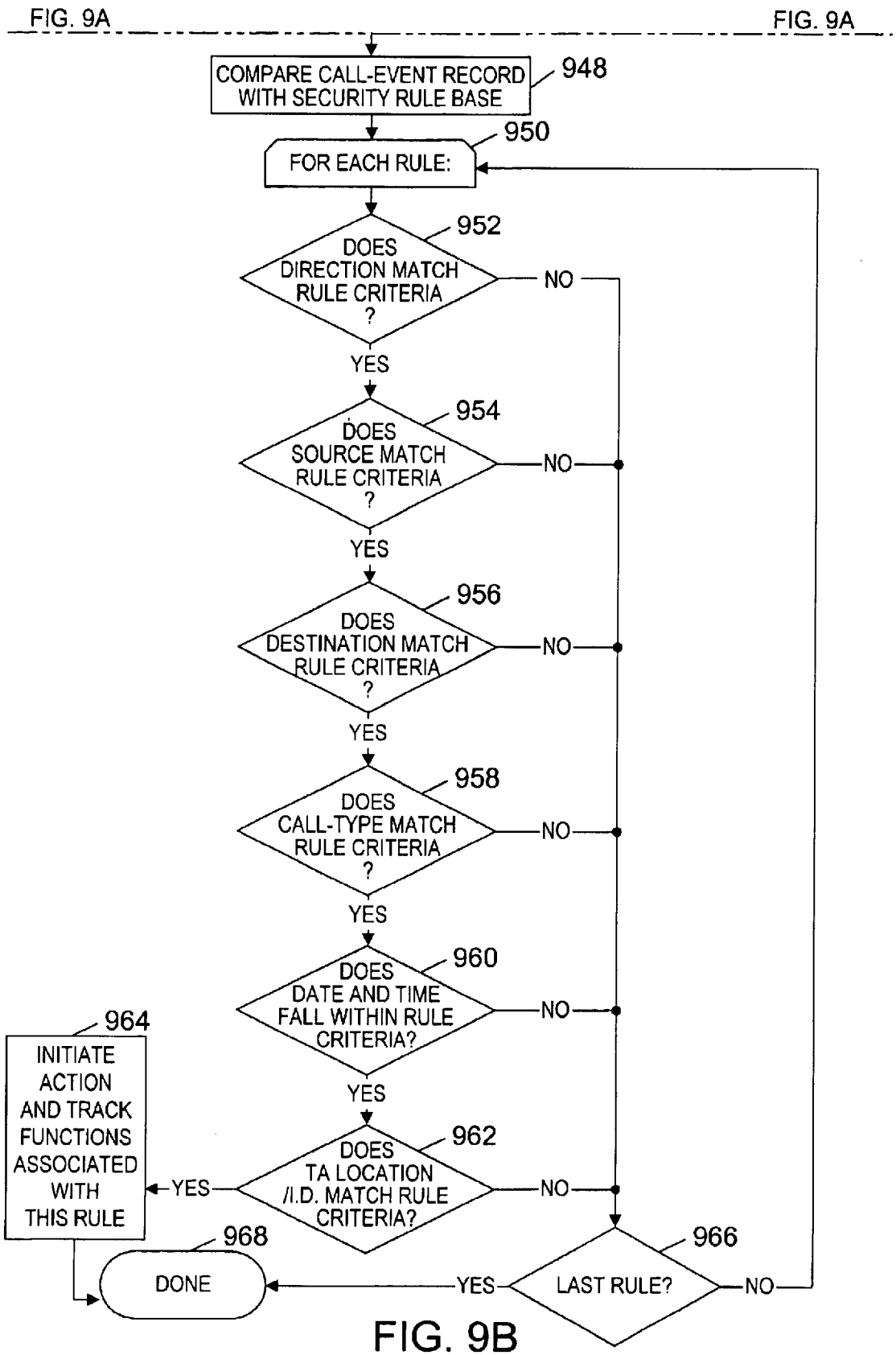

FIGS. 9A and 9B collectively illustrate a process flow diagram 900 whereby detection and analysis of call activity and implementation of the security rule base 402 are executed by the VPSTN 100, as previously mentioned with reference to steps 510–528 of FIGS. 5A and 5B. In FIG. 9A, steps 912–946 illustrate that the TA 102 captures and analyzes all available call attributes, analyzes call-activity, and then consolidates and reports details for further processing.

In particular, in step 912, call-progress signals on the line are captured and analyzed and a determination is made whether the call is an inbound call in step 914. If so, execution proceeds to step 916, in which the destination is set equal to the line map (i.e., the mapping of the individual station extensions 152 through the TA 102) so that the destination extension can be determined according to the line map, and the source is set equal to caller-ID (so that a caller identification device determines the source of the inbound call). In step 918, the available caller-ID or ANI information is decoded and recorded, and execution proceeds to step 930.

Referring again to step 914, if a negative determination is made (i.e., that the call is not an inbound call), execution proceeds to step 920, in which a determination is made whether the call is an outbound call. If a negative determination is made, execution proceeds to step 922, in which an exception is characterized in the call-event record. If the call is determined to be outbound, execution proceeds to step 924, in which the source is set equal to the line map (so the extension from which the call is made can be identified), and the destination is set equal to the dialed digits (indicating that the TA 102 determines the destination of the call). In step 926, the DTMF/MF signals are decoded and recorded to determine the number that was dialed, and execution proceeds to step 930.

In step 928, a determination is made whether the currently determined call attributes (call direction, source, destination, etc.) match the security rule base 402 rule criteria. If so, execution proceeds to step 930, in which the action and track functions associated with the matched security rule base 402 rule, such as initiating secure mode, are initiated.

In step 931, handshake signals are captured and analyzed, and data is demodulated in the case of both inbound and outbound calls for use in discriminating the call type of the call to be video, fax, modem, or voice in steps 932–944. In step 932, a determination is made whether the call is video, and if so, execution proceeds to step 934, in which the call-type of "video" is assigned to the call. If the determination in step 932 is negative, execution proceeds to step 936.

In step 936, a determination is made whether the call is fax, and if so, execution proceeds to step 938, in which the call type of "fax" is assigned to the call. If the determination in step 936 is negative, execution proceeds to step 940.

In step 940, a determination is made whether the call is modem, and if so, execution proceeds to step 942, in which the call-type of "modem" is assigned to the call. If the determination in step 940 is negative, execution proceeds to step 944 where the call type of "voice" is assigned to the call.

Upon completion of step 922, 934, 938, 942, or 944, execution proceeds to step 946, wherein all available call attributes (e.g., the call direction, source number, destination number, trunk group, trunk, channel ID, and call type), are consolidated in a concatenated call event record for use in implementing the security rule base 402. From step 946, execution proceeds to step 948 (FIG. 9B).

Referring now to FIG. 9B, in step 948, the TA 102 compares the determined call attributes within the call event record with rules in the security rule base 402. Rules are evaluated for a call event in sequential order. Steps 950–966 illustrate a process loop that is applied for each rule until either one rule's criteria meets the determined call attributes and an action is indicated for the current rule in step 964, or not all designated attributes in a rule (and hence no rule) meets the determined call attributes. The call attributes may include, but are not limited to, any Boolean combination (AND, OR, NOT) of the following: (1) direction of the call (i.e., inbound or outbound); (2) source telephone number, numbers, or mask (e.g., 210-402-XXXX) where the source number is the number of the party initiating the call (i.e., the extension assigned to a station for outbound calls, or the number extracted from caller-ID or any other means for inbound calls); (3) destination telephone number, numbers, or mask where the destination number is the number of the party receiving the call (i.e., the extension assigned to a station for inbound calls, or the number dialed, DTMF decoded or by any other means for outbound calls); (4) type of call, defined as either voice, fax, modem, or video; (5) date of call, defined as specific dates, ranges of dates, day(s)-of-week, or any combination thereof; (6) time of call, defined as specific times, ranges of times, time(s)-of-day, or any combination thereof; (7) the deployment location/ identifier of the TA 102; and (8) any other call attribute listed with reference to the call log 304.

In particular, in step 952, a determination is made whether the call direction matches the rule criteria. If so, execution proceeds to step 954, in which a determination is made whether the source matches the rule criteria. If so, execution proceeds to step 956, in which a determination is made whether the destination matches the rule criteria. If the destination matches the rule criteria, execution proceeds to step 958, in which a determination is made whether the call type matches the rule criteria. If so, execution proceeds to step 960, in which a determination is made whether the date and time fall within the rule criteria. If so, execution proceeds to step 962, in which a determination is made whether the deployment location/identifier of the TA 102 (through which the call flows), matches the "install on" rule criteria. If the "install on" rule criteria matches the TA 102 deployment location/identifier, execution proceeds to step 964, in which the action and track functions associated with the matched security rule base 402 rule are initiated.

When the criteria of the security rule base 402 rule is matched, the TA 102 performs actions and track functions dictated by the rule in step 964, which may include: allow or deny the call and conduct the call in secure mode. The TA 102 notifies the management server 106 that the security rule base 402 rule has fired. The management server 106 references the fired security rule base 402 rule and performs track functions dictated by the rule, which may include: send notifications such as electronic mail notification, pager alerting, console messaging, or a SNMP trap notification, and logging the event.

Detection and analysis of call activity and implementation of the security rule base 402 is completed in step 968, however, it is understood that call activity is monitored and analyzed during the life of the call. It is further understood that each security rule base 402 rule is evaluated in sequential order, and the security rule base 402 is exited after any one rule matches the determined call attributes. Although not shown, if the TA 102 or TA 104 detects a change in the call attributes or detects additional call attributes (not available at the time the rule requiring secure mode fired), each rule in their respective security rule base 402, except for the rule already fired by the call's previous attributes, is re-evaluated in sequential order, using the updated attributes. Actions and track functions are then performed based upon the rule matched with the updated call attribute.

Referring again to step 952, 954, 956, 958, 960, and 962, if a negative determination is made in one of these steps, execution proceeds to step 966, in which a determination is made whether the current rule is the last rule to be evaluated. If not, execution returns to step 950 and the next rule is retrieved; otherwise, execution terminates in step 968.

Result Response Policy Enforcement

Figure 10A:
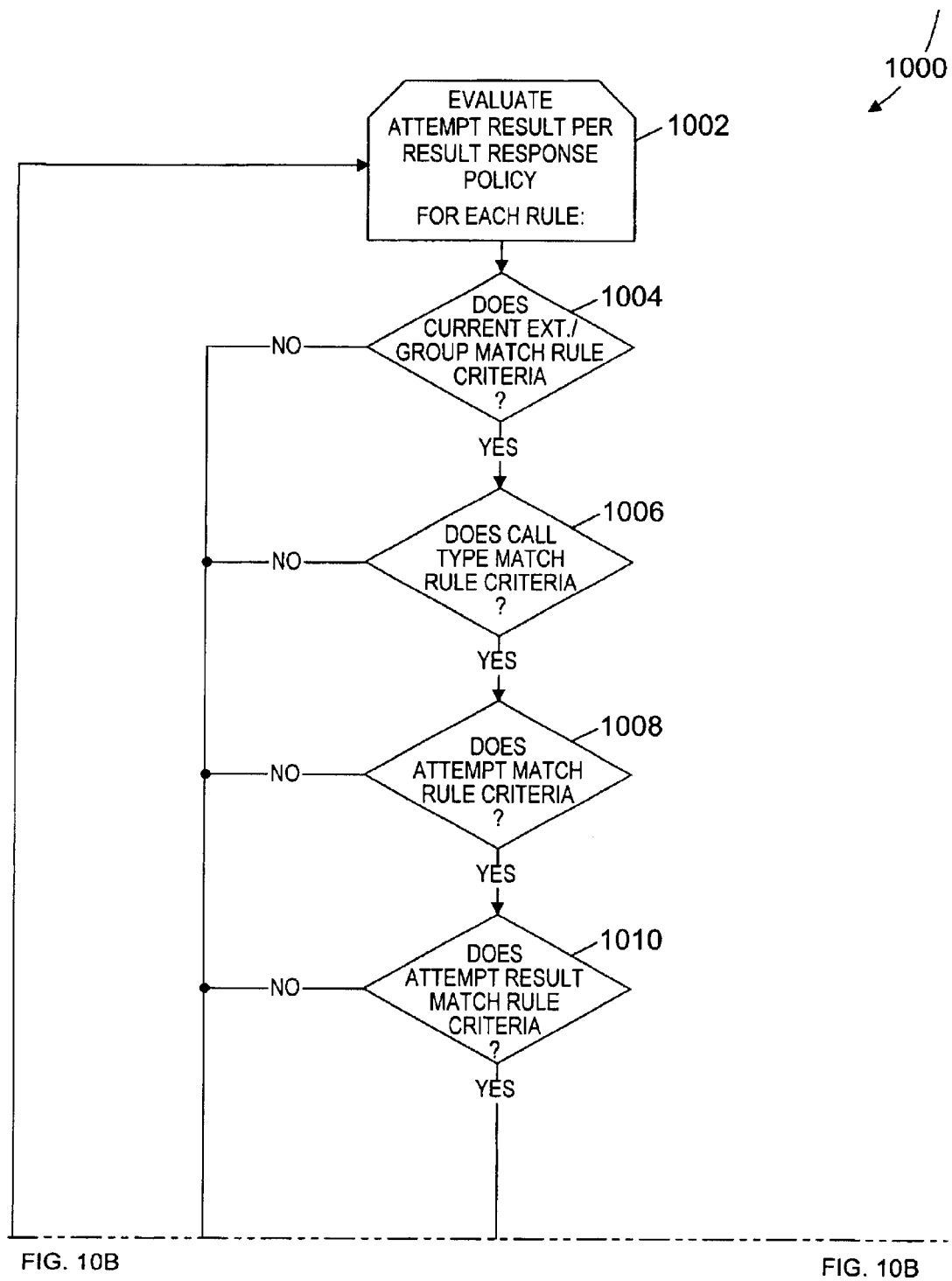
FIGS. 10A and 10B are a process flow diagram illustrating evaluation of the results of the secure call attempt and implementation of the result response policy by the virtual private switched telecommunications network of FIG. 1.
Figure 10B:
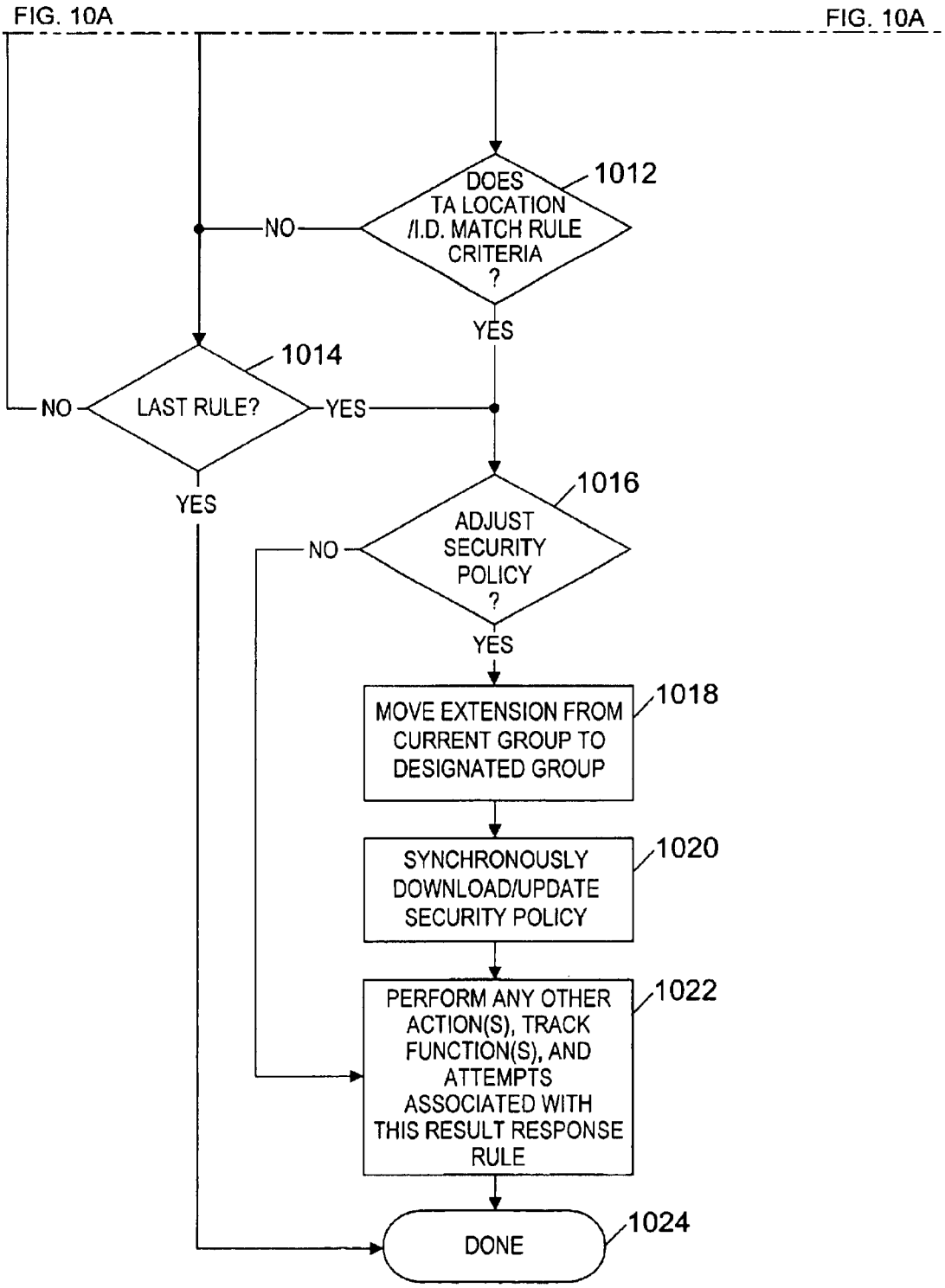

FIGS. 10A and 10B collectively illustrate a process flow diagram 1000 whereby evaluation of the results (success or failure) of the secure call attempt, and implementation of the result response policy 404, are executed by the VPSTN 100, as previously mentioned with reference to step 524–528 of FIG. 5B. In FIGS. 10A and 10B, steps 1002–1014 illustrate that the TA 102 applies a process loop, evaluating each result response policy 404 rule in sequential order until either one rule matches all designated attributes of the call and the attempt result, or no rule meets all criteria. It is understood that the VPSTN 100 is capable of operating in a continuous loop, initiating and executing secure calls while simultaneously performing appropriate actions pursuant to the security rule base 402 and result response policy 404.

Now referring to step 1002 in FIG. 10A, the TA 102 compares the result (success or failure) of the attempt to conduct the call in secure mode and the determined call attributes with the rules in the result response policy 404. The rule criteria may include, but is not limited to any Boolean combination (AND, OR, NOT) of the following: (1) current group, defined as the user group in which the inbound or outbound telephone number or extension is currently listed; (2) call type, defined as either voice, fax, modem, or video; (3) attempt, defined as the action or track function to be attempted, pursuant to the fired security rule base 402 rule (e.g., conducting the call in secure mode); (4) result, defined as the successful or failed execution of the attempted action or track function; (5) the deployment location/identifier of the TA 102; and (6) any other call attribute listed with reference to the call log 304.

In particular, in step 1004, a determination is made whether the call extension or the current group containing the call extension matches the rule criteria. If so, execution proceeds to step 1006, in which a determination is made whether the call type matches the rule criteria. If the call type attribute of the call matches the rule criteria, execution proceeds to step 1008. In step 1008, a determination is made whether the attempt made by the TA 102 (e.g. conduct the call in secure mode), matches the rule criteria If so, execution proceeds to step 1010, in which a determination is made whether the result of the attempt (e.g. success or failed), matches the rule criteria. If so, execution proceeds to step 1012, in which a determination is made whether the TA 102 location/identifier matches the "install on" rule criteria. If so, execution proceeds to step 1016.

In step 1016, a determination is made whether the matched result response policy 404 rule dictates adjustment of the security policy 302. If so, execution proceeds to step 1018, in which the management server 106 moves the extension from its current designated group into a different, designated group, and execution proceeds to step 1020. If the security policy is adjusted, in step 1020, the management server 106 synchronously downloads the updated security policy 302 to any TA 102 that is designated to use that specific security policy 302 (shown in the "install on" column). In step 1022, the action(s), track function(s) and/or additional action(s) associated with the fired result response policy 404 rule are performed. Execution is complete in step 1024.

Referring again to steps 1004, 1006, 1008, 1010, and 1012, if a negative determination is made in any of these steps, execution proceeds to step 1014, in which a determination is made whether the current rule is the last rule to be evaluated in the result response policy 404. If not, execution returns to step 1002 and the next rule is retrieved for comparison; otherwise, execution is completed in step 1024.

The VPSTN DS-0 Channel Sample

The DS-0 channel is the atomic level (the lowest level) of a standard telephony call, regardless of whether the call is voice, fax, modem, or VTC. As previously mentioned, the DS-0 channel operates at 64,000 bps. The VPSTN 100 subdivides the VPSTN DS-0 channel sample into subrate channels. The term subrate is used because each of the channels operate below the full DS-0 channel rate. The subrate channels are assigned bit positions within the VPSTN DS-0 channel sample, as discussed with reference to FIGS. 11A, 11B, and 11C. It is understood that multiple embodiments of subrate channel locations and size (bit assignments) are contemplated, subdividing the VPSTN DS-0 channel sample into two or more subrate channels based on various factors such as DS-1 type, channel impairments, the designated encryption algorithm and encryption engine, compression algorithms, etc.

Based on the type of DS-1 in which the TA is installed, as well as the enterprise's security needs, the system administrator will configure the TA to operate at select allowed secure modes represented by the VPSTN DS-0 channel samples discussed below with reference to FIGS. 11A, 11B, and 11C.

Figure 11A:
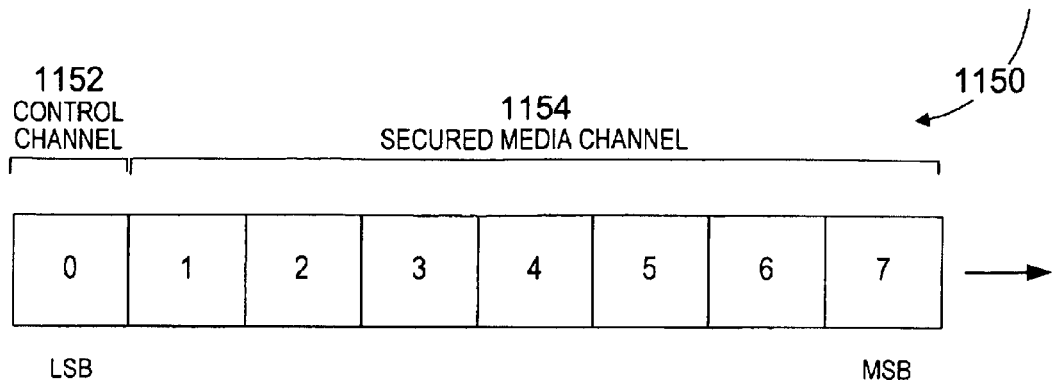
FIG. 11A is a schematic block diagram illustrating subrate channels and bit assignments in a VPSTN 100 DS-0 channel sample for data secure mode at 64 Kbps.

FIG. 11A is a schematic block diagram illustrating subrate channels and bit assignments in an exemplary VPSTN 100 DS-0 channel sample 1150 for data secure mode at 64 Kbps. The DS-0 channel sample 1150 is produced by the VPSTN 100 on a DS-1 such as an ISDN PRI trunk supporting data at 64 Kbps.

The subrate channels include a control channel 1152 (sometimes called a packet header, message, or synchronization channel), and a secured media channel 1154 (sometimes referred to as a subrate bearer, barrier, or packet payload channel). The secured media channel 1154 operates at a DS-0 subrate of 56,000 bps (7-bits per sample). The control channel 1152 operates at a subrate of 8,000 bps (1-bit per sample). The two subrate channels (the control channel and the secured media channel) add up to a rate of 64 (56+8) Kbps. The control channel 1152 is assigned bit position 0, which is the Least Significant Bit (LSB). The secured media channel 1154 is assigned bit positions 1, 2, 3, 4, 5, 6, and 7. Secure mode 64 Kbps uses 7-bit PCM, although use of compression is contemplated to allow for increased throughput.

Figure 11B:
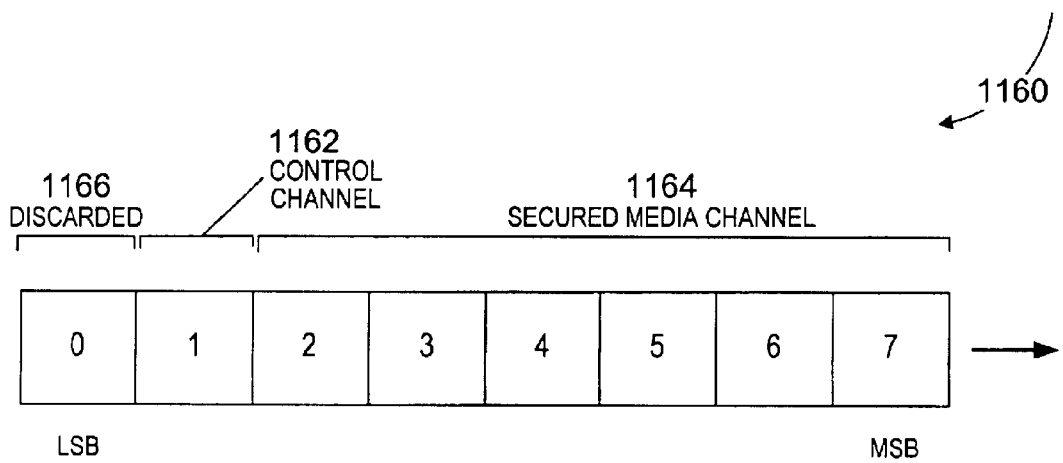
FIG. 11B is a schematic block diagram illustrating subrate channels and bit assignments in a VPSTN 100 DS-0 channel sample for data secure mode at 56 Kbps and voice secure mode at 56 Kbps.

FIG. 11B is a schematic block diagram illustrating subrate channels and bit assignments in an exemplary VPSTN 100 DS-0 channel sample 1160 for data secure mode at 56 Kbps and voice secure mode at 56 Kbps. The DS-0 channel sample 1160 is produced by the VPSTN 100 on a DS-1 such as an ISDN PRI trunk supporting data at 56 Kbps; and a T1 with no line impairments.

The subrate channels include a control channel 1162, a secured media channel 1164, and a discarded channel 1166. The secured media channel 1164 operates at a DS-0 subrate of 48,000 bps (6-bits per sample). The control channel 1162 operates at a subrate of 8,000 bps (1-bit per sample). The discarded channel contains the LSB (bit position 0). The two subrate channels add up to a rate of 56 (48+8) Kbps. The control channel 1162 is assigned bit position 1. The secured media channel 1164 is assigned bit positions 2, 3, 4, 5, 6, and 7. Data secure mode at 56 Kbps and Voice secure mode at 56 Kbps uses 6-bit PCM, although use of compression is contemplated to allow for increased throughput.

In data secure mode, using VPSTN DS-0 channel samples 1150 and 1160, the VPSTN 100 sends voice calls across the PSTN 116 as a data call, so network echo suppressors, digital pads, and other digital impairments are not present and therefore do not have to be disabled or taken into account when transmitting data.

It is contemplated that the VPSTN 100 may encrypt a call using multiple channels (such as bonded channels), using only one control channel 1152 or 1162.

As discussed with reference to FIGS. 11A, 11B, and 11C, after the call is connected, location of the control channel can be in one of several bit locations, depending on the data or voice secure mode used by the TA. Specifically referring to data calls, the synchronization/message field 1188 verifies the actual data transfer rate, thereby verifying the secure mode to be used. Verification is based on whether synchronization is accomplished using the bit 0 or the bit 1 control channel.

For example, if the TA 102 alters the call setup message to contain a request for data at 64 Kbps and subsequently receives an alert or connect message, it is assumed that the call can be conducted in 64K data secure mode. However, for verification, the TA 102 and the TA 104 both send the synchronization pattern in the synchronization/message field 1188 using both bit 0 and bit 1. If the TA 104 syncs with the pattern sent in bit 1, the TA 104 sends a message to the TA 102 using both bit 0 and bit 1. The message informs the TA 102 that the TA 104 received the sync in bit 1. Therefore, the TA 102 knows to transmit using 56K data secure mode (FIG. 11B). Similarly, the TA 102 may sync with the pattern sent in bit 0, if so, the TA 102 sends a message to the TA 104 using bit 1. The message informs the TA 104 that the TA 102 received the sync in bit 0. Therefore, the TA 104 knows to transmit using 64K data secure mode (FIG. 11A). In this way the actual data transfer rate is verified, thereby verfying the secure mode to be used. Additionally, it is autonomously discovered that the VPSTN may use two different data secure modes to conduct the secure call.

Figure 11C:
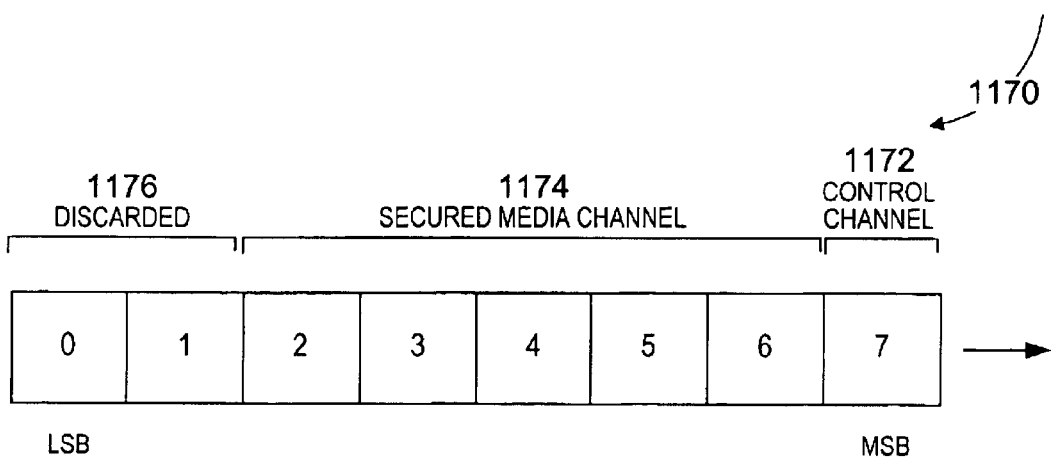
FIG. 11C is a schematic block diagram illustrating subrate channels and bit assignments in a VPSTN 100 DS-0 channel sample for voice secure mode at 48 Kbps.

FIG. 11C is a schematic block diagram illustrating subrate channels and bit assignments in an exemplary VPSTN 100 DS-0 channel sample 1170 for voice secure mode at 48 Kbps. The DS-0 channel sample 1170 is produced by the VPSTN 100 on a DS-1 such as T1 trunks with line impairments.

The subrate channels include a control channel 1172, a secured media channel 1174, and a discarded channel 1176. The secured media channel 1174 operates at a DS-0 subrate of 40,000 bps (5-bits per sample). The control channel 1172 operates at a subrate of 8,000 bps (1-bit per sample). The discarded channel contains the LSB (bit position 0) and bit position 1. The two subrate channels add up to a rate of 48 (40+8) Kbps. The control channel 1172 is assigned bit position 7, which is the Most Significant Bit (MSB). The secured media channel 1174 is assigned bit positions 2,3,4,5, and 6. Voice secure mode at 48 Kbps uses ADPCM in 5-bit mode for compressing the 8-bit data stream.

Although not shown, it is contemplated that the VPSTN 100 will also operate in voice secure modes on DS-1s such as T1 trunks supporting less than 48 Kbps information transfer rates, specifically on trunks with impairments that reduce the transfer rate to 40 Kbps, 32 Kbps, 24 Kbps, etc. For example, the VPSTN DS-0 channel sample for voice secure mode at 40 Kbps is made up of a subrate control channel operating at a subrate of 8,000 bps (1-bit per sample), a secured media channel operating at a DS-0 subrate of 32,000 bps (4-bits per sample). A discarded channel contains the LSB (bit position 0) and bit position 1 and 2. The two subrate channels add up to a rate of 40 (32+8) Kbps. The secured media channel is assigned bit positions 3, 4, 5, and 6, and the control channel is assigned bit 7. Voice secure mode at 40 Kbps uses ADPCM in 4-bit mode for compressing the 8-bit data stream.

VPSTN DS-0 channel samples for voice secure mode at 32 Kbps, and voice secure mode at 24 Kbps are similarly constructed as those previously described, such that the control channel is assigned bit 7 and operates at a subrate of 8,000 bps (1-bit per sample). For voice secure mode at 32 Kbps: the secured media channel operates at a DS-0 subrate of 24,000 bps (3-bits per sample) and is assigned bit positions 4, 5, and 6; voice secure mode at 32 Kbps uses ADPCM in 3-bit mode for compressing the 8-bit data stream; the discarded channel contains the LSB (bit position 0) and bit positions 1, 2, and 3; therefore the two subrate channels add up to a rate of 32 (24+8) Kbps. For voice secure mode at 24 Kbps: the secured media channel operates at a DS-0 subrate of 16,000 bps (2-bits per sample) and is assigned bit positions 5 and 6; voice secure mode at 24 Kbps uses ADPCM in 2-bit mode for compressing the 8-bit data stream; the discarded channel contains the LSB (bit position 0) and bit positions 1, 2, 3, and 4; therefore the two subrate channels add up to a rate of 24 (16+8) Kbps.

Figure 11D:
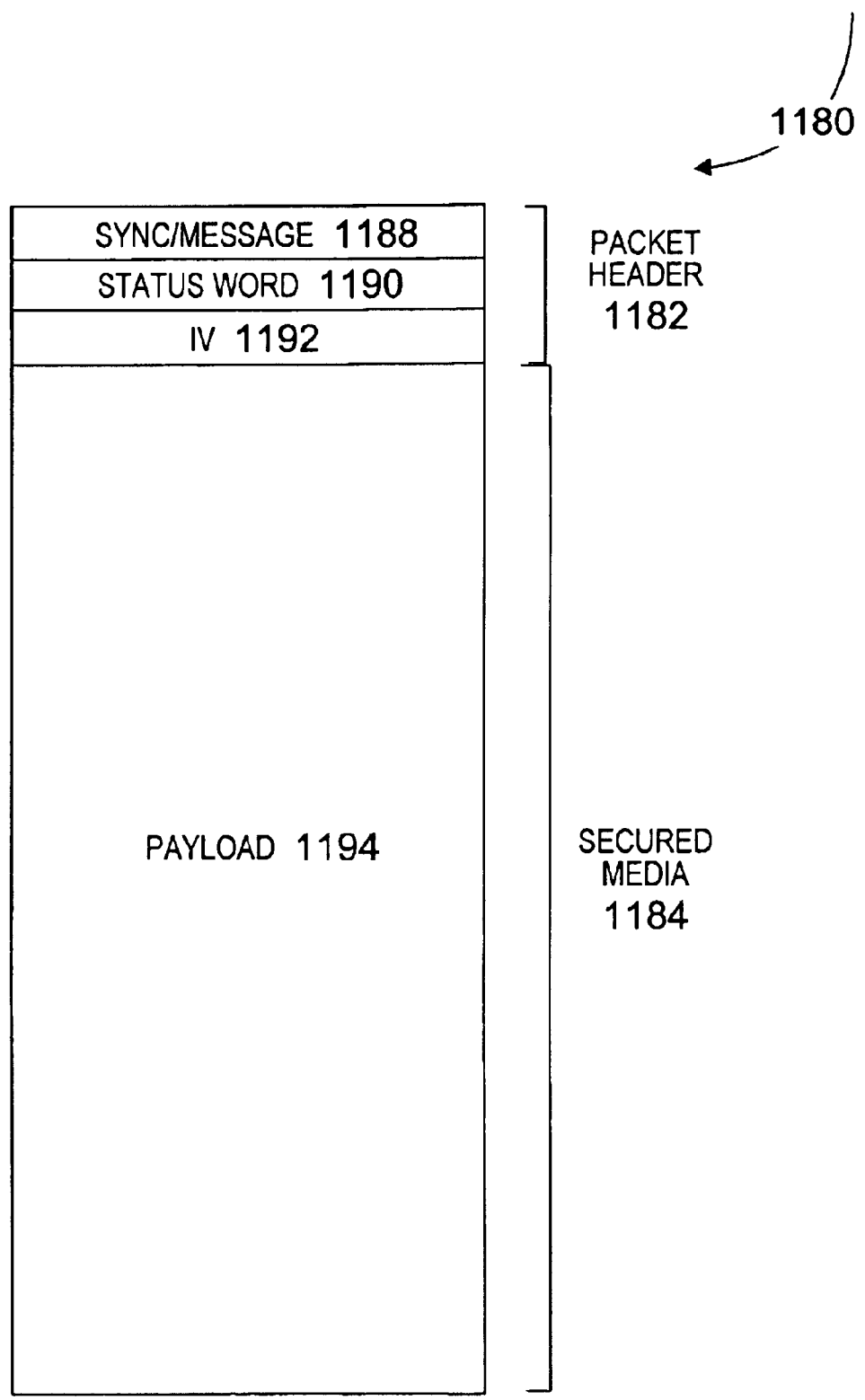
FIG. 11D is a schematic block diagram illustrating an example structure of the VPSTN 100 DS-0 packet made up of the channel samples of FIGS. 11A, 11B, or 11C.

FIG. 11D is a schematic block diagram illustrating an example structure of the VPSTN 100 DS-0 packet made up of VPSTN DS-0 channel samples 1150,1160,1170, or those samples discussed above, but not show-n. The VPSTN DS-0 packet is configured such that it can be transmitted and received over either the circuit switched PSTN 116 or a packet switched network to support secure voice over IP (VoIP). The packet header 1182 is further subdivided into 3 fields: a synchronization/message field 1188; a status word 1190, and an Initialization Vector (IV) field 1192.

The 32-bit status word field 1190 is used to transmit control data from the TA 102 to the TA 104, and vice versa. The bit-0 within the status word field 1190 indicates if encryption is enabled for that particular channel. If the TA 102 or 104 receives a packet wherein bit-0 within the status word field 1190 is set to 1, then the VPSTN DS-0 packet is indicated to contain an encrypted payload in secured media 1184 and decryption is required. Conversely, if bit-0 within the status word field 1190 is set to 0, the packet contains plaintext data and decryption is not necessary. Any set of bits or bit fields may be used to exchange control or status information between the TA 102 and the TA 104.

The synchronization/message field 1188 is used to pass messages between the TA 102 and the TA 104 (after synchronization is accomplished). Messages are used to setup a secure call, exchange and negotiate TA capabilities, exchange encryption keys, report errors, and control the call session. The synchronization/message field 1188 remains active throughout the duration of a call, and is used to initiate or discontinue secure mode while a call is in progress.

The synchronization (sync)/message field 1188 is used to transmit a fixed bit synchronization pattern, thereby providing a means for delineating the boundaries of the VPSTN DS-0 packet. The VPSTN DS-0 packet boundary is not related to the framing performed by the PSTN 116, such as the D3/D4 framing or Extended Super Frame (ESF) formats. Since the probability that a non-VPSTN 100 device would randomly produce the synchronization pattern is very low, the pattern is also used to identify or confirm that the VPSTN DS-0 packet was transmitted by a VPSTN-capable TA 102 or 104.

It is contemplated that the synchronization/message field 1188 may be used to monitor the time that it takes for VPSTN DS-0 packets 1180 to reach the other TA and return. If the timing for a "round trip" is not consistent throughout the length of the call, "man-in-the-middle" tampering, or re-routing of the circuits within the PSTN 116 may be indicated.

The Initialization Vector (IV) field 1192 is used to transport encryption algorithm parameters, such as modulus length, crypto seed, and exponents. When using the DES or 3-DES encryption algorithm, the IV field 1192 is used to initialize the algorithm with random data to perform the encryption.

The payload field 1194 may carry the channel data in a compressed format, depending on the secure mode being used. It will be understood by those skilled in the art that a wide range of compression methods may be applied, but the ITU-T G.726 Recommendation, Adaptive Differential Pulse Code Modulation (ADPCM) in 5-bit mode is the preferred method for compressing the 8-bit Pulse Code Modulated (PCM) audio data, since ADPCM 5-bit mode (which operates at 40K bps), provides voice quality equal to that of an uncompressed PCM DS-0 channel at 64 Kbps (i.e., toll quality).

Figure 12:
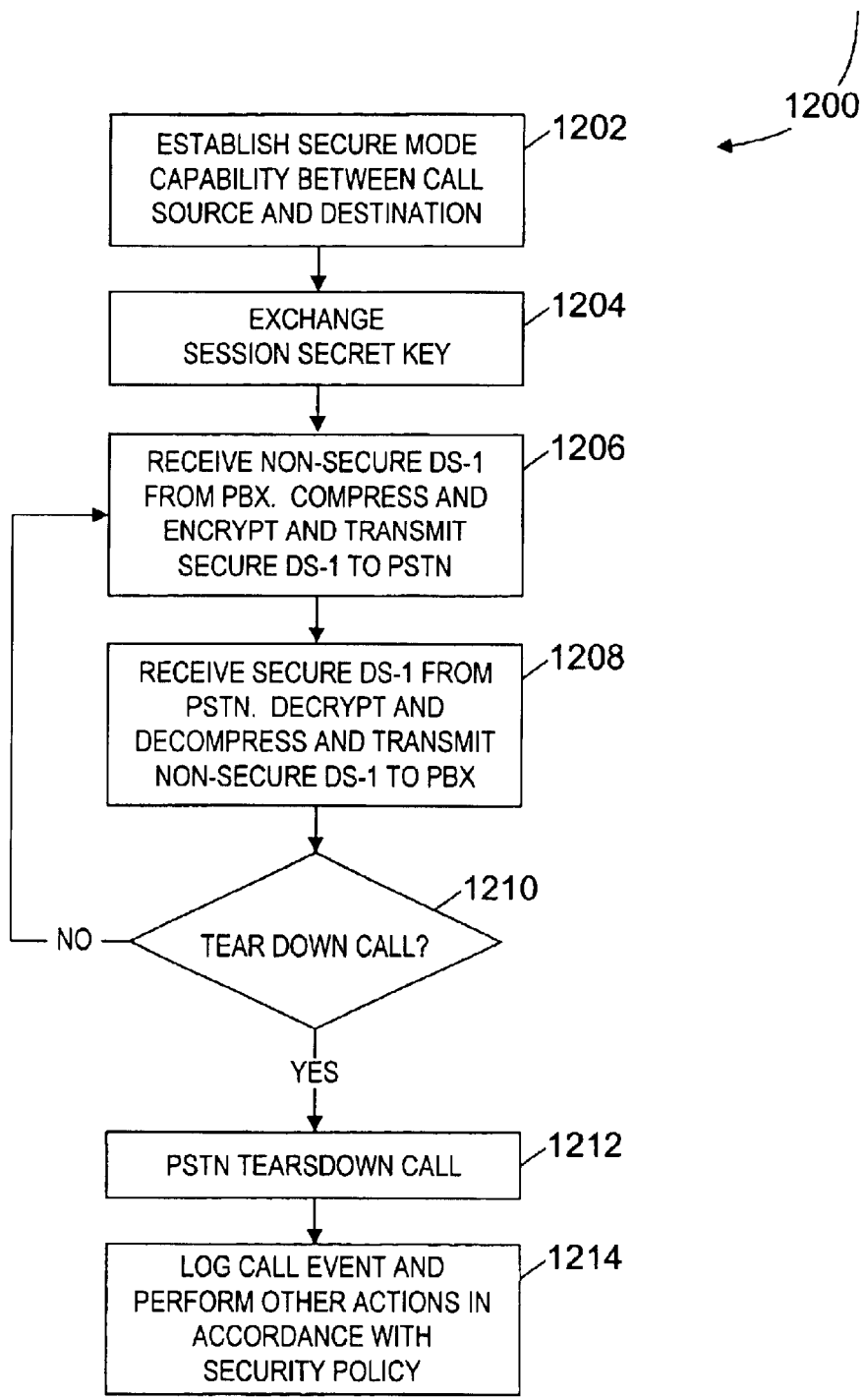
FIG. 12 is a process flow diagram illustrating the process whereby the virtual private switched telecommunications network of FIG. 1 conducts a call in secure mode.
Figure 13A:
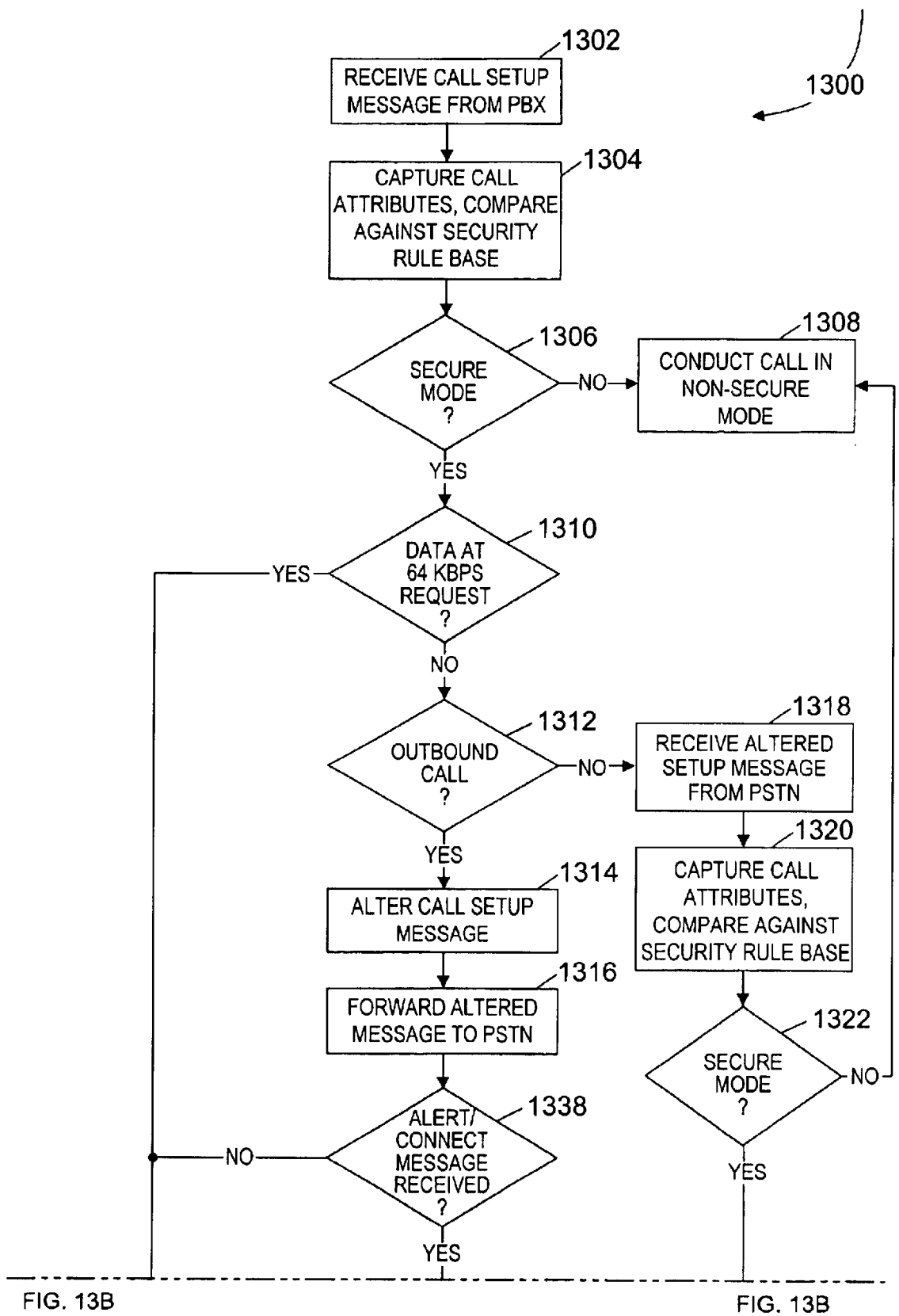
FIGS. 13A and 13B are a process flow diagram illustrating setup and conduction of a call in secure mode by the virtual private switched telecommunications network of FIG. 1, wherein the DS-1 circuit includes ISDN PRI access trunks.
Figure 13B:
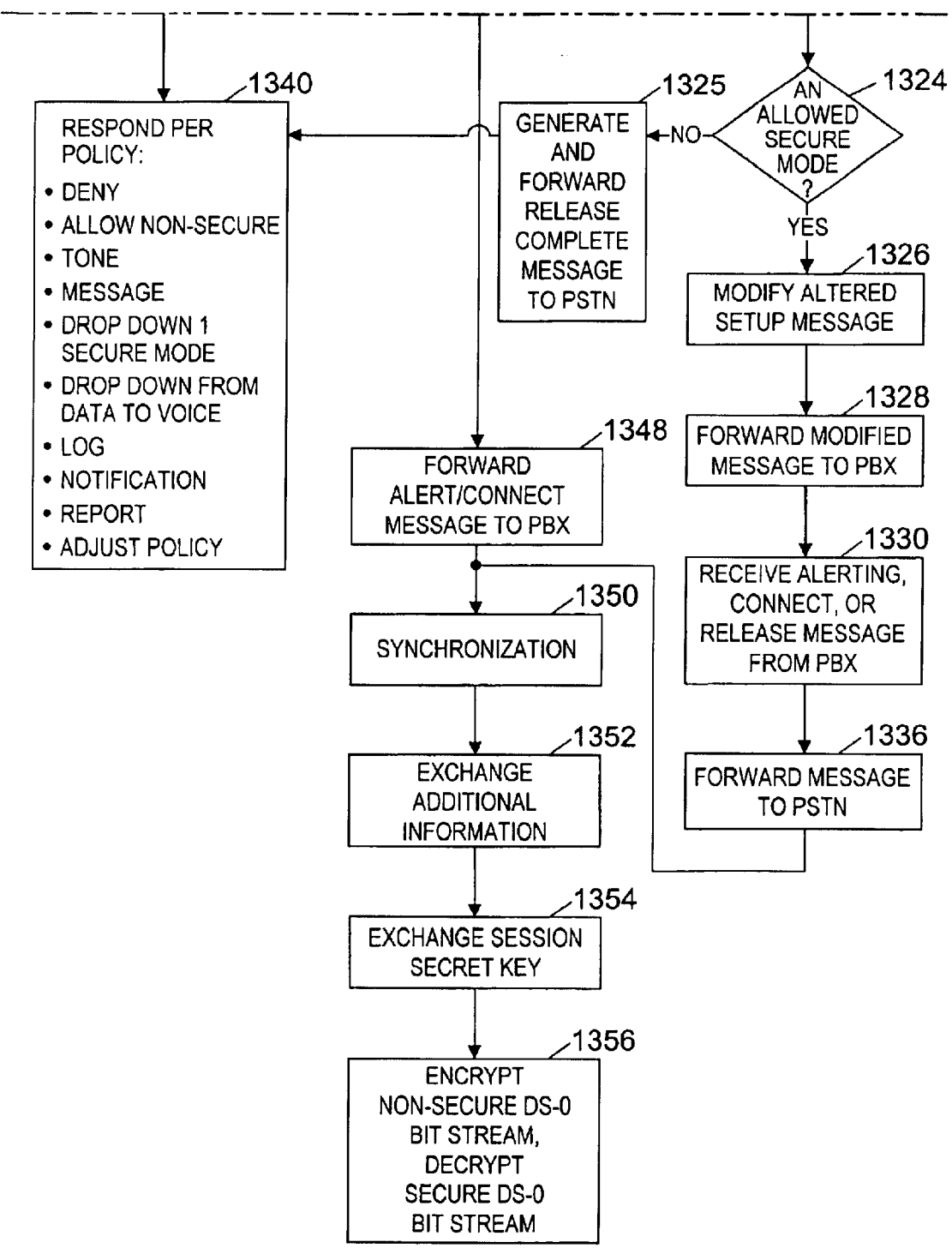
Figure 13C:
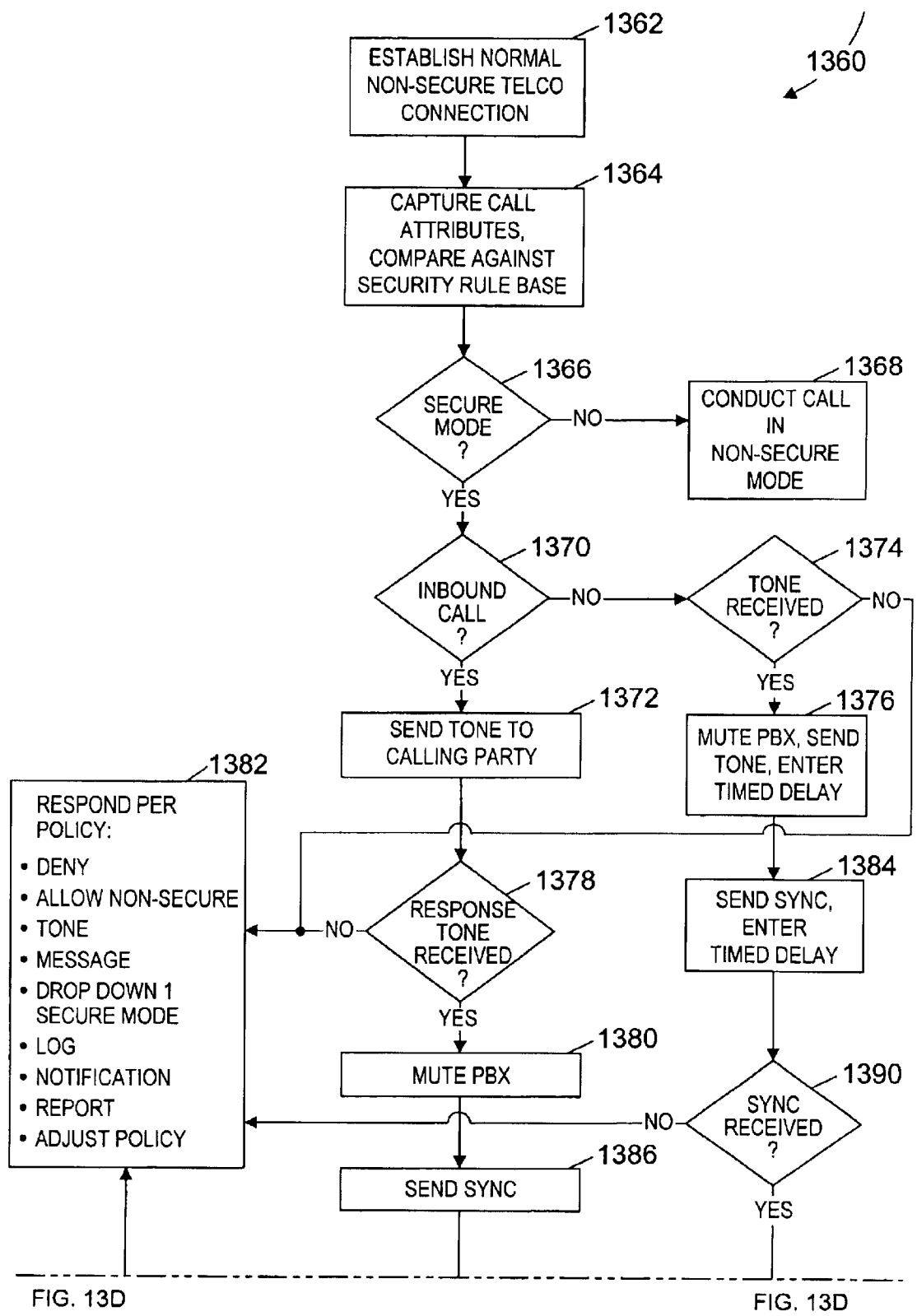
FIGS. 13C, 13D and 13E are a process flow diagram illustrating setup and conduction of a call in secure mode by the virtual private switched telecommunications network of FIG. 1, wherein the DS-1 circuit includes T1 access trunks.
Figure 13D:
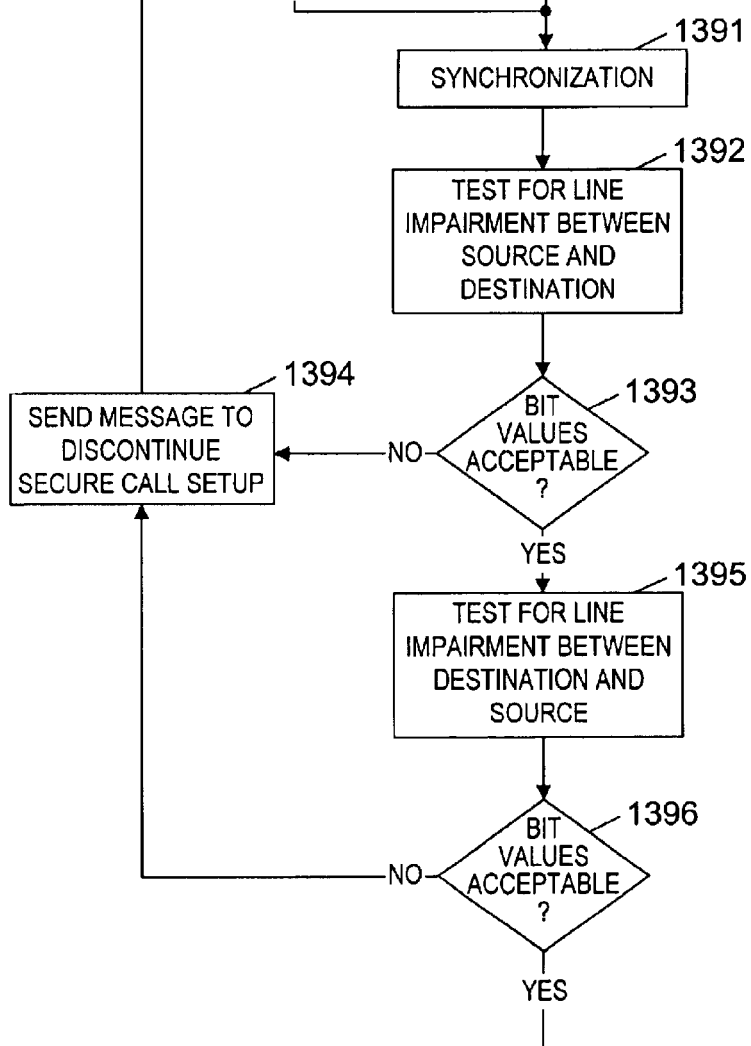
Figure 13E:
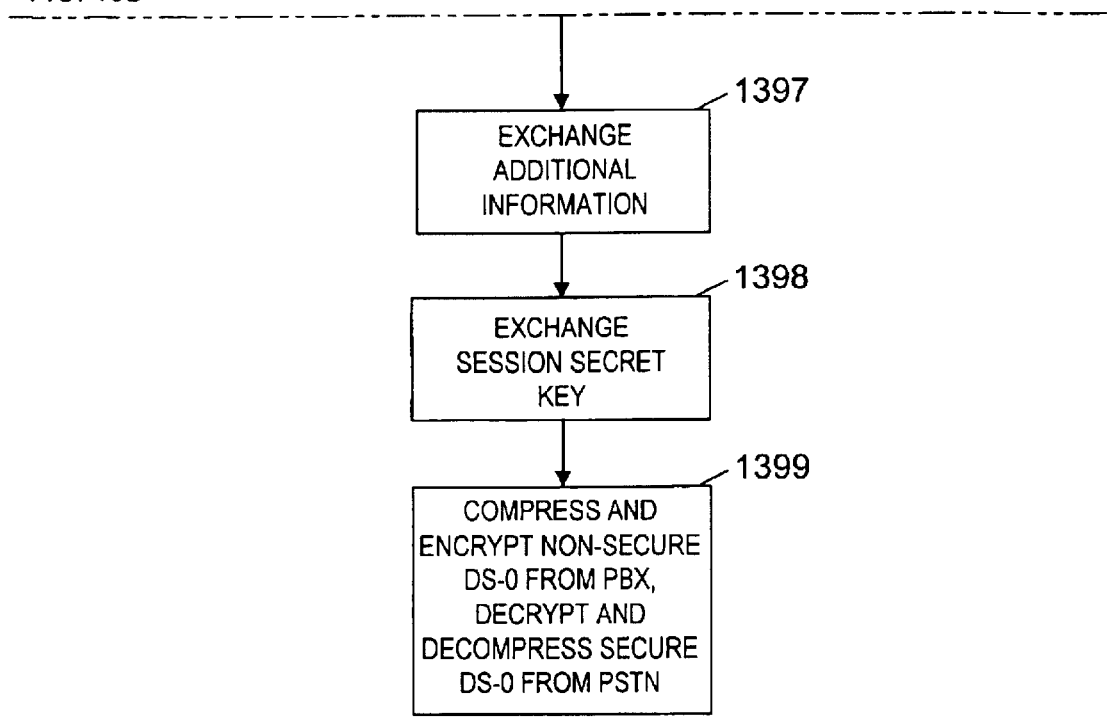

FIG. 12 is a process flow diagram illustrating the process 1200 whereby the VPSTN 100 conducts a voice call in secure mode. In step 1202, (reference will also be made to the elements within FIG. I for this example), the PSTN 116 uses normal, non-secure telecommunications processes for connecting two terminals (e.g., telephone sets 148 calls telephone set 150). Responsive to the firing of the security rule base 402 rule requiring secure communication, the TA 102 and the TA 104 either intercepts and alters the call setup message (ISDN PRI trunks) or allows the call to be connected, then performs autodiscovery, synchronization, and capabilities negotiation processes. If the TA 102 is installed in an ISDN PRI trunk and monitoring the Data (D) channel, the call setup process described with reference to FIGS. 13A–13B is executed. If the TA 102 is installed in a T1 trunk, the call setup process described with reference to FIGS. 13C–13E, is executed. It is understood by those skilled in the art that instances wherein the TA 102 or TA 104 are installed in "ISDN-like" (such as E1, SS7, or J1 trunks) or "T1-like" trunks, either: the process described with reference to FIGS. 13A–13B related to ISDN PRI trunks, the process described with reference to FIGS. 13C–13E related to T1 trunks, or a combination of portions of both processes will be used.

The session's secret key is established between the TA 102 and the TA 104 in step 1204. Various administrator-designated session keys and exchange methods are contemplated, including static keys, shared secret keys, Public Key Exchange (PKE)-transmitted session keys, digital certificates, or other key exchange mechanisms. In the case of static keys, no key exchange is required. Key exchange is performed in the synchronization/message field 1188 (FIG. 11D). In the preferred embodiment, each call (session) has two unique secret keys. The TA 102 and the TA 104 each transmit their data key using PKE, thereby creating a unique session key for each transmit channel. Following establishment and exchange of the session keys, in step 1206 the TA 102 and the TA 104 begin encrypting the payload 1194 (FIG. 11D).

In step 1206, the TA 102 PBX-in port 120 receives the non-secure DS-1 circuit data from the PBX 114. The TA 102 may compress the circuit data (if required by the DS-1 line type and the secure mode level) and encrypts the non-secure data bit stream, thereby generating the secure VPSTN DS-0 channel sample 1150 bit stream. The TA 102 PSTN-out port 122 transmits the secured DS-0 bit stream to the PSTN 116, where it is switched to the PBX 118.

In step 1208, the TA 104 PSTN-in port 128 receives the secured DS-0 bit stream from the PSTN 116. The TA 104 decrypts and decompresses (if required) the secure data stream, thereby restoring the non-secure data bit stream that was previously compressed (if required) and encrypted in step 1206. The TA 104 PBX-out port 130 transmits the non-secure DS-1 circuit data stream to the PBX 118, which transmits the signal to the telephone 150.

While not shown, it is understood that the VPSTN 100 is capable of operating in a continuous loop, synchronously handling the flow of both the receiving and transmitting DS-0 channel data streams. The process loop continues until the call is "hung up." The PSTN 116 tearsdown the call using normal telecommunications processes for disconnecting the two phone sets 148 and 150, as shown in steps 1210 and 1212.

In step 1214, the call event is logged, and any other actions and track functions required by the security policy 302, such as generation of notifications are executed.

FIGS. 13A–13B collectively show a process flow diagram for the secure call setup and conduction process 1300, whereby secure mode capabilities between the call source TA 102 and the destination TA 104 are autonomously established on a DS-1 circuit including ISDN PRI access trunks (reference will also be made to the elements in FIG. 1 for this flowchart). The secure call setup and conduction process 1300 is described herein from the perspective of the VPSTN 100 system and the call placed from the telephone 148 to the telephone 150. Steps 1302–1316, 1338–1348, and 1350–1356 describe the portion of the process 1300 relative to an outbound call. Steps 1318–1336, 1308, 1340, and 1350–1356 describe the portion of the process 1300 relative to inbound call. It is understood that step 1312 merely indicates which steps make up the portions of the process relative to the outbound call and the inbound call (actual determination of call direction is determined in steps 1304 and 1320). It is understood that both the TA 102 and the TA 104 may perform either portion of the process 1300, responsive to an inbound or an outbound call.

It is understood that when referring to FIGS. 13A–13B and 13C–13E, reference to PBX 114 or PBX 118 may also refer to the end-user station 136 or 138 directly connected to the CO 208 or PSTN 116. Further, although the same numerals are used for reference, the security policy 302, the security rule base 402, and the result response policy 404 contained within the TA 102 may or may not be identical to the security policy, security rule base, or result response policy contained within the TA 104.

In step 1302, as an audio connection is being established between the telephone 148, PBX 114, PSTN 116, PBX 118, and the telephone 150 (using the normal, non-secure method used for connecting two phone sets across the PSTN 116), the call setup message from the PBX 114 is received by the TA 102.

In step 1304, the TA 102 collects and analyzes the call attributes that are available within and at the time of the call setup message (such as call direction, source, destination, etc.), as previously mentioned with reference to steps 510–522 of FIGS. 5A and 5B and steps 912–964 of FIGS. 9A and 9B. These determined call attributes are compared against the security rule base 402. In step 1306, the TA 102 determines if all of the determined call attributes match a security rule base 402 rule, requiring the call to be conducted in secure mode. If the determination is positive, the process proceeds to step 1310.

In step 1310, the TA 102 examines the setup message and determines whether the Bearer Capability Information Element (IE) contains a PBX 114 request for data at 64 Kbps. If a negative determination is made in step 1310, (i.e., the TA 102 determines the setup message includes a request for either: (1) a data call requiring a transfer rate less than 64 Kbps, or (2) a voice call), the process for an outbound call proceeds to step 1314.

In step 1314, the TA 102 alters the setup message prior to forwarding the message to the PSTN 116. In accordance with the administrator-configured listing of allowed modes, the TA 102 changes the PBX-requested bearer capability to match the fastest administrator-allowed secure mode. For example, the TA 102 may change the PBX 114 request (i.e., the call's request) in the Bearer Capability IE from a voice call request to a request for either an unrestricted or restricted data call at 64 Kbps (data at 64 Kbps), or an unrestricted or restricted data call at 64 Kbps adapted to 56 Kbps (data at 56 Kbps), in accordance with the administrator-configured listing of allowed modes. Similarly, the TA 102 may change the PBX 114 request for data at 56 Kbps to a request for data at 64 Kbps, in accordance with the administrator-configured listing of allowed modes.

In step 1316, the TA 102 forwards the altered setup message to the PSTN 116, thereby indicating the TA 102 secure mode capability and its readiness to conduct the call in secure mode at connect time. The TA 102 then waits to receive an acknowledging response from the TA 104 in the form of an alerting or connect message. The process proceeds to step 1318.

In step 1318, the TA 104 receives the altered setup message from the PSTN 116, and in step 1320, collects and analyzes the call attributes available within and at the time of the setup message and compares the determined call attributes against the TA 104 security rule base 402. In step 1322, the TA 104 determines if all of the call attributes match a security rule base 402 rule requiring the call to be conducted in secure mode. If the determination in step 1322 is positive, the process will proceed to step 1324.

In step 1324, the TA 104 checks the Bearer Capability IE in the setup message and verifies that it matches the TA 104 administrator-configured allowable secure mode capability. As discussed with reference to step 504 of FIG. 5A, it is contemplated that configuration of the administrator-allowed data and voice secure modes may involve the selection (and allowance) of all possible data and voice transfer rates, or only certain select data and voice transfer rates. If all data and voice transfer rates are allowed (and thus all data and voice secure modes), step 1324 is eliminated and the process proceeds to step 1326. If only certain select data and voice transfer rates are allowed (and thus only certain select data and voice secure modes), and a positive determination is made in step 1324, the process proceeds to step 1326.

Having found the TA 102-altered bearer capability to be an administrator-allowed secure mode capability in step 1324, in step 1326, the TA 104 modifies the altered setup message received from the TA 102 by replacing the TA 102-altered Bearer Capability IE with a default voice bearer capability (such as a 64 Kbps 3.1 kHz audio-capable circuit with mu-law companding for T1 circuits or A-law companding for E1 circuits). In step 1328, the TA 104 forwards the modified setup message to the PBX 118. The TA 104 then waits to receive an alerting or connect message from the PBX 118.

In step 1330, the TA 104 receives either an alerting message, connect message, or a teardown (i.e., disconnect, release, release complete, teardown, end of call) message from the PBX 118. In step 1336, the TA 104 forwards the alerting message, connect message, or teardown message to the PSTN 116, thereby providing to the TA 102 an acknowledging response.

In step 1338, if the TA 102 determines it receives either an alerting or connect message (resulting in a positive determination), the process proceeds to step 1348. In step 1348, the TA 102 forwards the alerting or connect message to the PBX 114.

At call connect, the TA 102 and TA 104 know (1) there is a VPSTN 100-capable TA on the other end of the call; (2) the call will be attempted in a secure mode; and (3) the fastest secure mode capability allowable for the TA 102 and the TA 104 (i.e., 64K data secure mode, 56K data secure mode, etc.). In step 1350, at call connect, the TA 102 and TA 104 send continuous VPSTN DS-0 packets 1180 containing VPSTN DS-0 channel samples with the fixed-bit synchronization pattern in the synchronization/message field 1188 of the packet header 1182 and non-secure media in the payload 1194 (FIG. 11D). The TA 102 and TA 104 each detect the synchronization pattern in the exchanged packets and "sync up."

In step 1352, after the TA 102 and TA 104 sync, the synchronization/message field 1188 is used to exchange additional information, such as encryption options. In step 1354, the synchronization/message field 1188 is used by the TA 102 and the TA 104 to establish and exchange the session's secret key.

In step 1356, the TA 102 and TA 104 begin encryption of non-secure DS-0 circuit data from their respective PBX, thereby generating the secure VPSTN DS-0 channel sample bit streams (previously discussed with reference to FIGS. 11A–11C), that each TA sends to the PSTN 116. The encrypted (secured) media is carried in the payload 1194 of the secured media 1184 (FIG. 11D). The TA 102 and TA 104 decrypt the secure VPSTN DS-0 channel sample bit stream received from the PSTN 116, thereby generating non-secure DS-0 circuit data to send to their respective PBX.

Referring again to step 1306, if the determination is negative (i.e., if no rule is matched in step 1304, or if a rule is matched that does not require the call to be conducted in secure mode), then the TA 102 allows the call setup message from the PBX 114 to pass on to the PSTN 116, and the call will be conducted using the normal, non-secure method for conducting a call across the PSTN 116 in step 1308.

Referring again to step 1310, if a positive determination is made, that is, if the TA 102 determines that the PBX 114 requests a data call at 64 Kbps (data at 64 Kbps), it is assumed that the call will require the full bearer capability of the channel, so the call will not be conducted in secure mode, regardless of the fired security rule base 402 rule in step 1306. Therefore, if a positive determination is made, the process proceeds to step 1340 where the secure call setup process 1300 is discontinued and the TA 102 and management server 106 refer to the result response policy 404 for the prescribed response to the failure to conduct the call in secure mode.

Referring again to step 1322, if the determination is negative (i.e., if no rule is matched in step 1320, or if a rule is matched that does not require the call to be conducted in secure mode), the TA 104 allows the call setup message from the PSTN 116 to pass on to the PBX 118 and the call may be conducted using the normal, non-secure method for conducting a call across the PSTN 116 in step 1308.

Continuing with step 1322, if the call setup message (passed on to the PBX 118 as a result of a negative determination in step 1322) was an attempt by the TA 102 to set up a secure call, and if the PBX 118 sees a data call request for a call to a voice extension, the PBX 118 may terminate the call. In this case, the PBX 118 sends a teardown message, usually with a cause value. When the TA 102 receives the teardown message (a negative determination in step 1338), the process proceeds to step 1340, where TA 102 discontinues the secure call setup process 1300 and the TA 102 and management server 106 refer to the result response policy 404 for appropriate response(s) to the failure to conduct the call in secure mode.

Alternatively, if the PBX 118 connects the call to the called extension, it is likely that the TA 102 and the answering party will not synchronize, the called party will hang up, etc. The TA 102 discontinues the secure call setup process 1300 and the TA 102 and management server 106 refer to the result response policy 404 for appropriate response(s) to the failure to conduct the call in secure mode.

Referring again to step 1324, if a negative determination is made, (i.e., the TA 102-altered bearer capability is not one of the TA 104 administrator-allowed secure mode capabilities), the process proceeds to step 1325, where the TA 104 discontinues the secure call setup process 1300, generates a release complete message, and forwards the release complete message to the PSTN. It is assumed that upon receipt of the release complete message in step 1338, and in accordance with the TA 102 result response policy 404, the TA 102 will teardown the call and drop down to the next approved secure mode and reattempt to conduct the call in secure mode. For the TA 104, the process proceeds from step 1325 to step 1340 where the TA 104 and management server 108 refer to the result response policy 404 for appropriate response(s) to the failure to conduct the call in secure mode.

Referring again to step 1338, if a negative determination is made (i.e., if the TA 102 determines it receives either: (1) a progress message prior to receiving an alerting or connect message, (2) a teardown message from the PSTN 116, TA 104, or the PBX 118, the TA 102 discontinues the secure call setup process 1300 and responds to the failure to setup a secure call in step 1340, pursuant to the TA 102 result response policy 404.

In step 1340, responses by the TA and management server in accordance with the result response policy 404 may include: (1) terminate the call; (2) drop down to the next allowed secure mode and attempt to conduct the call again, (3) drop down from a data secure mode (e.g., 64K data secure mode or 56K data secure mode) to an allowed voice secure mode (56K voice secure mode, 48K voice secure mode, 40K voice secure mode, 32K voice secure mode, or 24K voice secure mode) and attempt to conduct the call again; (4) allow the call to be conducted using the normal, non-secure method for conducting a call across the PSTN 116; or (5) provide a warning tone or message indicating to the local call party that the call is not secure. Responses by the management server in accordance with the result response policy 404 may include: (1) log the event; (2) send notifications to designated personnel; and (3) generate a report.

Referring again to step 1340, it is understood that the result response policy 404 may be configured to dictate select responses based on the TA-determined reason the attempt to conduct the call in secure mode has failed. For example in response to determined reasons such as (1) the TA 102 receives a teardown message (usually with a cause value) from the PBX 118; (2) the TA 102 receives a release complete message from TA 104; (3) the TA 102 receives a progress message prior to receiving an alerting or connect message; and (4) the TA 102 receives a teardown message (usually with a cause value) from the PSTN 116; the result response policy 404 may require the TA 102 to make certain prescribed responses.

Further, select responses dictated by the result response policy 404 may be based on certain cause values contained within teardown messages. For example, it is contemplated that the result response policy 404 may dictate that all teardown messages with cause values associated with the bearer capability (or with only certain specified bearer capability cause values) cause the TA 102 to drop down to the next allowed secure mode and attempt to conduct the call in secure mode again. It is further contemplated that all teardown messages with cause values not specifically associated with the bearer capability (or only certain specified cause values not associated with the bearer capability) cause the TA 102 to drop down from a data secure mode to a voice secure mode and attempt to conduct the call again. It is understood that the select responses dictated by the result response policy 404 may be programmed, user-configurable, or a combination thereof.

If the result response policy 404 dictates the TA 102 is to terminate (deny) the call, the TA 102 generates a teardown message or allows the teardown message from the PSTN 116 or PBX 118 to pass on to the PBX 114.

If the result response policy 404 dictates the TA 102 is to drop down to the next secure mode (e.g., from data at 64 Kbps to data at 56 Kbps), and attempt to conduct the call again, the TA 102 tearsdown the call and returns to step 1314, wherein the TA 102 alters a copy of the forwards the new call setup message to the PSTN 116 in step 1316, and steps 1318 through 1348 are repeated.

If the result response policy 404 dictates the TA 102 is to drop down from a data secure mode to a voice secure mode and attempt to conduct the call again, the TA 102 tearsdown the call and returns to step 1314, wherein the TA 102 inserts a copy of the original call setup message (which requested a voice call). The TA 102 forwards the new call setup message to the PSTN 116 and the call is setup and conducted in secure mode as described with reference to FIGS. 13C–13E.

If the result response policy 404 dictates the TA 102 is to allow the call to continue in non-secure mode, the TA 102 tearsdown the call and returns to step 1314, wherein the TA 102 inserts a copy of the original call setup message (which requested a voice call). The TA 102 forwards the new call setup message to the PSTN 116 and the call is setup and conducted in the normal, non-secure method used for a call between two phone sets across the PSTN 116.

It is understood that call activity is monitored and analyzed during the life of the call. It is further understood that each security rule base 402 rule is evaluated in sequential order, and the security rule base 402 is exited after any one rule matches the determined call attributes. Although not shown, if the TA 102 or TA 104 detects a change in the call attributes or detects additional call attributes (not available at the time the rule requiring secure mode fired), each rule in their respective security rule base 402, except for the rule already fired by the call's previous attributes, is re-evaluated in sequential order, using the updated attributes. Actions and track functions are then performed based upon the rule matched with the updated call attribute. In the case of a rule firing after another rule has fired, if secure mode is not required by the most recently fired rule, encryption (secure mode) is discontinued and the TA 102 and TA 104 and their respective management servers respond to the failure to continue to conduct the call in secure mode in step 1340, pursuant to their respective result response policy 404.

In a alternate embodiment, it is contemplated that the VPSTN 100 may be programmed or user-configurable such that during the secure call setup and conduction process 1300, the TA checks whether the User-to-User Information IE (UUI IE) is available (e.g., after steps 1312, 1322, and 1338). If the UUI IE is available, the TA uses the UUI IE to setup the secure call as described in U.S. patent application Ser. No. 10/625,311, entitled "An Improved Virtual Private Switched Telecommunications Network". If the UUI is available, the TA may implement the security policy 302 based on zero or more call attributes. If the TA finds the UUI IE is not available for use, the VPSTN 100 performs the secure call setup process 1300 as described herein and based on one or more call attributes.

FIGS. 13C and 13D collectively show a process flow diagram for the secure call setup process 1360, whereby secure mode capabilities between the call source TA 102 and the destination TA 104 are autonomously established on a DS-1 circuit which includes T1 access spans (reference will also be made to the elements in FIG. 1 for this flowchart). The secure call setup and conduction process 1360 is described herein from the perspective of the VPSTN 100 system and the call placed from the telephone 148 to the telephone 150. It is understood that step 1370 merely indicates which steps make up the portions of the process relative to the outbound call and the inbound call (actual determination of call direction is determined in steps 1364). It is understood that both the TA 102 and the TA 104 may perform either portion of the process 1360, responsive to an inbound or an outbound call.

In step 1362, an audio connection is established between the telephone 148, PBX 114, PSTN 116, PBX 118, and the telephone 150 in the normal, non-secure method used for connecting two phone sets across the PSTN 116. Once the audio connection is established, two non-secure DS-0 channel data streams flow in a full duplex manner between the two phone sets.

In step 1364, the TA 102 and TA 104 respectively collect and analyze the call attributes that are available at the time of call connection, as previously mentioned with reference to steps 510–522 of FIGS. 5A and 5B and steps 912–964 of FIGS. 9A and 9B. Each TA compares their determined call attributes against their respective security rule base 402. In step 1366, each TA determines if all of their respectively determined call attributes match a security rule base 402 rule, requiring the call to be conducted in secure mode. If the determination is positive, the process proceeds to step 1370. If the determination is negative (i.e., if no rule is matched in step 1364, or if a rule is matched that does not require the call to be conducted in secure mode), then the call will be conducted using the normal, non-secure method for conducting a call across the PSTN 116 in step 1368.

If in step 1366, each TA determines that the fired security rule requires the call to be conducted in secure mode, the TA 102 and TA 104 respond accordingly to perform an autodiscovery, synchronization, negotiation and exchange process to setup a secure call as described below.

Shortly after audio establishment between the two telephones 148 and 150, an autodiscovery process is executed. In the preferred embodiment of the autodiscovery process, the TA 104, having received an inbound call firing a security rule base 402 rule designating that the call is to be conducted in secure mode, sends a tone to the TA 102 in step 1372. In this process, the tone identifies the TA 104 as being VPSTN-capable.

In step 1374, the TA 102 receives the tone, and in step 1376, responds by sending "silence" or "comfort noise" to the PBX 114 and a responsive tone to the TA 104. This responsive tone identifies the TA 102 as being VPSTN-capable. The TA 102 then enters a timed delay to allow the TA 104 time to receive the tone and mute its PBX.

In step 1378, the TA 104 receives the responsive tone from the TA 102, and sends "silence" or "comfort noise" to the PBX 118 in step 1380. If the TA 102 is not VPSTN-capable and does not send a tone in step 1376, the TA 104 times-out while waiting for the response tone in step 1378. If the TA 104 times-out, it discontinues the secure call setup process 1360 and responds to the failure to setup a secure call in step 1382, pursuant to the result response policy 404. If the TA 104 is not VPSTN-capable and does not send a tone in step 1372, the TA 102 times-out while waiting for the response tone in step 1374. If the TA 102 times-out, it discontinues the secure call setup process 1360 and responds to the failure to setup a secure call in step 1382, pursuant to the result response policy 404. It will be understood by those skilled in the art that either the TA 102 or the TA 104 may initiate the autodiscovery process begun in step 1372.

In step 1384, the TA 102 sends to the TA 104, VPSTN DS-0 packets containing VPSTN DS-0 channel samples with the fixed-bit synchronization pattern in the synchronization/message field 1188 of the packet header 1182 (FIG. 11D). The TA 102 then enters a timed delay as it waits to receive packets containing the synchronization pattern from the TA 104.

The TA 104 sends VPSTN DS-0 packets containing the fixed-bit synchronization pattern to the TA 102 in step 1386. If the TA 104 does not receive the synchronization pattern from the TA 102 in step 1387, the TA 104 will generate tones to disable any echo suppressors in the PSTN 116 in step 1388. Echo suppressors, if present, alter transmitted data.

In step 1389, if the TA 104 still does not receive the packets containing the synchronization pattern from TA 102, the TA 104 discontinues the secure call setup process 1360 and responds to the failure to setup a secure call in step 1382, pursuant to the result response policy 404. If the TA 102 times-out while waiting to receive the synchronization pattern from the TA 104 in step 1390, the TA 102 discontinues the secure call setup process 1360 and responds to the failure to setup a secure call, pursuant to the result response policy 404, instep 1382.

If the TA 102 and TA 104 each receive their respective packets containing the synchronization pattern in either step 1387, 1389, or 1390, they detect the synchronization pattern in the exchanged packets and "sync up" in step 1391.

Following synchronization, the TA 102 and the TA 104 exchange messages to determine the existence of line impairments on the two DS-0 channels flowing between the TA 102 and the TA 104. In steps 1392 and 1395, the TA 102 and the TA 104 send a secured media payload 1194, the content of which is "known" by both TAs. In steps 1393 and 1396, the TA 102 and the TA 104 compare the received payload with the known payload and determine if line impairments changed some of the known bit values during transmission of the respective payloads.

If in step 1393, the TA 104 determines that bits have changed value during transmission and line impairments are too severe to be overcome by DIL-like processes, the DS-0 channel cannot support the VPSTN process 1200 at the current secure mode level. If this is the case, in step 1394 the TA 104 sends a message telling the TA 102 to discontinue the secure call setup process 1360, and then responds to the failure to setup a secure call in step 1382. Upon receipt of the discontinue message, the TA 102 and management server 106 respond to the failure to conduct the call in secure mode, pursuant to the security policy, in step 1382.

If in step 1396, the TA 102 determines that bit values have changed during the transmission and line impairments are too severe to be overcome by DIL-like processes, the TA 102 discontinues the secure call setup process 1360. If this is the case, in step 1394 the TA 102 sends a message telling the TA 104 to discontinue the secure call setup process 1360, and then responds to the failure to setup a secure call in step 1382. Upon receipt of the discontinue message, the TA 104 and management server 108 respond to the failure to conduct the call in secure mode, pursuant to the security policy, in step 1382.

If the TA 102 and the TA 104 determine that bit values have not changed or that line impairments can be overcome by DIL-like processes, the process proceeds to step 1397. The DIL-like processes determine a constellation of symbols representing the control channel 1172 and secure media channel 1174 value to be transmitted. The number of symbols in the constellation indicates the voice secure mode that can be supported by the side that sent the known value in step 1392 or 1395. The results of the DIL process determines which, if any, of the system administrator-allowed secure modes can be used. If none of the administrator-allowed secure modes can be used, the TA 102 and the TA 104 discontinue the secure call setup process 1360 and respond to the failure to conduct the call in secure mode, pursuant to the result response policy 404, in step 1382.

In step 1397, the synchronization/message field 1188 is used to exchange additional information, such as compression and encryption options. In step 1398, the synchronization/message field 1188 is used by the TA 102 and the TA 104 to establish and exchange the session's secret key.

In step 1399, the TA 102 and TA 104 begin encryption (or compression and encryption) of non-secure DS-0 circuit data from their respective PBX, thereby generating the secure VPSTN DS-0 channel sample bit streams (previously discussed with reference to FIGS. 11B–11D), that each TA sends to the PSTN 116. The TA 102 and TA 104 decrypt (or decrypt and decompress) the secure VPSTN DS-0 channel sample bit stream received from the PSTN 116, thereby generating non-secure DS-0 circuit data to send to their respective PBX.

Referring again to step 1382, it is understood that the result response policy 404 may be configured to dictate select responses based on the determined reason the attempt to conduct the call in secure mode has failed. For example, in response to determined reasons such as (1) the TA 102 receives no tone in step 1374; (2) the TA 104 receives no responsive tone from the TA 102 in step 1378; (3) the TA 104 receives no packets containing the synchronization pattern in step 1387; (4) the TA 104 receives no packets containing the synchronization pattern in step 1389; (5) the TA 102 receives no packets containing the synchronization pattern in step 1390; (6) line impairments between the TA 102 and TA 104 are too severe to overcome in step 1393; and (7) line impairments between the TA 104 and TA 102 are too severe to overcome in step 1396; the result response policy 404 may require the TA 102 and/or TA 104 to make responses such as: (1) terminate the call; (2) drop down to the next voice secure mode (voice at 48 Kbps, 40 Kbps, 32 Kbps, etc.) and attempt to conduct the call again, or (3) allow the call to continue in non-secure mode.

If the TA 102 or the TA 104 are to allow the call to continue in non-secure mode, coordinating messages are exchanged using the synchronization/message field 1188, encryption and compression are not initiated, and the call is conducted in the normal, non-secure method used for a call between two phone sets across the PSTN 116.

Distributed Deployment

In FIG. 14, reference numeral 1400 designates an alternative embodiment of the VPSTN 100 of FIG. 1, featuring a distributed deployment thereof. Due to their distributed nature, many companies are challenged to enforce a telecommunications security policy across their organization. The VPSTN 1400 enables a distributed organization to limit duplication of effort and ensure consistent application of the security policy 302 across multiple locations. Although the VPSTN 1400 components are necessarily distributed, policy can be dictated centrally. This requires an organization to configure and control security devices in a top-down fashion. In order to assess the company-wide security posture, detailed visibility into the entire organizational data stream is provided by collection at the device level, reporting up the management chain, consolidating multiple reports at the management server 106 for viewing, report filtering/configuration, and printing at the client 110.

The VPSTN 1400 depicted in FIG. 14 supports distribution of one or more of the TA 102 (represented by numeral 1402) in remote locations, all interconnected by a TCP/IP-based LAN, private WAN, or the Internet (any of which are identified herein with numeral 1403). With this type of configuration, a geographically separated organization can leverage security expertise in one central location by consolidating the security events and attempt results of the distributed TA 102 with the responses of the management server 106, all on one client 110.

Multi-Tiered Policy-Based Enforcement of a Security Policy

Figure 15A:
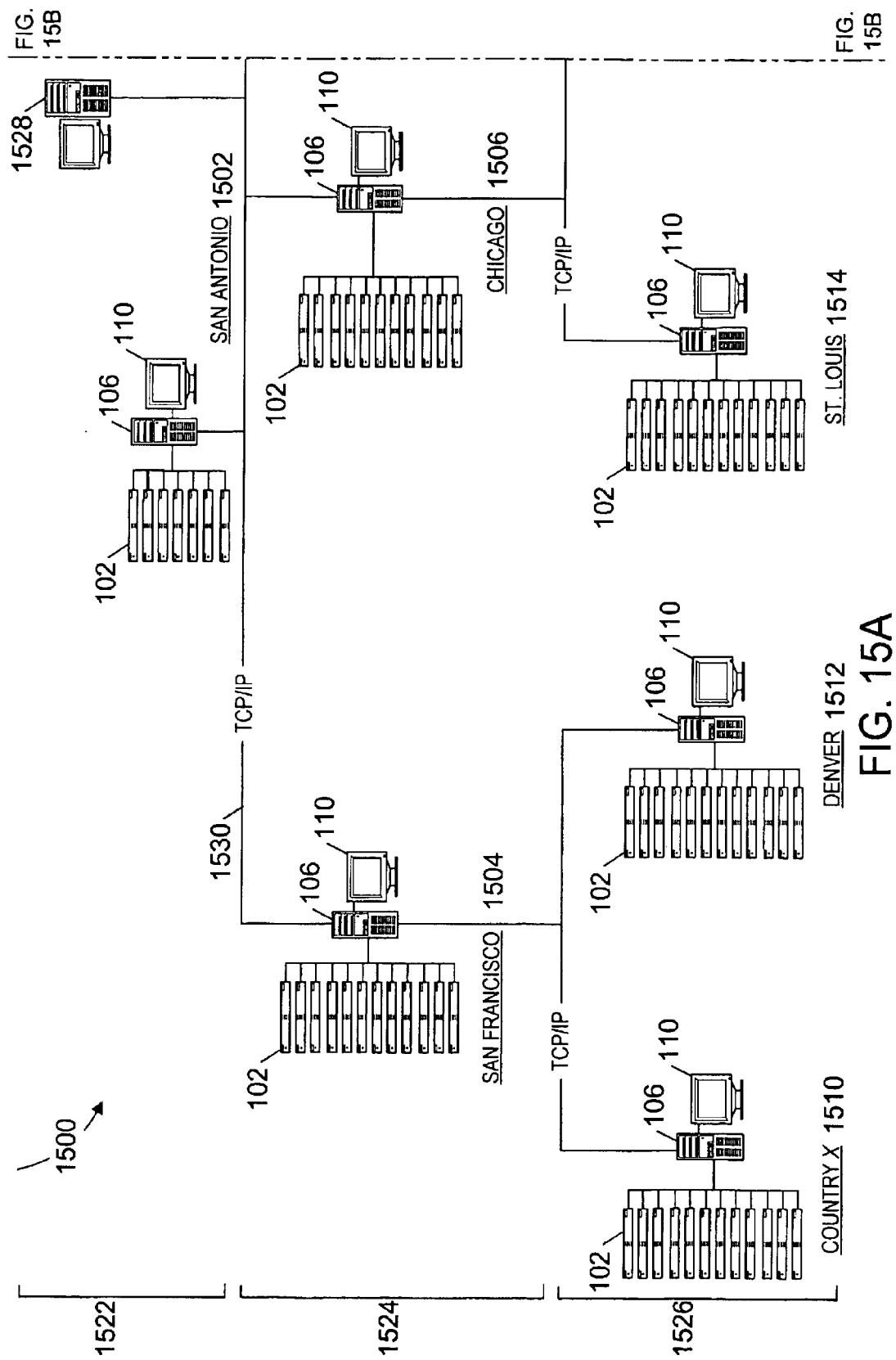

In FIGS. 15A and 15B, reference numeral 1500 represents an alternative embodiment of the VPSTN 100 of FIG. 1, featuring a system and method of multi-tiered policy-based enforcement of a security policy 1540 across a large, globally distributed enterprise.

The method of distributed deployment previously discussed and illustrated in FIG. 14 is applicable for a small- to medium-sized distributed organization, but processing all the security events from the hundreds of TA 102 that would be deployed in a medium- to large-sized globally distributed enterprise would quickly overload a lone management server 106. Additionally, a single management server 106 would not provide the remote locations with a degree of control over, or visibility into, their own security status.

As illustrated in FIGS. 15A and 15B, a management server 106 and client 110 installed at each location (such as San Antonio 1502, San Francisco 1504, Chicago 1506, Washington D.C. 1508, Country X 1510, Denver 1512, St. Louis 1514, Pittsburgh 1516, New York City 1518, and Atlanta 1520), will divide traffic load and allow management and implementation of the security policy 1540 on a more localized basis. Unfortunately, deployment of multiple independent VPSTN 100 makes it difficult to ensure the same basic security structure across the enterprise. Additionally, consolidation of local logging information to provide visibility into important local security events at the highest corporate level is difficult and labor-intensive.

The VPSTN 1500 (i.e., a multi-tiered policy-based enforcement of the security policy 1540 within a distributed architecture), ensures implementation of a basic, enterprise-wide security policy 1540 with a degree of localized policy control, as well as automatic security event log consolidation and visibility into important local security events at the highest corporate level.

As shown in FIGS. 15A and 15B, within a multi-tiered management environment, a "corporate" level 1522 management server 1528 oversees its own local management server 106 at San Antonio 1502 as well as multiple "regional" level 1524 management servers 106 at San Francisco 1504, Chicago 1506, and Washington D.C. 1508. These "regional" management servers oversee multiple "branch" level 1526 management servers 106 at Country X 1510, Denver 1512, St. Louis 1514, Pittsburgh 1516, New York City 1518, and Atlanta 1520. Each management server 106 within the multi-tiered environment 1500 enforces the security policy 1540 for its local one or more TA 102, and in accordance with the management server tier position, may also oversee management servers below it. Each location is interconnected by a TCP/IP-based LAN, private WAN, or the Internet (any of which are identified herein with numeral 1530). For the purpose of simplification, the examples will pertain to the "corporate" level 1522 management server 1528 in San Antonio 1502 overseeing the "regional" level 1524 management server 106 in San Francisco 1504, which will oversee the "branch" level 1526 management server 106 in Country X 1510 and the "branch" level 1526 management server 106 in Denver 1512.

Just as a CEO imparts guidelines of conduct to his VPs, who in turn impart fundamentally similar guidelines to their Directors, so does the "corporate" level 1522 management server 1528 define a basic security policy 1540 to the "regional" level 1524 management server 106 in San Francisco 1504, that in turn disseminates a fundamentally similar security policy to the "branch" level 1526 management server 106 at Country X 1510 and Denver 1512.

For example, a corporate-dictated security policy 1540 will contain basic rules (i.e., a security rule base 1542 and a result response policy 1544). These rules are classified as either "Required" or "Optional". Each level of the hierarchical environment must adhere to a required rule, but can choose to ignore optional rules. Each level of the tier is capable of making their local rules and the rules for the tiers below it more stringent than the corporate-dictated rules, but can not make the rules more lax. In this way, a basic security structure is ensured across the enterprise.

The corporate-dictated security policy 1540 contains basic security rules that dictate what information will be reported upward, thereby providing visibility into only the most important local security events at the corporate level. Just as the corporate-dictated rules send security guidelines that may become more stringent as the rules are passed downward, the policy institutes an information filter that becomes more selective as electronic mail, logs and reports, etc., are routed upward. The tasks in the "Tracks" column of the corporate-dictated rule (such as electronic mail notification, pager notification, logging of events, etc.), that are of interest at a local level but are not of interest at higher levels, are designated to be filtered out if notification of a rule firing is to be routed up the tier. All logging is real-time, both at the location where the event occurs and at upper levels of the organization that, pursuant to the security policy 1540, may or may not require notification of the event.

FIGS. 15C, 15D and 15E, collectively illustrate rules in an exemplary security rule base 1542, for use in implementing multi-tiered policy-based enforcement of the security policy 1540. Although not shown, it is understood that the result response policy 1544 is similarly configured. As previously mentioned with respect to the security rule base 402 shown in FIG. 4 and FIGS. 7A–7B, rules based upon call attributes including "Direction;" "Source;" "Destination;" "Call type;" "Date;" "Time;" and "Duration;" (not shown); implement an "Action" (allow or deny the call); other additional actions and logging, reporting and notification functions, "Track." Additionally, each rule has the TA 102 deployment location/identifier "Install On", allowing an enterprise to implement one single security rule base 1542 containing rules designated to be applied in specific locations. As shown in FIGS. 15C–15E, when implementing multi-tier policy-based enforcement, the attributes of the rules are expanded to include "Class", a classification of adherence to a rule as either "Required" or "Optional" or "Local". Any rule that is not a corporate-dictated rule will be designated as a local rule. If notification of a rule "firing" is to be routed up the tier to the management server 1528, "Route" will appear in the "Track" column, dictating that when a management server 106 is notified by a subordinate management server 106 that a rule has fired, the notification will be routed upward to the next higher-tiered management server 106. Additionally, if notification of a rule "firing" is to be routed upward, tasks listed in the "Track" column are designated to be filtered (F), if execution of the task should take place only at the location where the rule originally fired and the local TA 102 notified the management server 106. By filtering the tasks in the "Track" column, the policy will designate which tasks, such as event logging will be performed at each level of the tier, when a rule "fires" at a subordinate level of the tier.

Rules 1–10, are explained as follows, it being understood that the security rule base 1542 for multi-tiered policy-based enforcement of the security policy 1540 shown in FIGS. 15C–15E may include any number and types of rules, and that each rule is evaluated in sequential order, exiting after any one rule matches all the call criteria.

Rule 1:

This rule states "Deny outbound calls from extensions in the VPSTN non-secure group, generate an electronic mail and page, and log the call." This rule is installed on all TA 102. This rule identifies and segregates lines and denies calls over the lines which are in the VPSTN non-secure group and logs the call for accounting purposes. Adherence to this rule is required. Since the firing of this rule is an indication of security posture, it is of interest to the upper echelon. As notification of the rule "firing" is made at each upper level of the hierarchy, the event is logged, but electronic mail and pager notification is filtered out. Note that (F) designates that the tasks of generating electronic mail and pager notification is filtered out. Generation of an electronic mail and pager notification takes place only at the location where the TA 102 notifies the management server 106 that the rule "fired."

Rule 2:

This rule states "Deny inbound calls to extensions in the VPSTN non-secure group, generate an electronic mail and page, and log the call." This rule is installed on all TA 102. This rule identifies and segregates lines and denies calls over the lines which are in the VPSTN non-secure group and logs the call for accounting purposes. Adherence to this rule is required. Since the firing of this rule is an indication of security posture, it is of interest to the upper echelon. As notification of the rule "firing" is made at each upper level of the hierarchy, the event is logged, but electronic mail and pager notification is filtered out. Generation of an electronic mail and pager notification takes place only at the location where the TA 102 notifies the management server 106 that the rule "fired."

Rule 3:

This rule states "Allow inbound fax calls to extensions in the fax group between 9pm and 6am, conduct the call in secure mode, and log the call." This rule is installed on all TA 102 in San Antonio 1502. This rule causes all inbound fax calls to a specified inbound destination during a specified time to be conducted in secure mode and logs the call for accounting purposes. This rule is local to San Antonio 1502 and the upper level of the tier is not notified that the rule "fired."

Rule 4:

This rule states "Allow inbound modem calls to extensions in the daily receivable modem group, conduct the call in secure mode, and log the call." This rule is installed on all TA 102 in San Antonio 1502. This rule causes all inbound modem calls to a specified inbound destination to be conducted in secure mode and logs the call for accounting purposes. This rule is local to San Antonio 1502 and the upper level of the tier is not notified that the rule "fired."

Rule 5:

This rule states "Allow all outbound international voice, fax, modem, and VTC calls to Country X, conduct the call in secure mode, and log the call." This rule is installed on all TA 102. This rule causes all outbound voice, fax, modem, and VTC calls to any destination within Country X to be conducted in secure mode and logs the call for accounting purposes. Adherence to this rule is required. Upper levels of the tier are not notified that the rule "fired."

Rule 6:

This rule states "Allow all inbound international voice, fax, modem, and VTC calls from Country X, conduct the call in secure mode, and log the call." This rule is installed on all TA 102. This rule causes all inbound voice, fax, modem, and VTC calls from any source within Country X to be conducted in secure mode and logs the call for accounting purposes. Adherence to this rule is required. Upper levels of the tier are not notified that the rule "fired."

Rule 7:

This rule states "Allow inbound and outbound voice, fax, modem, and VTC calls between extensions in the inter-branch groups, conduct the call in secure mode, and log the call." This rule is installed on all TA102. This rule causes all inbound and outbound voice, fax, modem, and VTC calls to and from specified sources and destinations to be conducted in secure mode and logs the call for accounting purposes. Adherence to this rule is required. Upper levels of the tier are not notified that the rule "fired."

Rule 8:

This rule states "Allow outbound voice, fax, modem, and VTC calls from extensions in the exec staff and engineering groups, conduct the call in secure mode, and log the call." This rule is installed on all TA 102. This rule causes all outbound voice, fax, modem, and VTC calls from specified outbound sources to be conducted in secure mode and logs the call for accounting purposes. Adherence to this rule is optional but recommended for security purposes. Upper levels of the tier are not notified that the rule "fired."

Rule 9:

This rule states "Allow inbound voice, fax, modem, and VTC calls to extensions in the exec staff and engineering groups, conduct the call in secure mode, and log the call." This rule is installed on all TA 102. This rule causes all inbound voice, fax, modem, and VTC calls to specified inbound destinations to be conducted in secure mode and logs the call for accounting purposes. Adherence to this rule is optional but recommended for security purposes. Upper levels of the tier are not notified that the rule "fired."

Rule 10:

This catch-all rule states "Deny all calls, generate an electronic mail and log the call." This rule is installed on all TA 102. Adherence to this rule is required. At first glance, this rule seems to deny any call to or from anywhere. This is not the case. This rule is typically placed at the bottom of the sequential list of rules to deny and log all calls that do not fit into any of the preceding rules. Since this rule is typically placed at the bottom of the sequential list of rules to deny and log all calls that do not fit into any of the preceding rules, the firing of the rule is an indication of the security posture, and of interest to the upper echelon. As notification of the rule "firing" is made at each upper level of the hierarchy, the event is logged, but the electronic mail notification is filtered out. Generation of an electronic mail notification takes place only at the location where the TA 102 notifies the management server 106 that the rule "fired." Again, each rule is evaluated in sequential order, exiting immediately after any one rule matches all the call criteria.

Figure 15F:
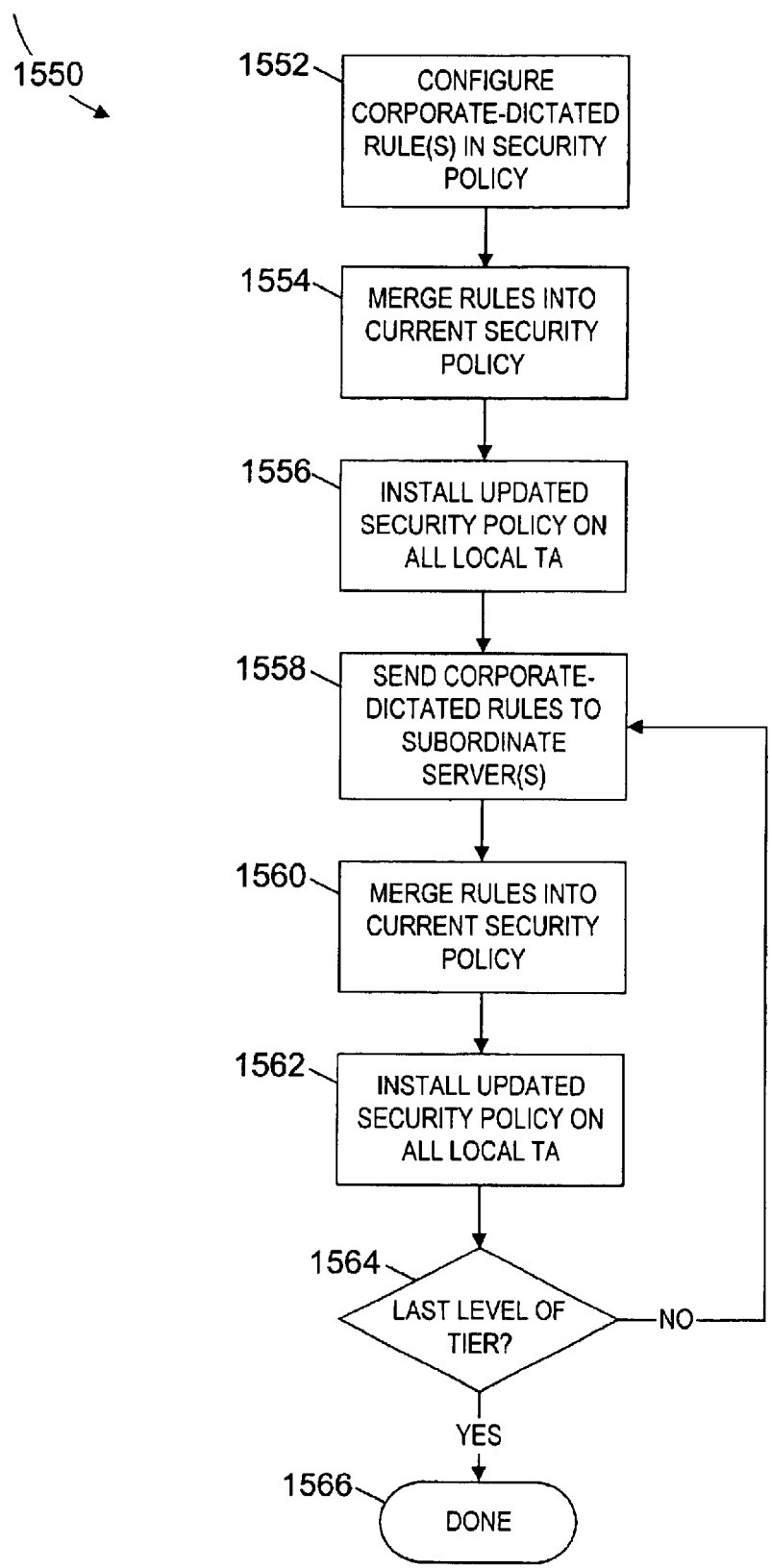
FIG. 15F is a process flow diagram illustrating implementation of the multi-tiered policy-enforcement of the security policy.

FIG. 15F is a process flow diagram 1550 illustrating the implementation of a multi-tiered policy-enforcement of the security policy 1540. It is understood that this process can be implemented during step 506 and 508 of the installation, configuration, and operation process discussed previously in FIGS. 5A and 5B, or at any time afterward, since the corporate-dictated rules will have priority over and remove any conflicting local rule.

Referring to FIG. 15F, in step 1552, corporate-dictated rules, similar to those described previously with reference to FIGS. 15C–15E, are defined. The corporate-dictated rules are included in the basic security policy 1540 that is distributed downward from the "corporate" level 1522 management server 1528 to each "regional" level 1524 management server 106 (such as the one in San Francisco 1504), and to each "branch" level 1526 management server 106 (such as those in Country X 1510 and Denver 1512). In step 1554, the corporate-dictated rules are merged into the current security policy 1540. As mentioned previously, the corporate-dictated rules will have priority over and remove any conflicting rules. In step 1556, the updated security policy 1540 is downloaded to the local TA 102 on the "corporate" level 1522.

Steps 1558–1564 illustrate a recursive process by which the updated security policy 1540 is downloaded to each management server 106 and its associated TA 102 on each level 1524 and 1526 of the tier, until the process has been performed on the lowest level of the tier. In particular, in step 1558, the updated security policy 1540 is sent to the management servers 106 on the "regional" level 1524; e.g. the management server 106 in San Francisco 1504. In step 1560, the new corporate-dictated rules are merged with the currently existing rules in the San Francisco 1504 management server 106.

In step 1562, the updated security policy 1540 is downloaded to the local TA 102 of the San Francisco 1504 management server 106. In step 1564, a determination is made whether the current level (in this case, the San Francisco 1504 management server 106), is the last level of the tier or whether it has supervisory responsibilities of other management servers, such as those on the "branch" level 1526. If it is determined that the current level is not the last level of the tier (i.e., the current management server 106 has supervisory responsibilities), execution returns to step 1558 and steps 1558–1562 will be repeated; as will be the case for the dissemination of the new security policy 1540 to the management server 106 in Country X 1510 and Denver 1512. If a positive determination is made in step 1564, i.e., when the corporate-dictated rules have been disseminated to the management servers 106 and the TA 102 populating each level of the tier, the process is complete and execution terminates in step 1566.

It should be understood that the rules comprising this basic security structure can be modified and sent down the tier at any time. While the corporate-dictated rules can be modified completely at the "corporate" level 1522 and pushed downward, the security administrators on other levels, such as the "regional" level 1524, can only accept the rules as is or make the rules to be sent downward to the "branch" level 1526 more stringent.

Figure 15G:
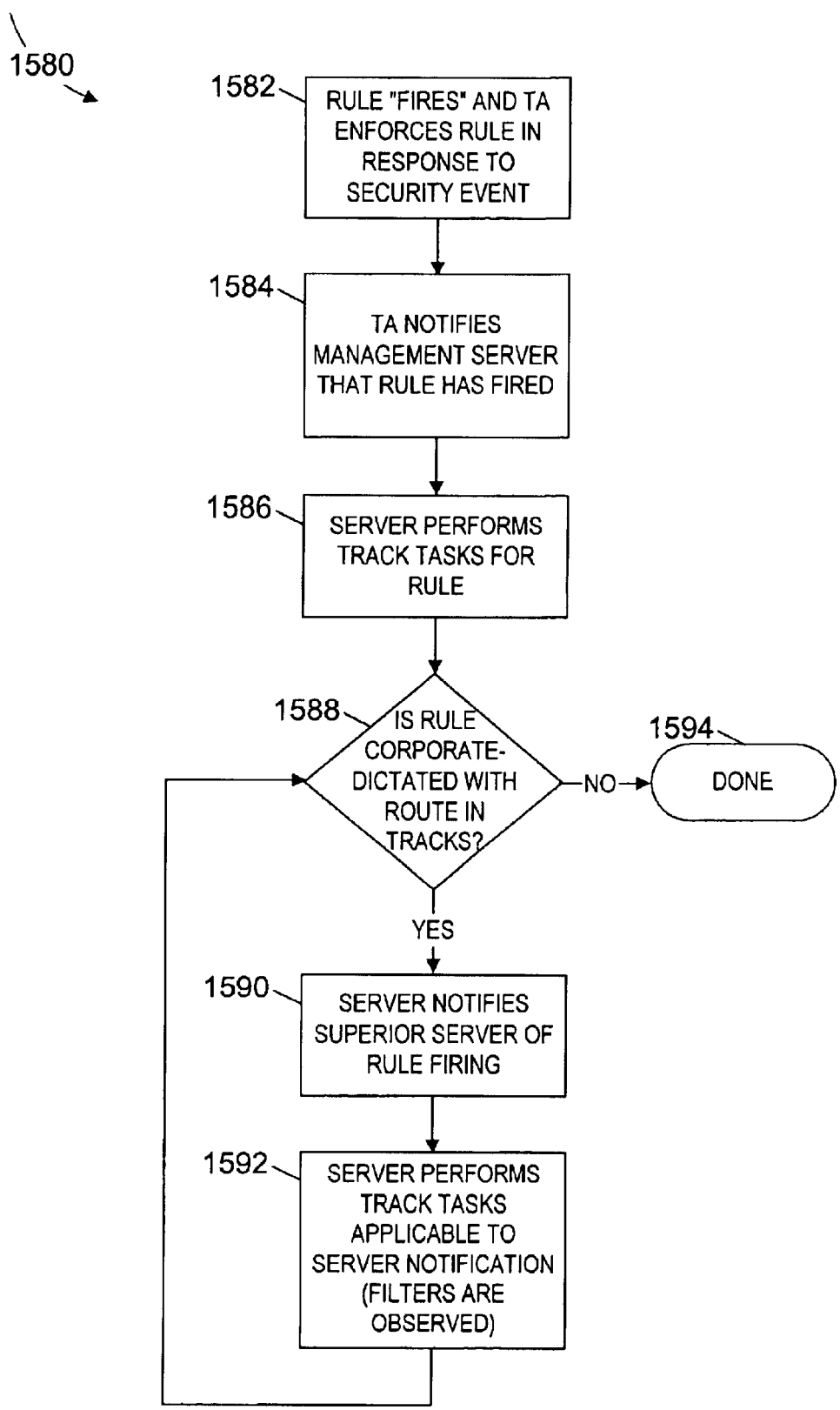
FIG. 15G is a process flow diagram illustrating implementation of filtering on "Track" tasks in a multi-tiered policy-enforced environment.

FIG. 15G is a process flow diagram 1580 illustrating the implementation of filtering on logging and execution of other "Track" tasks in a multi-tiered policy-enforced environment. It is understood that this filtering process can be applied to any task that may occur in the "Track" column of the security policy 1540.

Referring to FIG. 15G, in step 1582, the TA 102 evaluates the attributes of a call (direction, source, destination, type of call, etc.), against the sequential list of rules in the security policy 1540. When an applicable rule is found, the rule "fires" and the TA 102 enforces the rule. In step 1584, the TA 102 notifies its associated management server 106 that the specific rule has fired and that the rule has been enforced. In step 1586, the management server 106, pursuant to the rule in the security policy 1540, automatically executes the tasks designated in the "Track" column of the rule, such as generating an electronic mail notification and logging the event.

Steps 1588–1592 illustrate a recursive process by which the management server 106 on each level of the multi-tiered hierarchy receives notification of the rule having been fired, executes "Track" tasks for the rule, and notifies its supervisory management server 106 that the rule has "fired," until the notification reaches the top level of the tier. In particular, in step 1588, the rule is evaluated to determine if it is a corporate-dictated rule, and if notification of the rule "firing" will be routed up the tier in accordance with the "Route" task in the "Track" column. If the notification of the rule firing is to be routed upward, execution proceeds to step 1590, in which the management server 106 will send a notification of the rule firing to its supervisory management server 106.

Execution then proceeds to step 1592, in which, upon receiving notification routed from a subordinate management server 106 that a rule has fired, the supervisory management server 106 will execute all "Track" tasks in the rule, such as logging, that are not filtered, and then route a notification of the rule firing to its supervisory management server 106. Execution then returns to step 1588. This recursive process will continue until the notification and logging reach the "corporate" level 1522 management server 1502 which will consolidate all logging and reports for the enterprise. Referring again to step 1588, if a negative determination is made, execution terminates in step 1594. Virtual Private Switched Telecommunications Network Complemented with Computer Telephony Integration Interface It is understood that the VPSTN 100 can take many forms and embodiments. For example, the VPSTN 100 may be complemented with computer telephony integration (CTI) interface(s) to specific PBXs 114. In this alternate embodiment, the VPSTN 100 may issue commands to the PBX 114 (via the CTI interface), for the PBX 114 to perform designated actions on the call. Additionally, the PBX 114 may provide designated call attributes to the VPSTN 100 (via the CTI interface), for use in applying the security rule-set to the call. Action commands issued to, and call attributes provided by the PBX 114 are pursuant to the rule-set and within PBX 114 capabilities.

Figure 16:
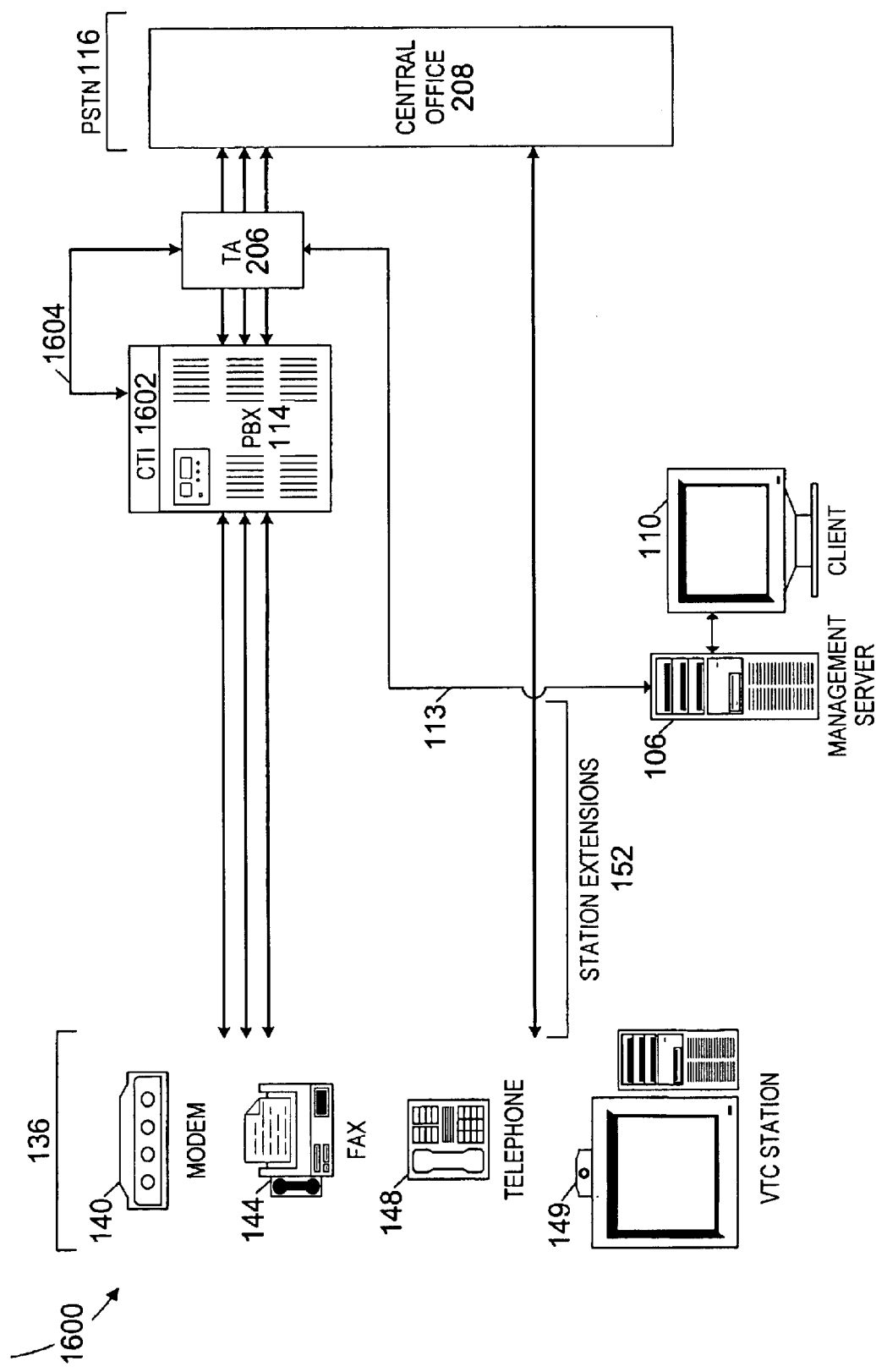
FIG. 16 is a schematic block diagram illustrating use of computer telephony integration to complement the portion of the virtual private switched telecommunications network of FIG. 2.

In FIG. 16, the reference numeral 1600 represents an alternate embodiment of the VPSTN 100 shown and described in FIG. 1 and FIG. 2, whereby the VPSTN 100 is complemented with a CTI interface 1602 to PBX 114. Accordingly, all previously described operations and functions of the VPSTN 100 are hereby inserted by reference into the VPSTN 1600.

The VPSTN 1600 consists primarily of the TA 102 connected in-line between the end-user stations 136 of an enterprise and the stations' connections into the PSTN 116 at the TA 206. Ethernet cabling and a serial port connection (or special connection) 1604 connects the TA 206 to the CTI interface 1602, which is connected to or located within the PBX 114.

In this embodiment, the PBX 114 provides call attribute information to the TA 206 via the CTI interface 1602, for the process of detecting and analyzing call activity discussed previously with reference to step 510 in FIG. 5A, and FIGS. 9A and 9B. Call attributes provided by the PBX 114 to the TA 206 are limited only by user configuration and the PBX 114 capabilities, and may include, for example: station extension, trunk, channel, inbound call number, outbound call number, call type, call date, call time, call duration. It is understood that the call attributes described herein as provided by the PBX 114 are expanded upon pursuant to PBX 114 capabilities. Different combinations of TA 206-provided and PBX 114-provided attributes are contemplated, such that all or only selected attributes are provided by the PBX 114.

Additionally, in this embodiment, the TA 206 issues commands to the PBX 114 via the CTI interface 1602, and thereby tasks the PBX 114 to perform actions and track functions associated with the call, pursuant to the security policy 302, during the process of security policy enforcement discussed previously with reference to steps 512–528 in FIGS. 5A–5B, and FIGS. 10A and 10B. Action and track function commands sent to the PBX 114 are limited only by user configuration and the PBX 114 capabilities, and may include, for example: allow the call, deny (terminate) the call, conduct the call in secure mode, generate electronic mail, pager, console messaging, and SNMP notifications, and log the event. It is understood that the actions and track functions described herein as performed by the PBX 114 are expanded upon pursuant to PBX 114 capabilities. Different combinations of TA 206-performed and management server 106performed actions and PBX 114-performed actions are contemplated, such that all or only selected actions and track functions are performed by the PBX 114.

It is understood that the present invention can take many forms and embodiments. The embodiments shown or discussed herein are intended to illustrate rather than to limit the invention, it being appreciated that variations may be made without departing from the spirit of the scope of the invention. For example, any number of different rule criteria for the security policy may be defined. Different attributes and rules are contemplated. The algorithms and process functions performed by the system may be organized into any number of different modules or computer programs for operation on one or more processors or workstations within the system. Different configurations of computers and processors for the system are contemplated, including those in which the functions of the management server 106 may be inserted into the system at the TA 102. The programs used to implement the methods and processes of the system may be implemented in any appropriate programming language and run in cooperation with any hardware device. The system may be used for enterprises as small as a private home or business with just a few lines as well as for large enterprises with multiple PBX locations around the world, interconnected in one or more private networks or virtual private networks. In the case where multiple extensions are involved, it is understood that the extensions may be PBX extensions or direct line extensions.

Although illustrative embodiments of the invention have been shown and described, it is understood that a wide range of modifications, changes and substitutions are intended in the foregoing disclosure, including various encryption engines, encryption algorithms, compression algorithms, resulting word block sizes, key exchange schemes, DS-0 channel sample configuration and content, and methods of autodiscovery. In some instances, some features of the invention will be employed without a corresponding use of other features. Accordingly, it is appropriate that the appended claims be construed broadly and in a manner consistent with the scope of the invention.

What is claimed is:

1. A system for providing secure communication of a voice call placed across a PSTN as a data call, wherein secure is understood to refer to the use of encryption to provide privacy and security, a voice call is understood to refer to a call using a bearer service that is circuit mode, with speech or 3.1 kHz audio information transfer capability, and user information layer 1 protocol G.711 mu-law or A-law, and a data call is understood to refer to a call using a bearer service that is circuit mode, with either 64 Kbps information transfer rate or 64 Kbps information transfer rate adapted to 56 Kbps, that uses unrestricted or restricted digital information transfer capability, said system comprising:

a security policy including rules defining a call to be conducted in a secure mode;

a VPSTN for implementing said rules in said security policy and initiating encryption of the call using a secure mode selected from a predetermined set of secure modes and placing the call across the PSTN;

said VPSTN including an in-line device for intercepting, identifying, modifying, and forwarding the setup message of the call identified by said security policy to be conducted in a secure mode;

said identification of the call setup message including determining whether the call setup message includes a request for bearer capability to support a voice call;

said modification of the call setup message including changing the call setup message from a request for bearer capability to support a voice call to a call setup message with a request for bearer capability to support a data call;

said forwarding of the call setup message including passing the call setup message on toward the intended destination.

2. The system as defined in claim 1 wherein said VPSTN also provides for initiating an encryption of the voice call using another secure mode selected from said predetermined set of secure modes and placing another data call should a prior attempt to place the call across the PSTN as a data call fail.

3. The system as defined in claim 2 wherein said VPSTN also provides for initiation of encryption of the voice call in a voice secure mode should all attempts at placing the call across the PSTN as a data call fail.

* * * * *

UNITED STATES PATENT AND TRADEMARK OFFICE
CERTIFICATE OF CORRECTION

PATENT NO. : 6,879,671 B2
APPLICATION NO. : 10/649204
DATED : April 12, 2005
INVENTOR(S) : Greg Schmid It is certified that error appears in the above-identified patent and that said Letters Patent is hereby corrected as shown below:

| | |
|---|---|
| Column 8, line 30 | Replace "maybe implemented" With -- may be implemented -- |
| Column 14, line 10 | Replace "calls in secure ode" With -- calls in secure mode -- |
| Column 14, line 44 | Replace "arid encryption algorithms" With -- and encryption algorithms-- |
| Column 17, line 61 | Replace "Note that "XXX' in the 'Destination' column" With -- Note that the 'XXX*' in the 'Destination' column -- |
| Column 17, line 65 | Replace "voice, fax, modern, and VTC calls" With --voice, fax, modem, and VTC calls-- |
| Column 19, line 1 | Replace "rules maybe constructed" With -- rules may be constructed -- |
| Column 21, line 1 | Replace "Al first glance" With -- At first glance -- |

Signed and Sealed this

Twenty-eighth Day of August, 2007

JON W. DUDAS
*Director of the United States Patent and Trademark Office*